(12) United States Patent
Kim et al.

(10) Patent No.: US 11,463,986 B2
(45) Date of Patent: Oct. 4, 2022

(54) METHOD AND DEVICE FOR PERFORMING PAGING IN MOBILE COMMUNICATION SYSTEM

(71) Applicant: Samsung Electronics Co., Ltd., Gyeonggi-do (KR)

(72) Inventors: Soenghun Kim, Gyeonggi-do (KR); Donggun Kim, Seoul (KR); Sangbum Kim, Gyeonggi-do (KR); Jaehyuk Jang, Gyeonggi-do (KR); Seungri Jin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/495,726

(22) PCT Filed: Mar. 22, 2018

(86) PCT No.: PCT/KR2018/003331
§ 371 (c)(1),
(2) Date: Sep. 19, 2019

(87) PCT Pub. No.: WO2018/174579
PCT Pub. Date: Sep. 27, 2018

(65) Prior Publication Data
US 2020/0022106 A1    Jan. 16, 2020

(30) Foreign Application Priority Data

Mar. 24, 2017 (KR) .................. 10-2017-0037414
Sep. 27, 2017 (KR) .................. 10-2017-0125012

(51) Int. Cl.
*H04B 7/06* (2006.01)
*H04W 72/04* (2009.01)
(Continued)

(52) U.S. Cl.
CPC .......... *H04W 68/02* (2013.01); *H04W 16/28* (2013.01); *H04W 72/0446* (2013.01); *H04W 88/02* (2013.01)

(58) Field of Classification Search
CPC ..... H04W 68/02; H04W 88/02; H04W 16/28; H04W 72/0446
See application file for complete search history.

(56) References Cited

U.S. PATENT DOCUMENTS

| 6,289,004 B1 | 9/2001 | MeSecher et al. |
| 2010/0140493 A1 | 6/2010 | Erckmann et al. |

(Continued)

FOREIGN PATENT DOCUMENTS

| CN | 1066544 | 11/1992 |
| CN | 1292937 | 4/2001 |

(Continued)

OTHER PUBLICATIONS

U.S. Appl. No. 62/455,254, Specification, Hakola et al. Multi Beam Paging Techniques for Wireless Networks, 22 pgs/ filed 2017.*

(Continued)

*Primary Examiner* — Joseph E Dean, Jr.
(74) *Attorney, Agent, or Firm* — The Farrell Law Firm, P.C.

(57) ABSTRACT

The present disclosure relates to a communication technique for combining, with an IoT technology, 5G communication system for supporting a data transmission rate higher than that of 4G systems, and to a system thereof. The present disclosure may be applied to intelligent services (e.g., a smart home, a smart building, a smart city, a smart car or connected car, healthcare, digital education, retail business, security and safety-related service, etc.), based on a 5G communication technology and an IoT-related technology.

(Continued)

An embodiment of the present invention relates to a method and device for paging a terminal by using a beam antenna.

14 Claims, 45 Drawing Sheets

(51) Int. Cl.
    *H04L 5/00*     (2006.01)
    *H04L 27/26*     (2006.01)
    *H04W 68/02*     (2009.01)
    *H04W 16/28*     (2009.01)
    *H04W 88/02*     (2009.01)

(56) References Cited

U.S. PATENT DOCUMENTS

| | | | |
|---|---|---|---|
| 2011/0310822 | A1 | 12/2011 | Nair et al. |
| 2013/0064239 | A1* | 3/2013 | Yu .................. H04W 72/046 370/350 |
| 2014/0180120 | A1 | 6/2014 | Hossack |
| 2015/0382334 | A1 | 12/2015 | El Ayach et al. |
| 2016/0119895 | A1 | 4/2016 | Agiwal et al. |
| 2017/0353928 | A1 | 12/2017 | Kim et al. |
| 2018/0026698 | A1 | 1/2018 | Lee et al. |
| 2018/0027522 | A1* | 1/2018 | Lee .................. H04W 68/02 370/336 |
| 2018/0077680 | A1* | 3/2018 | Tenny .................. H04W 68/005 |
| 2018/0115361 | A1 | 4/2018 | Li et al. |
| 2018/0242276 | A1* | 8/2018 | Patel .................. H04L 5/0048 |
| 2018/0254814 | A1 | 9/2018 | Park et al. |
| 2018/0359790 | A1 | 12/2018 | Ingale et al. |
| 2019/0239192 | A1 | 8/2019 | Tang |
| 2019/0380099 | A1* | 12/2019 | Hakola .................. H04B 7/088 |
| 2020/0015191 | A1* | 1/2020 | Lee .................. H04W 74/0833 |

FOREIGN PATENT DOCUMENTS

| | | |
|---|---|---|
| CN | 101128027 | 2/2008 |
| CN | 106170930 | 11/2016 |
| CN | 106533526 | 3/2017 |
| EP | 2 150 965 | 2/2010 |
| EP | 3 474 613 | 4/2019 |
| JP | 2000-220217 | 8/2000 |
| KR | 1020130020904 | 3/2013 |
| KR | 1020160013031 | 2/2016 |
| KR | 102017027729 | 3/2017 |
| KR | 1020170138255 | 12/2017 |
| WO | WO 2016168959 | 10/2016 |
| WO | WO 2017/022902 | 2/2017 |
| WO | WO 2017/048048 | 3/2017 |
| WO | WO 2018/018622 | 2/2018 |

OTHER PUBLICATIONS

PCT/ISA/210 Search Report issued on PCT/KR2018/003331, pp. 5.
PCT/ISA/237 Written Opinion issued on PCT/KR2018/003331, pp. 6.
Samsung, "Paging in NR", R2-1700823, 3GPP TSG-RAN WG2 Meeting #97, Feb. 13-17, 2017, 5 pages.
Samsung, "Paging Design", R1-1717580, 3GPP TSG RAN WG1 Meeting 90bis, Oct. 9-13, 2017, 4 pages.
Sony, "Considerations on Multi-beams Operation & Paging Resource Allocation", R2-1803141, 3GPP TSG RAN WG2 Meeting #101, Feb. 26-Mar. 2, 2018, 5 pages.
European Search Report dated Jan. 27, 2020 issued in counterpart application No. 18771935.6-1212, 14 pages.
Chinese Office Action dated Dec. 23, 2021 issued in counterpart application No. 201880020499.9, 14 pages.
Indian Examination Report dated Feb. 1, 2022 issued In counterpart application No. 201937037365, 6 pages.
Juan Lei et al., "Design and Analysis of Multi-Beam Parabolic Reflector Antenna", China Academic Journal Electronic Publishing House, vol. 30, No. 3, Jun. 2003, 4 pages.
MediaTek Inc., "Paging in NR with Beam Sweeping", R2-1701331, 3GPP TSG-RAN WG2 Meeting #97, Feb. 13-17, 2017, 4 pages.
Chinese Office Action dated Jun. 9, 2022 issued in counterpart application No. 201880020499.9, 7 pages.

* cited by examiner

METHOD AND DEVICE FOR PERFORMING PAGING IN MOBILE COMMUNICATION SYSTEM

PRIORITY

This application is a National Phase Entry of PCT International Application No. PCT/KR2018/003331, which was filed on Mar. 22, 2018, and claims priority to Korean Patent Application Nos. 10-2017-0037414 and 10-2017-0125012, which were filed on Mar. 24, 2017 and Sep. 27, 2017, respectively, the content of each of which is incorporated herein by reference.

TECHNICAL FIELD

The disclosure relates to a method and a device for performing paging in a next-generation mobile communication system.

BACKGROUND ART

To meet the demand for wireless data traffic, which has increased since the commercialization of 4G communication systems, efforts have been made to develop an improved 5G communication system or a pre-5G communication system. Therefore, the 5G communication system or the pre-5G communication system is called a "beyond-4G-network communication system" or a "post-LTE system". Consideration is being given to implementation of the 5G communication system in super-high-frequency (mmWave) bands (e.g., a band of 60 GHz) so as to accomplish higher data rates. In order to reduce propagation loss of radio waves and in order to increase the transmission distance of radio waves in super-high-frequency bands, techniques, such as beamforming, massive multiple-input multiple-output (MIMO), full-dimensional MIMO (FD-MIMO), array antennas, analog beamforming, and large scale antennas, are being discussed in 5G communication systems. In addition, development is under-way for system network improvement in 5G communication systems based on evolved small cells, advanced small cells, cloud radio access networks (cloud RANs), ultra-dense networks, device-to-device (D2D) communication, wireless backhaul, moving networks, cooperative communication, coordinated multi-point (CoMP), reception-end interference cancellation, and the like. Furthermore, in the 5G system, hybrid FSK and QAM modulation (FQAM) and sliding window superposition coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the Internet, which to date has been a human-centered connectivity network where humans generate and consume information, is now evolving to the Internet of Things (IoT), where distributed entities, or "things", exchange and process information. The Internet of Everything (IoE), which is a combination of IoT technology and big-data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine-type communication (MTC), and the like, have been recently researched. An IoT environment may provide intelligent Internet technology (IT) services that create new value in people's life by collecting and analyzing data generated from connected things. The IoT may be applied to a variety of fields, such as smart homes, smart buildings, smart cities, smart cars or connected cars, smart grids, healthcare, smart appliances, and advanced medical services, through convergence and combination between existing information technology (IT) and various industries.

In line with this, various attempts have been made to apply 5G communication systems to IoT networks. For example, technologies, such as a sensor network, machine-to-machine (M2M) communication, machine-type communication (MTC), and the like, are being implemented by 5G communication techniques, such as beamforming, MIMO, array antennas, and the like. The application of a cloud radio access network (RAN) as the above-described big-data processing technology may also be considered as an example of convergence between the 5G technology and the IoT technology.

DETAILED DESCRIPTION OF THE INVENTION

Technical Problem

Since a base station is not aware of the location of a terminal in an idle mode, all beam antennas must transmit paging signals. In addition, it is impossible to transmit paging signals at the same time from all beam antennas because of transmission power limitation, suppression of interference between antennas, and the like. Thus, if the beam antennas sequentially transmit paging signals one by one, a plurality of time slots is required in order to transmit one paging signal to the terminal. The disclosure proposes a method of configuring such a plurality of time slots.

Solution to Problem

A method of a base station in a wireless communication system according to embodiments of the disclosure may include: identifying a paging time interval for transmitting a paging message to a terminal; and repeatedly transmitting the paging message to the terminal through beam sweeping in the paging time interval.

A method of a terminal in a wireless communication system according to embodiments of the disclosure may include: identifying a paging time interval for receiving a paging message; and monitoring the paging message repeatedly transmitted through beam sweeping of a base station during the paging time interval.

A base station in a wireless communication system according to embodiments of the disclosure may include: a transceiver; and a controller configured to identify a paging time interval for transmitting a paging message to a terminal, and repeatedly transmit the paging message to the terminal through beam sweeping during the paging time interval.

A terminal in a wireless communication system according to embodiments of the disclosure may include: a transceiver; and a controller configured to identify a paging time interval for receiving a paging message, and monitor the paging message repeatedly transmitted through beam sweeping of the base station during the paging time interval.

Advantageous Effects of Invention

According to the embodiments of the disclosure, it is possible to efficiently perform paging with respect to a terminal using a beam antenna.

MODE FOR CARRYING OUT THE INVENTION

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

The terms as used in the following description, such as terms indicating access nodes, terms indicating network entities, terms indicating messages, terms indicating interfaces between network entities, and terms indicating various identification information, are given by way of example for the convenience of description. Therefore, the disclosure may not be limited by the terminologies provided below, and other terms that indicate subjects having equivalent technical meanings may be used.

Hereinafter, terms and names defined in the $3^{rd}$-generation partnership project long-term evolution (3GPP LTE) standard will be used for the convenience of explanation. However, the disclosure is not limited to the above terms and names, and may be applied to systems conforming to other standards in the same manner.

First Embodiment

Figure 1A:
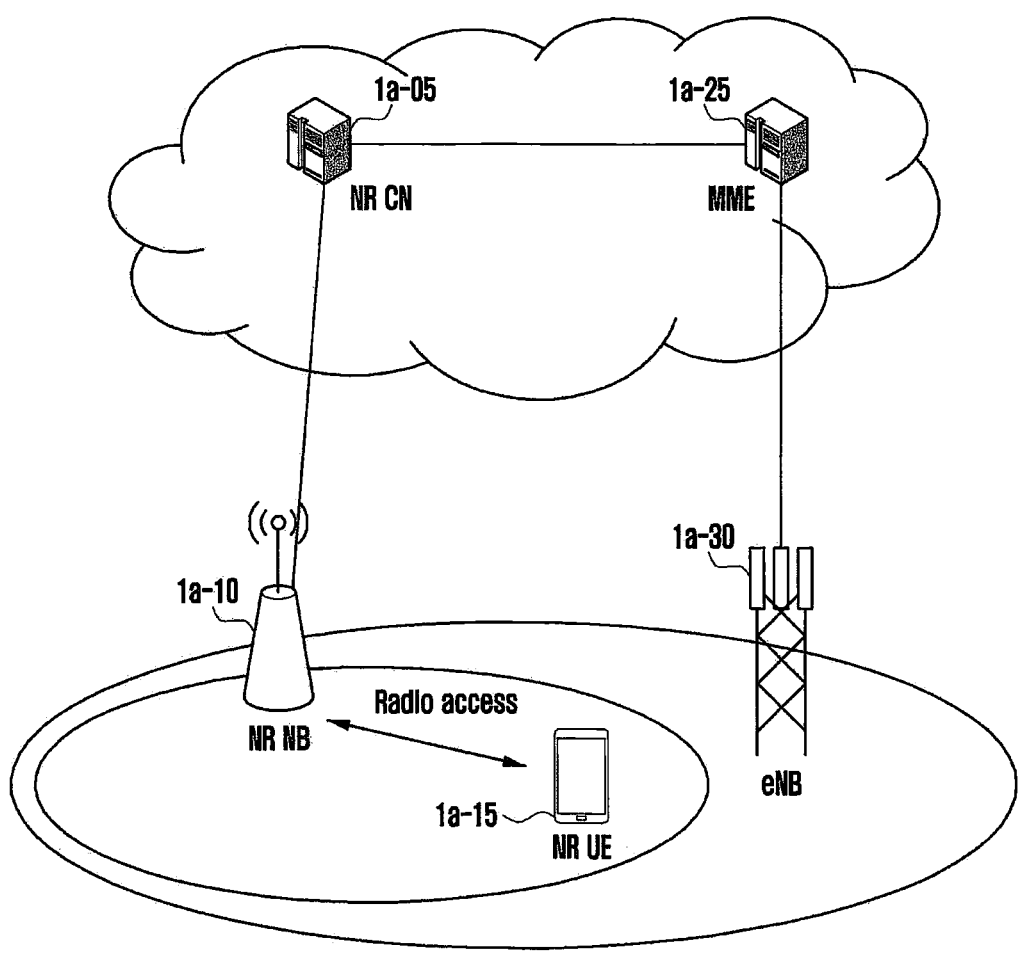
FIG. 1A is a diagram illustrating the structure of a next-generation mobile communication system.

FIG. 1A is a diagram showing the structure of a next-generation mobile communication system.

Referring to FIG. 1A, a wireless access network of a next-generation mobile communication system includes a new radio nodeB (hereinafter, referred to as "NR NB") 1a-10 and a new radio core network (NR CN) 1a-05 as shown in the drawing. New-radio user equipment (hereinafter, referred to as "NR UE" or a "terminal") 1a-15 accesses an external network through the NR NB 1a-10 and the NR CN 1a-05.

In FIG. 1A, the NR NB 1a-10 corresponds to an evolved nodeB (eNB) of an existing LTE system. The NR NB is connected to the NR UE 1a-15 through a wireless channel, and may provide services superior to those of the existing nodeB. In the next-generation mobile communication system, since all user traffic is served through a shared channel, a device for collecting status information, such as buffer status, available transmission power status, and channel status of UEs, and performing scheduling is required. The NR NB 1a-10 serves as such a device. One NR NB typically controls multiple cells. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal. The NR CN 1a-05 performs functions such as mobility support, bearer configuration, and QoS configuration. The NR CN is a device that performs various control functions, as well as a mobility management function for a terminal, and is connected to a plurality of base stations. In addition, the next-generation mobile communication system may interwork with the existing LTE system, and the NR CN is connected to an MME 1a-25 through a network interface. The MME is connected to the eNB 1a-30, which is an existing base station.

Figure 1B:
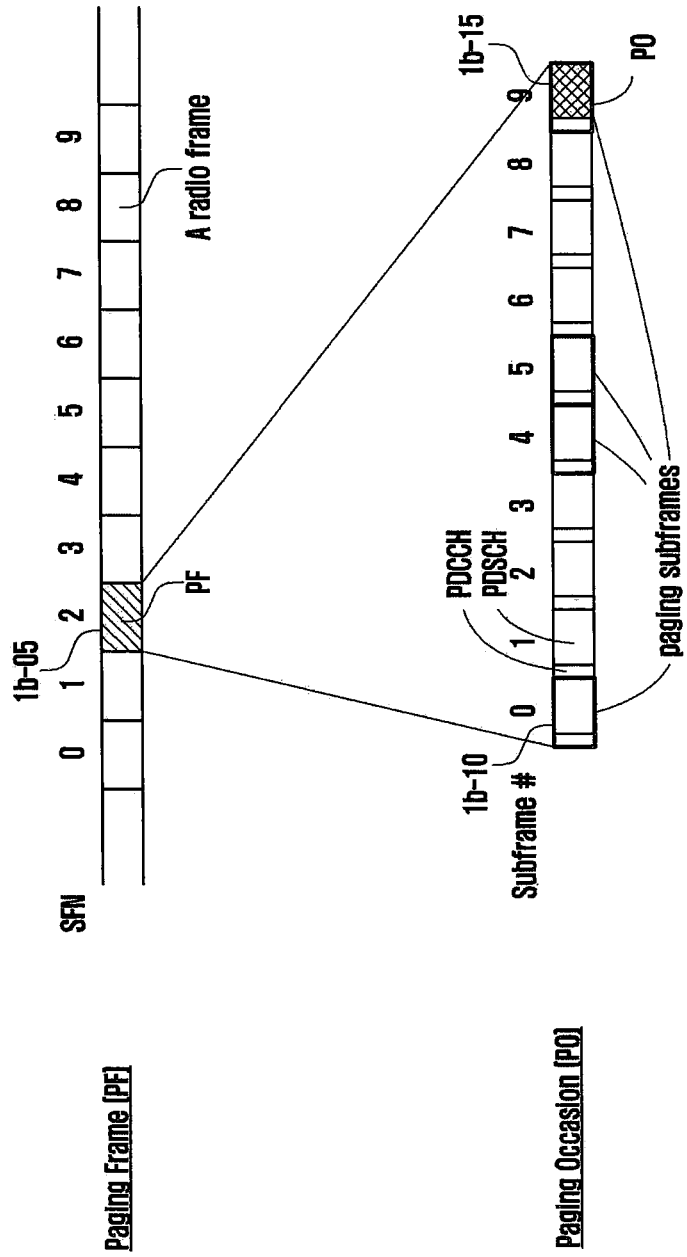
FIG. 1B is a conceptual diagram showing a paging timing in the conventional LTE technology.

FIG. 1B is a conceptual diagram showing a paging timing in the conventional LTE technology.

DRX operation may improve power consumption. The DRX operation in an idle mode is monitoring paging periodically, instead of monitoring paging in all the times. The terminal performs a reception operation to receive a paging signal from the base station. However, since the paging signal is not transmitted frequently, the reception operation performed by the terminal during a period of time in which the paging signal is not received may increase power loss. Therefore, in order to reduce power consumption, the terminal may perform the operation of receiving the paging signal periodically only during a specific period of time, which is referred to as "DRX". In the LTE system, DRX operation of a terminal in an idle mode is performed using Equation 1 below. SFN is increased by 1 every radio frame. If a paging signal is transmitted in a radio frame satisfying the equation, the terminal performs a reception operation by DRX. The radio frame is called a "paging frame (PF)" 1b-05.

$$\text{SFN mod } T=(T \text{ div } N)*(UE\_ID \text{ mod } N) \qquad <\text{Equation 1}>$$

Here,

SFN: system frame number. 10 bits (MSB 8 bits explicit and LBS 2 bits implicit)

T: DRX cycle of the UE. Transmitted on SIB2. ENUMERATED {rf32, rf64, rf128, rf256}

N: min (T, nB)

nB: Transmitted on SIB2. ENUMERATED {4T, 2T, T, T/2, T/4, T/8, T/16, T/32}.

UE_ID: IMSI mod 1024 (IMSI is a unique number assigned to each terminal)

8 bits of a master information block (MIB) of a physical broadcast channel (PBCH) represents the SFN. T and nB are values provided from the base station while being included in SIB2 (system information block type 2). T may have one of {rf32, rf64, rf128, rf256}, where r32 denotes the length of 32 radio frames. That is, r32 means 320 ms. The value T applied to the above equation is derived through coordination between the terminal, the base station, and the MME.

The base station provides the terminal with a default DRX value using SIB1, which is one piece of broadcasted system information. If the terminal desires a DRX period shorter than the default DRX value, the terminal provides the MME with a desired DRX value as a UE-specific DRX value through an ATTACH process. If there is paging for the terminal, the MME transmits, to the base station, a UE-specific DRX value provided from the terminal along with the paging. The terminal determines a small value, among the UE-specific DRX value transmitted to the MME and the default DRX value received from the base station, to be a DRX period. The base station also determines a small value, among the UE-specific DRX value received from the MME and the default DRX value broadcasted by the base station, to be a DRX period. The DRX period value is a value T that is actually applied to the above equation. Accordingly, the terminal and the base station select the same DRX period, and the base station transmits a paging message to the terminal after determining a PF based on the DRX period.

A subframe capable of transmitting a paging message is defined in one PF. This is called a "paging subframe" 1b-10. The terminal monitors its own paging in one paging subframe of the PF derived from the above equation. The one paging subframe is referred to as a "paging occasion (PO)" 1b-15. The PO is derived through Equation 2 below.

$$i\_s = \text{floor}(UE\_ID/N) \bmod Ns \qquad \text{<Equation 2>}$$

Referring to Equation 2, the value i_s is determined based on UE_ID (a terminal identifier). Then, the terminal may derive its own PO by substituting the value i_s derived by Equation 2 into Tables 1 and 2 below.

Table 1 is applied to frequency division duplex (FDD), and Table 2 is applied to all UL/DL configurations in the case of time division duplex (TDD).

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

Figure 1C:
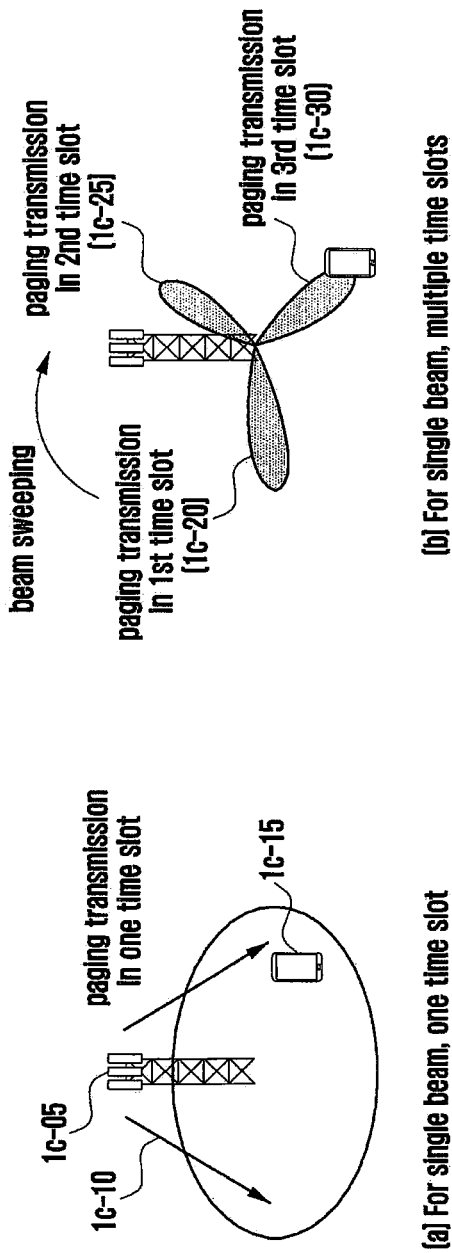
FIG. 1C is a diagram illustrating an operation of transmitting a paging message to a terminal using a plurality of time slots according to a first embodiment of the disclosure.

FIG. 1C illustrates an operation of transmitting a paging message to a terminal using a plurality of time slots according to a first embodiment of the disclosure.

The next-generation mobile communication system is applicable to both low-frequency bands and high-frequency bands.

A cell with a low frequency of 6 GHz or less typically forms a service area using an omnidirectional antenna or a sector antenna. This is referred to as a "single-beam antenna" in the disclosure. In this case, since a paging signal for one terminal 1c-15 is transmitted in all directions in a service area, the base station 1c-05 transmits the paging signal using only one time slot (1c-10).

On the other hand, since a cell with a high frequency of 6 GHz or more has a large radio path loss rate, the service area is guaranteed by applying a beam antenna that concentrates the antenna gain within a very narrow angle. Since the beam antenna has a very narrow main lobe, a multi-beam antenna must be used to cover the entire service area. In addition, a terminal that is out of the beam antenna main lobe cannot receive a signal transmitted from the antenna. Since the base station is not aware of the location of the terminal in an idle mode, the paging signal must be transmitted from all beam antennas. In addition, since it is impossible to transmit the paging signal from all beam antennas at the same time because of transmission power limitation, suppression of interference between antennas, and the like, the paging signal must be sequentially transmitted by the beam antennas one by one (1c-20, 1c-25, and 1c-30). Therefore, a plurality of time slots is required in order to transmit one paging signal to the terminal. The disclosure proposes a method of configuring such a plurality of time slots. The unit of the time slot may be one or more OFDMA symbols, TTIs, subframes, or the like.

Figure 1D:
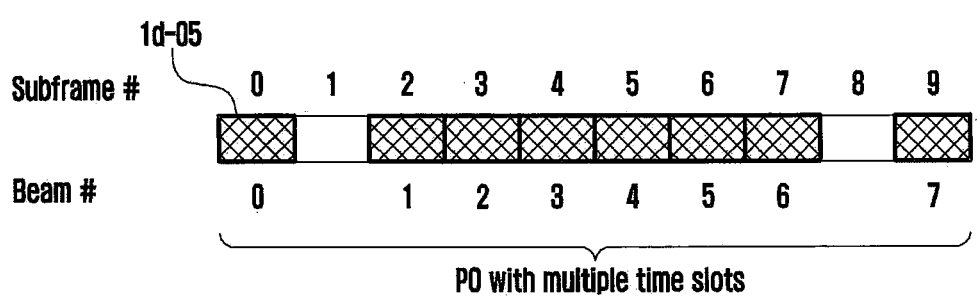
FIG. 1D is a diagram illustrating an operation of transmitting a paging message to a terminal using a time slot in the unit of a subframe according to a first embodiment of the disclosure.

FIG. 1D shows an operation of transmitting a paging message to a terminal using a time slot in the unit of a subframe according to a first embodiment of the disclosure.

In the LTE system, only one PO exists in one PF. That is, although there is a plurality of paging subframes, a paging message for one terminal is actually transmitted in only one of the paging subframes. As described above, in the case where a multi-beam antenna is applied, a plurality of time slots is required in order to transmit a paging message. Assuming that existing PF equations are reused, a plurality of time slots is required in order to transmit a paging message in one PF. Unlike the LTE system, if a unit of the time slot is a subframe, a plurality of POs 1d-05 is required. Accordingly, the terminal monitoring paging in a cell supporting a beam antenna determines one or more POs, among a plurality of paging subframes in the PF, according to a predetermined equation. The POs do not need to be close to each other. The base station sequentially transmits a paging message with respect to the terminal in the one or more POs. One PO corresponds to one beam antenna. Although there is a plurality of POs capable of transmitting their own paging messages in one PF, actually, the terminal has only to successfully receive a paging message in one PO. Accordingly, the terminal may monitor paging in all POs, or may monitor paging only in POs corresponding to one or N best beams.

Figure 1E:
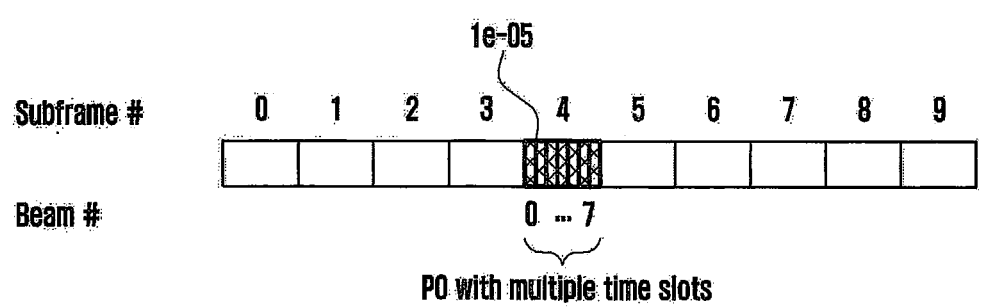
FIG. 1E is a diagram illustrating an operation of transmitting a paging message to a terminal using a plurality of time slots in a single subframe according to a first embodiment of the disclosure.

FIG. 1E illustrates an operation of transmitting a paging message to a terminal using a plurality of time slots in a single subframe according to a first embodiment of the disclosure.

As described above, in the case in which a multi-beam antenna is applied, a plurality of time slots is required in order to transmit a paging message. Assuming that existing PF equations are reused, a plurality of time slots is required in order to transmit a paging message in one PF. In the embodiment, the unit of the time slot is shorter than a subframe, and the time slot exists in one PO (1e-05). Therefore, the equation used for deriving an existing PO may be reused. The base station transmits a paging message for the terminal through beam sweeping in the one or more time slots. Each time slot in one PO corresponds to one beam antenna, and the paging message is transmitted from one antenna at a time. Although there is a plurality of time slots, each capable of transmitting a paging message in one PO, actually, the terminal has only to successfully receive a paging message in one time slot. Accordingly, the terminal may monitor paging in all time slots, or may monitor paging only in the time slots corresponding to one or N best beams.

Figure 1F:
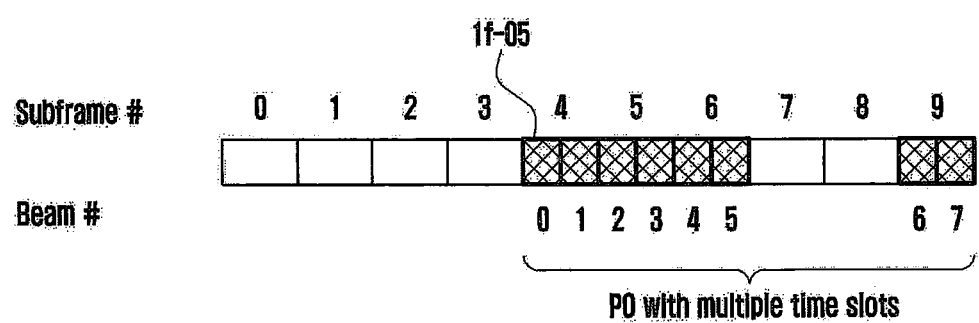
FIG. 1F is a diagram illustrating an operation of transmitting a paging message to a terminal using a plurality of time slots over several subframes according to a first embodiment of the disclosure.

FIG. 1F illustrates an operation of transmitting a paging message to a terminal using a plurality of time slots over several subframes according to a first embodiment of the disclosure.

As described above, in the case in which a multi-beam antenna is applied, a plurality of time slots is required in order to transmit a paging message. Assuming that existing PF equations are reused, a plurality of time slots is required in order to transmit a paging message in one PF. In this embodiment, the unit of the time slot is shorter than a subframe, and the time slot 1f-05 exists over a plurality of POs. For example, one terminal has subframes 4, 5, 6, and 9 as POs, and each PO has two time slots. Each time slot corresponds to one beam antenna. The terminal monitoring paging in a cell supporting a beam antenna determines one or more POs, among a plurality of paging subframes in a PF, according to a predetermined equation. The POs do not need to be arranged adjacent to each other. The base station sequentially transmits a paging message for the terminal using beam sweeping in the time slots in one or more POs. Although there is a plurality of time slots, each capable of transmitting its own paging message, in one PF, actually, the terminal has only to successfully receive a paging message in one time slot. Accordingly, the terminal may monitor paging in all time slots, or may monitor paging only in the time slots corresponding to one or N best beams.

Figure 1G:
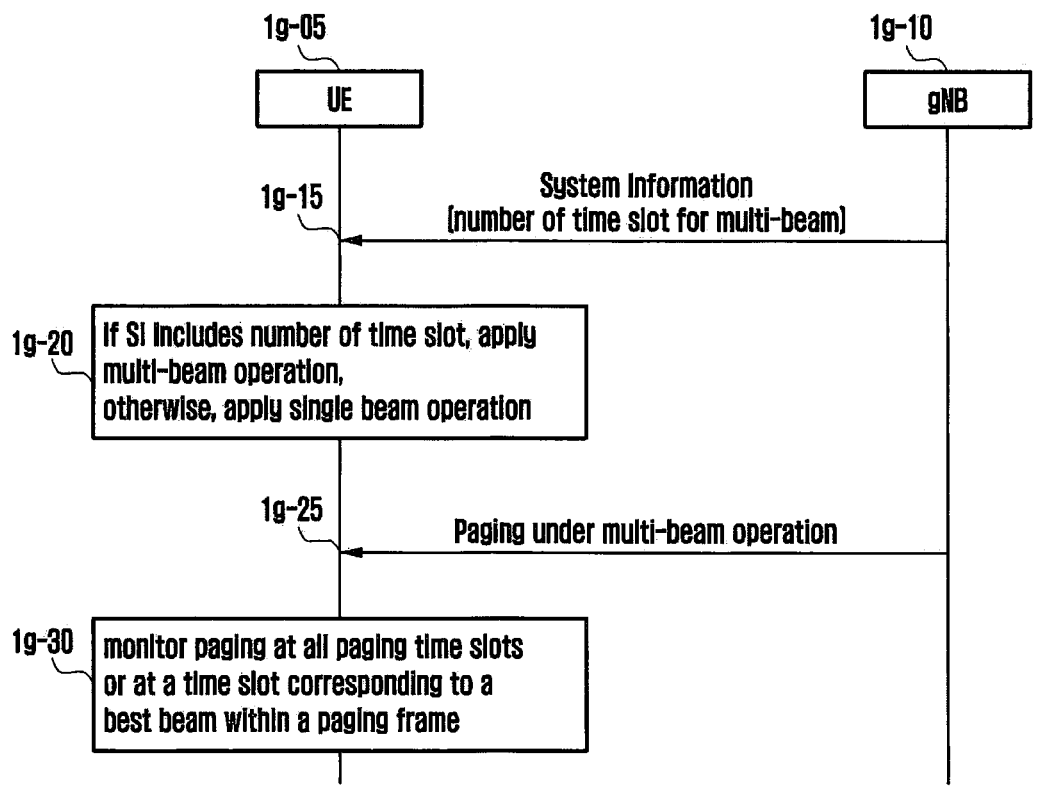
FIG. 1G is a flowchart illustrating transmission of a paging message to a terminal using a plurality of time slots according to a first embodiment of the disclosure.

FIG. 1G is a flowchart of transmitting a paging message to a terminal using a plurality of time slots according to a first embodiment of the disclosure.

A terminal 1g-05 receives, from a base station 1g-10, time slot information (e.g., the number of time slots) corresponding to a multi-beam antenna using system information 1g-15. In this case, each time slot corresponds to one beam antenna. The information is provided only in a cell that supports a multi-beam antenna, and a cell supporting a single-beam antenna does not need to provide the information. Therefore, the cell providing the information as system information may be regarded as a cell supporting a multi-beam antenna. In the case of providing time slot information, the terminal applies an operation of receiving a paging message via a multi-beam antenna. Otherwise, the terminal applies an operation of receiving a paging message via a single-beam antenna (1g-20). The operation of receiving a paging message in a single-beam antenna is the same as that in the existing LTE system, in which one PO exists in one PF. The operation of receiving a paging message in a multi-beam antenna may have various examples depending on the unit of a time slot as described above, and a plurality of POs may exist in one PF. The base station transmits a paging message by means of beam sweeping for each PO or time slot (1g-25). The terminal may monitor a paging message in all POs, or may monitor a paging message only in the time slots corresponding to one or N best beams (1g-30).

Figure 1H:
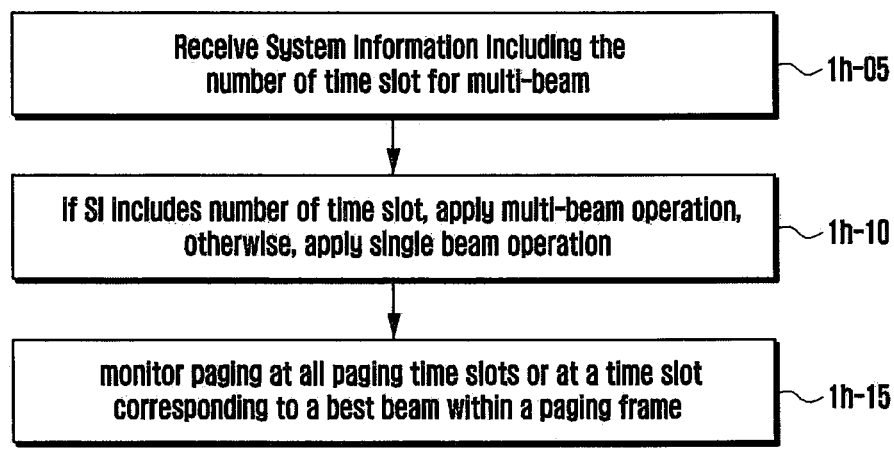
FIG. 1H is a flowchart illustrating the operation of a terminal according to a first embodiment of the disclosure.

FIG. 1H illustrates the operation of a terminal according to a first embodiment of the disclosure.

In step 1h-05, the terminal receives, from a base station, time slot information (e.g., the number of time slots) corresponding to a multi-beam antenna using system information. In step 1h-10, if the time slot information is provided, the terminal applies an operation of receiving a paging message in a multi-beam antenna. Otherwise, the terminal applies an operation of receiving a paging message in a single-beam antenna. In step 1h-15, the terminal may monitor a paging message in all POs, or may monitor a paging message only in the time slots corresponding to one or N best beams.

Figure 1I:
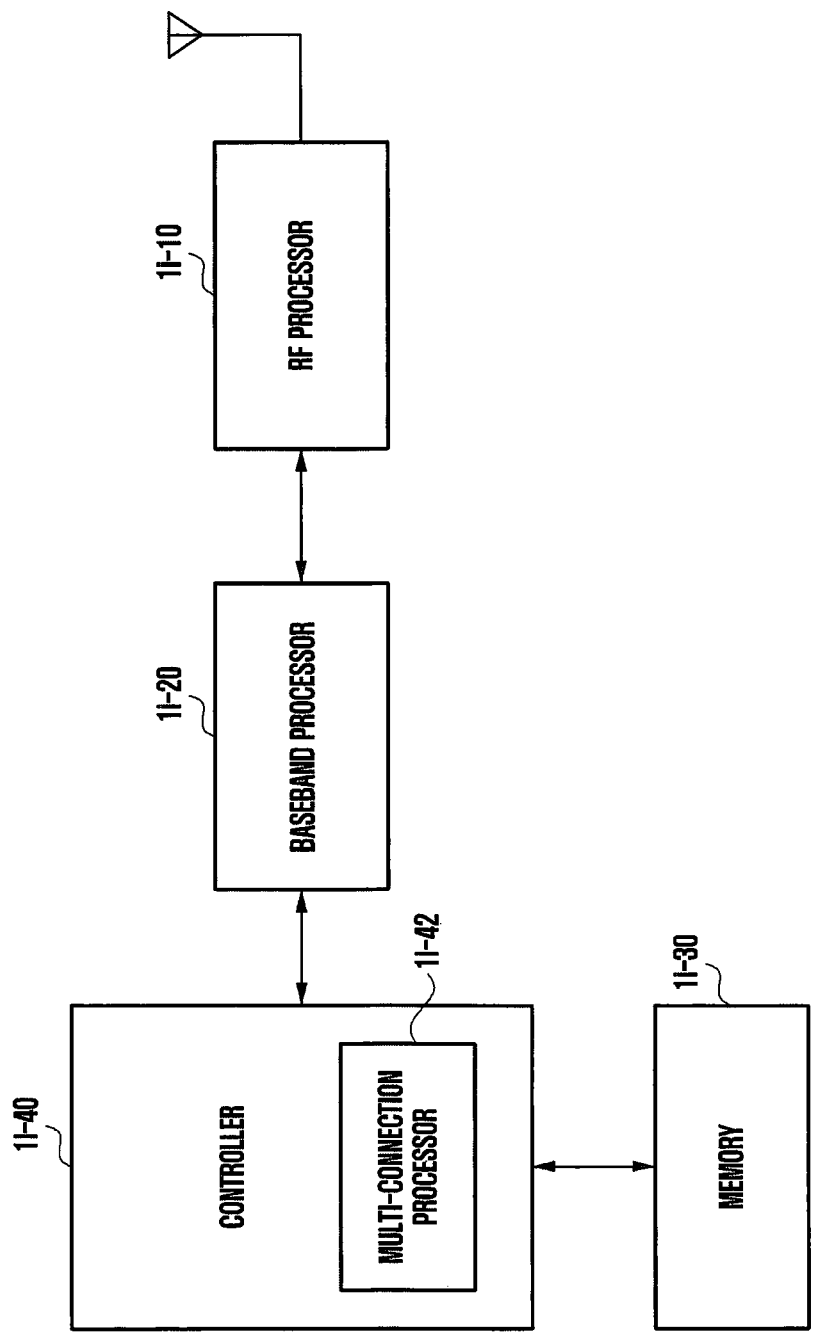
FIG. 1I is a block diagram illustrating the internal structure of a terminal according to a first embodiment of the disclosure.

FIG. 1I shows the structure of a terminal according to a first embodiment of the disclosure.

Referring to FIG. 1I, the terminal includes a radio frequency (RF) processor 1i-10, a baseband processor 1i-20, a memory 1i-30, and a controller 1i-40.

The RF processor 1i-10 performs a function of transmitting and receiving a signal through a wireless channel, such as band conversion and amplification of a signal. That is, the RF processor 1i-10 up-converts a baseband signal provided from the baseband processor 1i-20 to an RF band signal to thus transmit the same through an antenna and down-converts an RF band signal received through the antenna to a baseband signal. For example, the RF processor 1i-10 may include a transmission filter, a reception filter, an amplifier, a mixer, an oscillator, a digital-to-analog converter (DAC), an analog-to-digital converter (ADC), and the like. Although only one antenna is shown in the drawing, the terminal may have a plurality of antennas. In addition, the RF processor 1i-10 may include a plurality of RF chains. Further, the RF processor 1i-10 may perform beamforming. To perform beamforming, the RF processor 1i-10 may adjust the phases and magnitudes of signals transmitted and received through a plurality of antennas or antenna elements. In addition, the RF processor may perform MIMO, and may receive multiple layers when performing the MIMO operation.

The baseband processor 1i-20 performs a function of conversion between a baseband signal and a bit string according to the physical layer specification of the system. For example, in the case of data transmission, the baseband processor 1i-20 encodes and modulates transmission bit strings, thereby generating complex symbols. In addition, upon receiving data, the baseband processor 1i-20 demodulates and decodes a baseband signal provided from the RF processor 1i-10 to thus recover reception bit strings. For example, in the case where an orthogonal frequency division multiplexing (OFDM) scheme is applied, when transmitting data, the baseband processor 1i-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 1i-20 divides the baseband signal provided from the RF processor 1i-10 into OFDM symbol units, restores the signals mapped with the subcarriers through a fast Fourier transform (FFT) operation, and then restores reception bit strings through demodulation and decoding.

The baseband processor 1i-20 and the RF processor 1i-10 transmit and receive signals as described above. Accordingly, the baseband processor 1i-20 and the RF processor 1i-10 may be referred to as a "transmitter", a "receiver", a "transceiver", or a "communication unit". Further, at least one of the baseband processor 1i-20 and the RF processor 1i-10 may include a plurality of communication modules to support a plurality of different wireless access technologies. In addition, at least one of the baseband processor 1i-20 and the RF processor 1i-10 may include different communication modules for processing signals of different frequency bands. For example, the different wireless access technologies may include a wireless LAN (e.g., IEEE 802.11), a cellular network (e.g., LTE), and the like. In addition, the different frequency bands may include super high frequency (SHF) (e.g., 2.NRHz or NRhz) band and a millimeter wave (e.g., 60 GHz) band.

The memory 1i-30 stores data such as basic programs, application programs, and configuration information for the operation of the terminal. In particular, the memory 1i-30 may store information related to an access node (e.g., a base station) that performs wireless communication using a wireless access technology. In addition, the memory 1$i$-30 provides stored data in response to a request from the controller 1$i$-40.

The controller 1$i$-40 controls the overall operation of the terminal. For example, the controller 1$i$-40 transmits and receives signals through the baseband processor 1$i$-20 and the RF processor 1$i$-10. In addition, the controller 1$i$-40 records and reads data in and from the memory 1$i$-40. To this end, the controller 1$i$-40 may include at least one processor. For example, the controller 1$i$-40 may include a communication processor (CP) for controlling communication and an application processor (AP) for controlling upper layers such as application programs. The controller 1$i$-40 may include a multi-connection processor 1$i$-42 for performing a process for operation in a multi-connection mode.

Figure 1J:
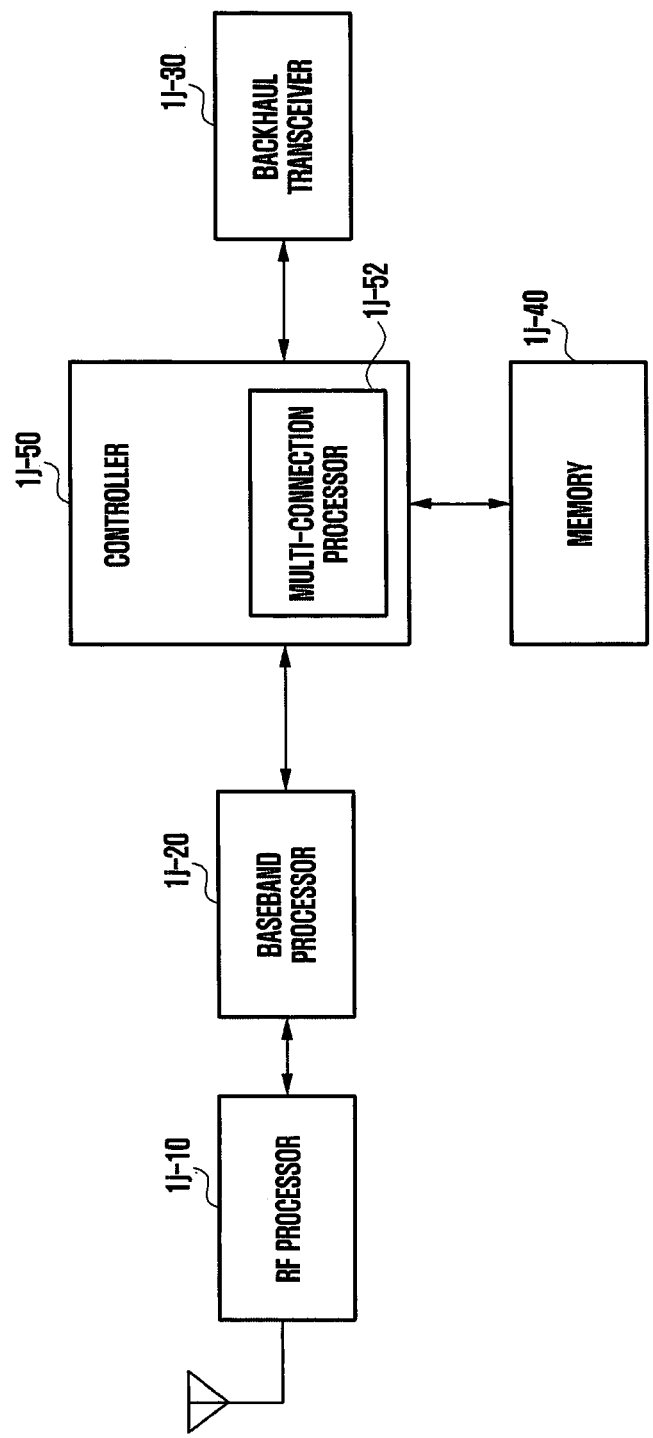
FIG. 1J is a block diagram illustrating the configuration of a base station according to a first embodiment of the disclosure.

FIG. 1J is a block diagram showing the configuration of a base station in a wireless communication system according to a first embodiment of the disclosure.

As shown in the drawing, the base station includes an RF processor 1$j$-10, a baseband processor 1$j$-20, a backhaul transceiver 1$j$-30, a memory 1$j$-40, and a controller 1$j$-50.

The RF processor 1$j$-10 performs a function of transmitting and receiving signals through a wireless channel, such as band conversion and amplification of a signal. That is, the RF processor 1$j$-10 up-converts a baseband signal provided from the baseband processor 1$j$-20 to an RF band signal, to thus transmit the same through an antenna, and down-converts an RF band signal received through the antenna to a baseband signal. For example, the RF processor 1$j$-10 may include a transmission filter, a reception filter, an amplifier, a mixer, an oscillator, a DAC, an ADC, and the like. Although only one antenna is shown in the drawing, the base station may have a plurality of antennas. In addition, the RF processor 1$j$-10 may include a plurality of RF chains. Further, the RF processor 1$j$-10 may perform beamforming. To perform beamforming, the RF processor 1$j$-10 may adjust the phases and magnitudes of signals transmitted and received through a plurality of antennas or antenna elements. The RF processor may perform a downlink MIMO operation by transmitting one or more layers.

The baseband processor 1$j$-20 performs a function of conversion between a baseband signal and a bit string according to a physical layer specification of the system. For example, in the case of data transmission, the baseband processor 1$j$-20 encodes and modulates transmission bit strings, thereby generating complex symbols. In addition, upon receiving data, the baseband processor 1$j$-20 demodulates and decodes a baseband signal provided from the RF processor 1$j$-10 to thus recover reception bit strings. For example, in the case where an OFDM scheme is applied, when transmitting data, the baseband processor 1$j$-20 generates complex symbols by encoding and modulating transmission bit strings, maps the complex symbols with subcarriers, and then configures OFDM symbols through the IFFT operation and CP insertion. In addition, when receiving data, the baseband processor 1$j$-20 divides the baseband signal provided from the RF processor 1$j$-10 into OFDM symbol units, restores the signals mapped with the subcarriers through the FFT operation, and then restores reception bit strings through demodulation and decoding. The baseband processor 1$j$-20 and the RF processor 1$j$-10 transmit and receive signals as described above. Accordingly, the baseband processor 1$j$-20 and the RF processor 1$j$-10 may be referred to as a "transmitter", a "receiver", a "transceiver", a "communication unit", or a "wireless communication unit".

The backhaul transceiver 1$j$-30 provides an interface for performing communication with other nodes in the network. That is, the backhaul transceiver 1$j$-30 converts a bit string, transmitted from the primary base station to another node, such as a secondary base station, a core network, etc., into a physical signal, and converts physical signals received from other nodes into bit strings.

The memory 1$j$-40 stores data such as basic programs, application programs, and configuration information for the operation of the primary base station. In particular, the memory 1$j$-40 may store information about bearers allocated to a connected terminal, a measurement result reported from a connected terminal, and the like. In addition, the memory 1$j$-40 may store information that is a criterion for determining whether multiple connections are provided to the terminal or are released. In addition, the memory 1$j$-40 provides stored data in response to a request from the controller 1$j$-50.

The controller 1$j$-50 controls the overall operation of the base station. For example, the controller 1$j$-50 transmits and receives signals through the baseband processor 1$j$-20 and the RF processor 1$j$-10 or the backhaul transceiver 1$j$-30. In addition, the controller 1$j$-50 records and reads data in and from the memory 1$j$-40. To this end, the controller 1$j$-50 may include at least one processor. The controller 1$j$-50 may include a multi-connection processor 1$j$-52 for performing a process for operation in a multi-connection mode.

Second Embodiment

Figure 2A:
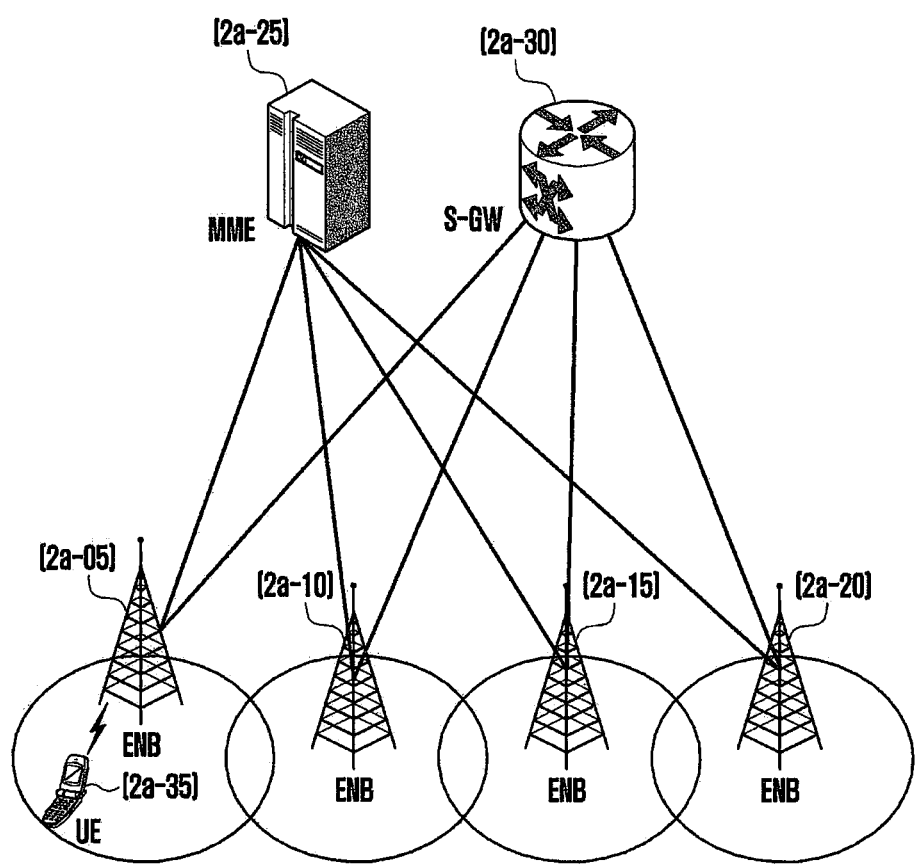
FIG. 2A is a diagram illustrating the structure of an LTE system for reference in order to explain the disclosure.

FIG. 2A is a diagram showing the structure of an LTE system for reference in order to explain the disclosure.

Referring to FIG. 2A, the wireless communication system includes a plurality of base stations 2$a$-05, 2$a$-10, 2$a$-15, and 2$a$-20, a mobility management entity (MME) 2$a$-25, and a serving gateway (S-GW) 2$a$-30. User equipment (hereinafter, referred to as "UE" or a "terminal") 2$a$-35 accesses an external network through the base stations 2$a$-05, 2$a$-10, 2$a$-15, and 2$a$-20 and the S-GW 2$a$-30.

The base stations 2$a$-05, 2$a$-10, 2$a$-15, and 2$a$-20 provide wireless access to terminals accessing the network as access nodes of a cellular network. That is, in order to serve traffic of users, the base stations 2$a$-05, 2$a$-10, 2$a$-15, and 2$a$-20 collect status information, such as buffer status, available transmission power status, channel status, and the like of terminals, and perform scheduling, thereby supporting connection between the terminals and a core network (CN). The MME 2$a$-25 performs various control functions, as well as a mobility management function for a terminal, and is connected to a plurality of base stations. The S-GW 2$a$-30 provides data bearers. In addition, the MME 2$a$-25 and the S-GW 2$a$-30 may further perform authentication and bearer management for the terminal accessing the network, and may process packets received from the base stations 2$a$-05, 2$a$-10, 2$a$-15, and 2$a$-20 or packets to be transmitted to the base stations 2$a$-05, 2$a$-10, 2$a$-15, and 2$a$-20.

Figure 2B:
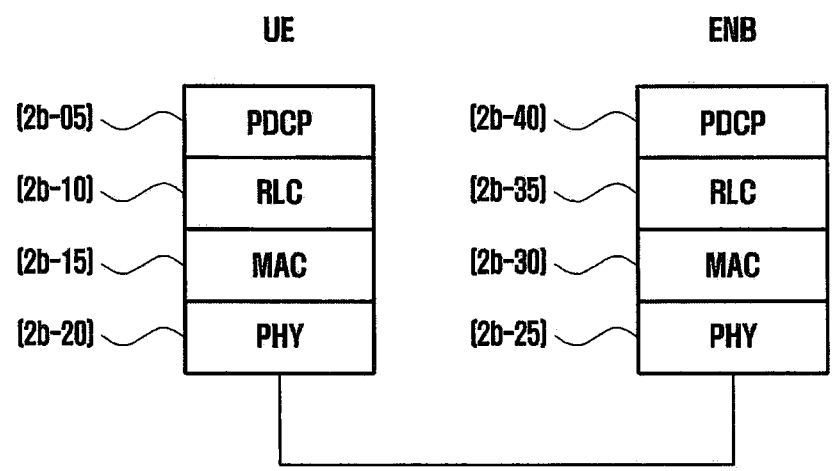
FIG. 2B is a diagram illustrating a wireless protocol structure of an LTE system for reference in order to explain the disclosure.

FIG. 2B is a diagram illustrating a wireless protocol structure of an LTE system for reference in order to explain the disclosure. The wireless protocol structure in the drawing may be different, in part, from that of an NR system, which will be defined later, but will be described for the convenience of explanation of the disclosure.

Referring to FIG. 2B, the wireless protocol of the LTE system includes a packet data convergence protocol (PDCP) 2$b$-05 or 2$b$-40, a radio link control (RLC) 2$b$-10 or 2$b$-35, and a medium access control (MAC) 2b-15 or 2b-30 in a terminal and an ENB, respectively. The packet data convergence protocol (PDCP) 2b-05 and 2b-40 performs operations, such as IP header compression/decompression and the like, and the radio link control (hereinafter, also referred to as "RLC") 2b-10 or 2b-35 reconfigures a PDCP PDU (packet data unit) to an appropriate size. The MAC 2b-15 or 2b-30 is connected to a plurality of RLC entities configured in a single terminal, multiplexes RLC PDUs into MAC PDUs, and demultiplexes RLC PDUs from MAC PDUs. The physical layers 2b-20 and 2b-25 channel-code and modulate upper layer data, and convert the same into OFDM symbols to then be transmitted through a wireless channel, or demodulate OFDM symbols received through a wireless channel and channel-decode the same to then be transmitted to upper layers. In addition, hybrid ARQ (HARQ) is also used for additional error correction in the physical layer, and the receiving end transmits 1 bit of information indicating whether or not a packet transmitted from the transmitting end has been received. This is called HARQ ACK/NACK information. Downlink HARQ ACK/NACK information with respect to uplink transmission may be transmitted through a physical hybrid-ARQ indicator channel (PHICH), and uplink HARQ ACK/NACK information with respect to downlink transmission may be transmitted through a physical uplink control channel (PUCCH) or a physical uplink shared channel (PUSCH).

Meanwhile, the PHY layer may include one or more frequencies/carriers, and a technique of simultaneously configuring and using a plurality of frequencies in a single base station is called "carrier aggregation" (hereinafter, referred to as "CA"). The CA technique may use a primary carrier and one or more subcarriers, instead of using one carrier, for communication between a terminal {or user equipment (UE)} and a base station (E-UTRAN NodeB or eNB), thereby dramatically increasing the amount of transmission in proportion to the number of subcarriers. Meanwhile, in the LTE system, a cell in the base station using a primary carrier is referred to as a "primary cell (PCell)", and a subcarrier is referred to as a "secondary cell (SCell)". A technique in which the CA function is extended to two base stations is called "dual-connectivity" (hereinafter, referred to as "DC"). In the DC technique, the terminal is simultaneously connected to a primary base station (master E-UTRAN NodeB; hereinafter, referred to as "MeNB") and a secondary base station (secondary E-UTRAN NodeB; hereinafter, referred to as "SeNB"), wherein cells belonging to the primary base station are called a "master cell group (MCG)" and cells belonging to the secondary base station are called a "secondary cell group (SCG)". The respective cell groups have representative cells. A representative cell of the master cell group is referred to as a "primary cell" (hereinafter, referred to as "PCell"), and a representative cell of the secondary cell group is referred to as a "primary secondary cell" (hereinafter, referred to as "PSCell"). When using the above-mentioned NR technology, the MCG may use LTE technology and the SCG may use NR technology, so that the terminal may simultaneously use the LTE and the NR.

Although not shown in the drawing, radio resource control (hereinafter, referred to as "RRC") layers exist in the upper layer of the PDCP layer of the terminal and the base station, respectively. The RRC layer may transmit and receive access/measurement-related configuration control messages for radio resource control. For example, it is possible to instruct the terminal to perform measurement using an RRC layer message, and the terminal may report a measurement result to the base station using an RRC layer message.

Figure 2C:
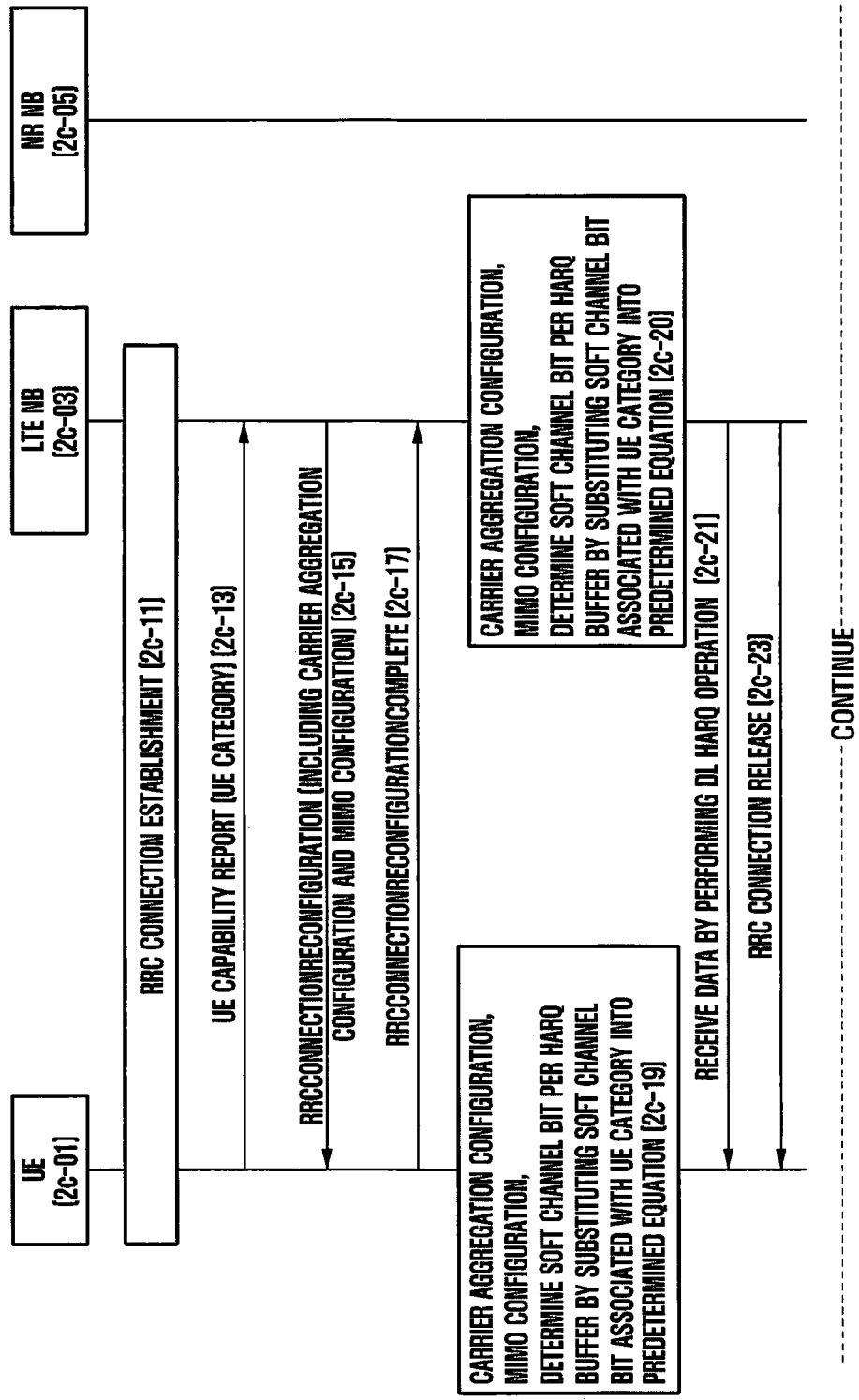
FIGS. 2CA and 2CB are diagrams illustrating examples of message pathways between a terminal and a base station when using a method of distributing a soft buffer size according to a second embodiment of the disclosure.
Figure 2C:
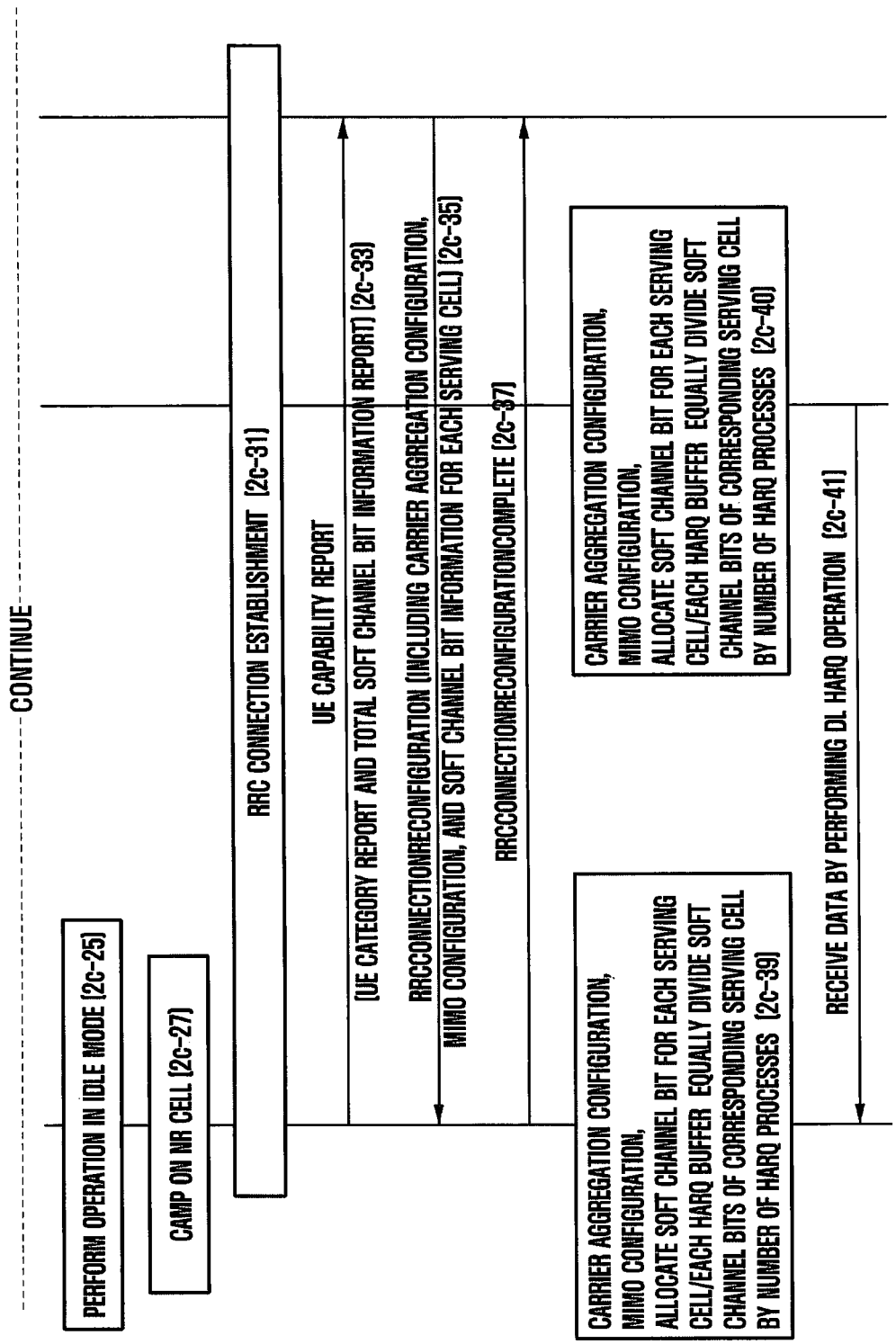

FIGS. 2CA and 2CB are diagrams illustrating examples of message pathways between a terminal and a base station when using a method of distributing a soft buffer size according to a second embodiment of the disclosure.

In FIGS. 2CA and 2CB, the terminal 2c-01 in an idle mode (RRC_IDLE) accesses a base station upon generation of transmission data or the like (2c-11). Data cannot be transmitted in the idle mode because the terminal is disconnected from a network to save power or the like. Thus, switching to a connected mode (RRC_CONNECTED) is required in order to transmit data. If the terminal is successfully connected to the base station 2c-03, the terminal switches to a connected mode (RRC_CONNECTED), so that the terminal in the connected mode is capable of transmitting and receiving data to and from the base station. However, if the base station fails to acquire buffer-related information of the terminal from the corresponding terminal (or from the previously stored core network), the base station is not aware of the amount of downlink data that the terminal is able to receive. Therefore, the base station must perform conservative operation until the corresponding information is provided so as to avoid an overflow of data due to the amount of transmitted data being larger than the buffer size.

Meanwhile, when the base station transmits data to the terminal, the data is channel-coded and transmitted so as to be corrected even if an error occurs, so that data is not lost. Accordingly, the base station actually transmits, to the terminal, channel-coded data of bits. The channel-coded data is N times larger than the original data (N is a real number) in some cases, and the channel-coded data is called "soft bits". The total number of soft bits that the terminal can process is called "the total number of soft channel bits". In the LTE, the total number of soft channel bits is defined as a fixed value for each category (type) of terminal. The following table shows the total number of soft channel bits for each terminal category.

TABLE 3

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |

TABLE 3-continued

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 4 | 150752 | 75376 | 1827072 | 2 |
| Category 5 | 299552 | 149776 | 3667200 | 4 |
| Category 6 | 301504 | 149776 (4 layers, 64QAM)75376 (2 layers, 64QAM) | 3654144 | 2 or 4 |
| Category 7 | 301504 | 149776 (4 layers, 64QAM)75376 (2 layers, 64QAM) | 3654144 | 2 or 4 |
| Category 8 | 2998560 | 299856 | 35982720 | 8 |
| Category 9 | 452256 | 149776 (4 layers, 64QAM)75376 (2 layers, 64QAM) | 5481216 | 2 or 4 |
| Category 10 | 452256 | 149776 (4 layers, 64QAM)75376 2 layers, 64QAM) | 5481216 | 2 or 4 |
| Category 11 | 603008 | 149776 (4 layers, 64QAM)195816 (4 layers, 256QAM) 75376 (2 layers, 64QAM) 97896 (2 layers, 256QAM) | 7308288 | 2 or 4 |
| Category 12 | 603008 | 149776 (4 layers, 64QAM)195816 (4 layers, 256QAM) 75376 (2 layers, 64QAM) 97896 (2 layers, 256QAM) | 7308288 | 2 or 4 |

As described above, if the base station fails to acquire buffer-related information of the terminal from the corresponding terminal (or from the previously stored core network), the base station is not aware of the amount of downlink data that the terminal is able to receive. Therefore, the base station must transmit the downlink data by assuming the smallest total number of soft channel bits defined according to the standard until the corresponding information is provided so as to avoid an overflow in the soft buffer size for storing soft bits of the terminal.

Since the base station does not have capability information of the terminal including the buffer-related information of the terminal as described above, the base station makes a request to the terminal for the corresponding information and receives capability information from the terminal (2c-13). In this case, when the terminal transmits LTE-related capability information as shown in this example, the terminal includes category information of the terminal in the capability information and transmits the same. As described above, the total number of soft channel bits corresponding to each terminal category is defined.

The base station receiving the information may recognize the capability of the terminal, and thus if the terminal supports the CA function or the MIMO function, the base station may configure the terminal so as to use the corresponding function (2c-15). The above configuration may be transmitted using an RRConnectionReconfiguration message of the RRC layer. In addition, the terminal transmits an acknowledgement message indicating that the configuration has been received using an RRConnectionReconfiguration-Complete message of the RRC layer (2c-17). In addition, the base station and the terminal apply configuration information, respectively, according to the above configuration (2c-19 and 2c-20).

The base station and the terminal, having transmitted and received the configuration, determine a soft buffer size ($N_{IR}$) for each hybrid automatic repeat request (HARQ) process for each serving cell. The HARQ probes is a unit that enables data transmission in parallel in a single serving cell. The value $N_{IR}$ is determined by Equation 1 below.

$$N_{IR} = \left\lfloor \frac{N_{soft}}{K_c \cdot K_{MIMO} \cdot \min(M_{DL\_HARQ}, M_{limit})} \right\rfloor \quad \text{[Equation 1]}$$

In Equation 1, the value $N_{soft}$ is the total number of soft channel bits in Table 3 above, Kc is a value determined according to the number of serving cells supported for each terminal category, KMIMO is a parameter that is varied depending on whether or not MIMO technology of simultaneous parallel transmission using a plurality of antennas is used, MDL_HARQ is the maximum number of HARQ processes (8 in the case of the FDD) in a single serving cell of the downlink, and Mlimit has a constant value of 8. That is, the base station calculates the soft buffer size for each HARQ process for each serving cell through category information of the terminal using the predetermined equation described above, and determines the amount of downlink data in consideration of the calculation. In addition, the terminal also determines the soft buffer size for each HARQ process as described above. The base station determines the amount of data to be transmitted to the terminal according to the determined amount and transmits the data to the terminal, and the terminal receives the same using the corresponding soft buffer (2c-21).

Thereafter, if there is no data to be transmitted to the terminal for a predetermined period of time, the base station may instruct the terminal to re-enter the idle mode (RRC_IDLE) (2c-23). To this end, an RRConnectionRelease message of the RRC layer may be used.

Thereafter, the terminal operates in the idle mode (2c-25). More specifically, the terminal performs reselection of neighbor cells due to the movement of the terminal according to neighbor cell-related information (e.g., the priority of frequencies used by a specific radio access technology such as LTE, NR, GSM, etc.) and cell-selection-related parameters, which are broadcast by the base station. The operation of selecting one cell as described above and staying in the cell is called "camping". Accordingly, it is possible to consider a scenario in which a terminal performing communication in the LTE system camps on an NR cell in the idle mode through movement (2c-27).

Subsequently, the terminal performs reconnection with the base station upon generation of transmission data or the like (2c-31). In this case, the example in the drawing assumes a scenario in which the terminal connects to an NR base station, and the terminal that has performed the connection procedure may transmit and receive data to and from the base station. However, even in this case, if the NR base station fails to acquire buffer-related information of the terminal from the corresponding terminal (or from the previously stored core network), the base station is not aware of the amount of downlink data that the terminal is able to receive. Therefore, the base station must perform conservative operation until the corresponding information is provided so as to avoid an overflow of data due to the amount of data transmitted to the terminal, being is larger than the buffer size.

Meanwhile, unlike the LTE system, the NR system expects that the base station (cell) and the terminal use various kinds of bandwidths. Accordingly, if the CA is used as in the case of LTE, the bandwidths may be different between respective serving cells. Therefore, it is necessary to distribute the soft buffer in consideration of the bandwidths of the respective serving cells.

As described above, the example in the drawing assumes a scenario in which the NR base station does not have capability information of the terminal including the buffer-related information of the terminal, and thus the base station makes a request to the terminal for the corresponding information and receives capability information from the terminal (2c-33). At this time, the terminal separately report information on the total number of soft channel bits, as well as NR category information of the terminal. Accordingly, the network obtains the capability information of the terminal, as well as the information on the total number of soft channel bits of the terminal.

The base station receiving the corresponding information may recognize the capability of the terminal, and thus if the terminal supports the CA function or the MIMO function, the base station may configure the terminal so as to use the corresponding function (2c-35). In this case, in the case of configuring the CA function, the terminal is configured with the CA function including soft channel bit information for each serving cell in the disclosure. The soft channel bit for each serving cell may be, for example, information directly indicating soft channel bits or percentage information about the total number of soft channel bits reported by the terminal. The above configuration may be transmitted using an RRConnectionReconfiguration message of the RRC layer. In addition, the terminal transmits an acknowledgement message indicating that the configuration has been received using an RRConnectionReconfigurationComplete message of the RRC layer (2c-37). In addition, the base station and the terminal apply configuration information, respectively, according to the above configuration (2c-39 and 2c-40).

The base station and the terminal, having transmitted and received the configuration determine a soft buffer size (NIR) for each HARQ process for each serving cell. In this case, the base station and the terminal allocate a soft buffer size for each HARQ process using the configured soft channel bit information for each serving cell. For example, the base station and the terminal may equally divide the soft channel bits of the corresponding serving cell by the number of HARQ processes supported for each serving cell. That is, if there are 8 HARQ processes that can be supported for each serving cell, the base station and the terminal allocate a value obtained by dividing the configured soft channel bit information for each serving cell by 8 as a soft buffer for each HARQ process, and then use the value for downlink data transmission and reception (2c-41).

Figure 2D:
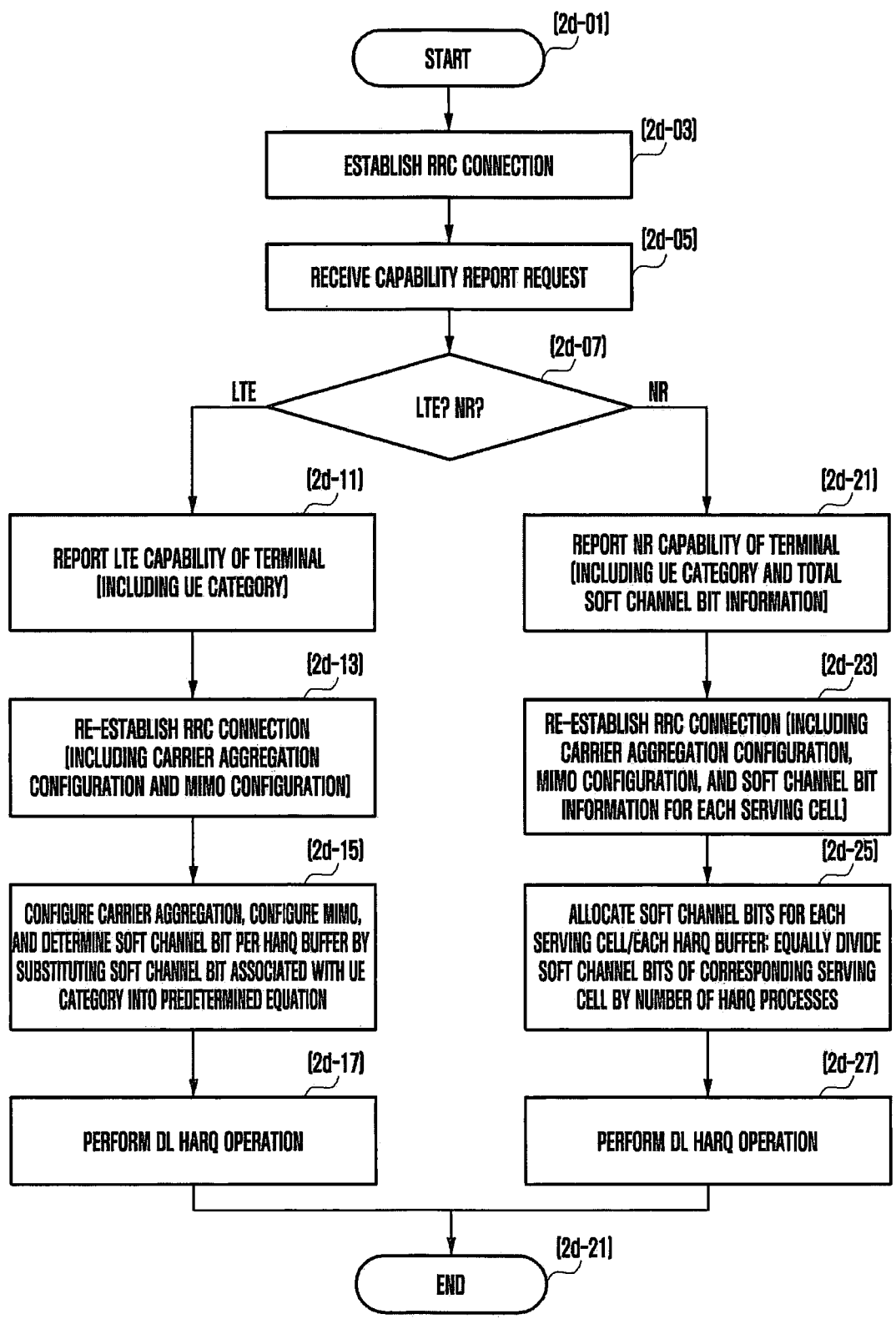
FIG. 2D is a flowchart illustrating the operation of a terminal according to a second embodiment of the disclosure.

FIG. 2D is a flowchart illustrating the operation of a terminal according to a second embodiment of the disclosure.

In this figure, it is assumed that the terminal is in the idle mode, and then the terminal accesses the base station upon the generation of data to be transmitted (2d-03). Data cannot be transmitted in the idle mode because the terminal is disconnected from a network to save power or the like. Thus, switching to a connected mode (RRC_CONNECTED) is required in order to transmit data. If the terminal is successfully connected to the base station, the terminal switches to a connected mode (RRC_CONNECTED), so that the terminal in the connected mode is capable of transmitting and receiving data to and from the base station.

Meanwhile, the terminal receives a request for transmission of capability information of the terminal from the base station (2d-05).

If the current terminal is the LTE (2d-07), the terminal transmits LTE-related capability information. In this case, the terminal includes category information of the terminal in the capability information and transmits the same (2d-11). As described in FIGS. 2CA and 2CB, the total number of soft channel bits corresponding to each terminal category is defined in LTE. The base station receiving the information may recognize the capability of the terminal, and thus if the terminal supports the CA function or the MIMO function, the base station may configure the terminal so as to use the corresponding function.

Thereafter, the terminal may be configured with the CA and MIMO functions by the base station, which may be transmitted using an RRConnectionReconfiguration message of the RRC layer (2d-13). In addition, the terminal transmits an acknowledgement message indicating that the configuration has been received using an RRConnectionReconfigurationComplete message of the RRC layer.

According to the configuration, the terminal applies configured configuration information (2d-15). In this case, the terminal determines a soft buffer size (NIR) for each HARQ process for each serving cell. The HARQ process is a unit that enables data transmission in parallel in one serving cell. The value NIR is determined using Equation 2 below.

$$N_{IR} = \left\lfloor \frac{N_{soft}}{K_c \cdot K_{MIMO} \cdot \min(M_{DL\_HARQ}, M_{limit})} \right\rfloor \quad \text{[Equation 2]}$$

In Equation 2, the value Nsoft is the total number of soft channel bits in the table described above, Kc is a value determined according to the number of serving cells supported for each terminal category, KMIMO is a parameter, which is varied depending on whether or not MIMO technology for simultaneous parallel transmission using a plurality of antennas is used, MDL_HARQ is the maximum number of HARQ processes (8 in the case of FDD) in one serving cell of the downlink, and Mlimit has a constant value of 8. Accordingly, the terminal determines the soft buffer size for each HARQ process as described above and receives downlink data using the soft buffer (2d-17).

If the current terminal is the NR (2d-07), the terminal transmits NR-related capability information (2d-21). At this time, in this example, the terminal further includes information on the total number of soft channel bits in the capability information, as well as NR category information of the terminal, and reports the same. Accordingly, the network obtains the capability information of the terminal including information on the total number of soft channel bits of the terminal. The base station receiving the corresponding information may recognize the capability of the terminal, and thus if the terminal supports the CA function or the MIMO function, the base station may configure the terminal so as to use the corresponding functions.

Thereafter, the terminal may be configured with the CA and MIMO functions by the base station, and the configuration includes soft channel bit information for each serving cell in the disclosure. The soft channel bit for each serving cell may be, for example, information directly indicating soft channel bits or percentage information about the total number of soft channel bits reported by the terminal. The above configuration information may be transmitted using an RRConnectionReconfiguration message of the RRC layer (2d-23). In addition, the terminal transmits an acknowledgement message indicating that the configuration has been received using an RRConnectionReconfigurationComplete message of the RRC layer.

According to the configuration, the terminal applies configured configuration information (2d-25). In this case, the terminal determines a soft buffer size (NIR) for each HARQ process for each serving cell. In this case, the base station and the terminal allocate a soft buffer size for each HARQ process using the configured soft channel bit information for each serving cell. For example, the base station and the terminal may equally divide the soft channel bits of the corresponding serving cell by the number of HARQ processes supported for each serving cell. That is, if there are 8 HARQ processes that can be supported for each serving cell, the base station and the terminal allocate a value obtained by dividing the configured soft channel bit information for each serving cell by 8 as a soft buffer for each HARQ process, and then use the value for downlink data transmission and reception (2d-27).

Figure 2E:
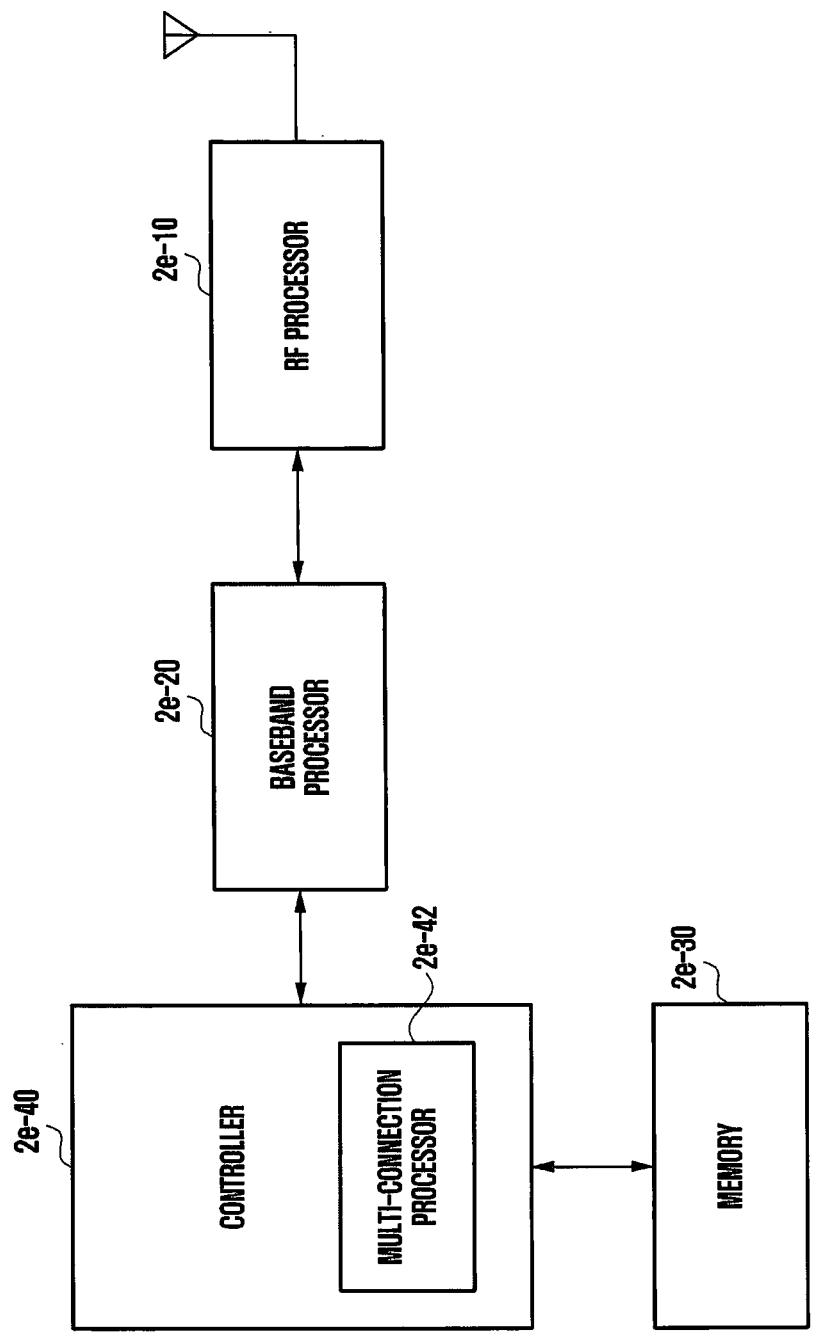
FIG. 2E is a block diagram illustrating the configuration of a terminal according to a second embodiment of the disclosure.

FIG. 2E is a block diagram showing the configuration of a terminal according to a second embodiment of the disclosure.

Referring to FIG. 2E, the terminal includes a radio frequency (RF) processor 2e-10, a baseband processor 2e-20, a memory 2e-30, and a controller 2e-40.

The RF processor 2e-10 performs a function of transmitting and receiving signals through a wireless channel, such as band conversion and amplification of a signal. That is, the RF processor 2e-10 up-converts a baseband signal provided from the baseband processor 2e-20 to an RF band signal to thus transmit the same through an antenna and down-converts an RF band signal received through the antenna to a baseband signal. For example, the RF processor 2e-10 may include a transmission filter, a reception filter, an amplifier, a mixer, an oscillator, a digital-to-analog converter (DAC), an analog-to-digital converter (ADC), and the like. Although only one antenna is shown in FIG. 2E above, the terminal may have a plurality of antennas. In addition, the RF processor 2e-10 may include a plurality of RF chains. Further, the RF processor 2e-10 may perform beamforming. To perform beamforming, the RF processor 2e-10 may adjust the phases and magnitudes of signals transmitted and received through a plurality of antennas or antenna elements.

The baseband processor 2e-20 performs a function of conversion between a baseband signal and a bit string according to a physical layer specification of the system. For example, in the case of data transmission, the baseband processor 2e-20 encodes and modulates transmission bit strings, thereby generating complex symbols. In addition, upon receiving data, the baseband processor 2e-20 demodulates and decodes a baseband signal provided from the RF processor 2e-10 to thus recover reception bit strings. For example, in the case where an orthogonal frequency division multiplexing (OFDM) scheme is applied, when transmitting data, the baseband processor 2e-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 2e-20 divides the baseband signal provided from the RF processor 2e-10 into OFDM symbol units, restores the signals mapped with the subcarriers through a fast Fourier transform (FFT) operation, and then restores reception bit strings through demodulation and decoding.

The baseband processor 2e-20 and the RF processor 2e-10 transmit and receive signals as described above. Accordingly, the baseband processor 2e-20 and the RF processor 2e-10 may be referred to as a "transmitter", a "receiver", a "transceiver", or a "communication unit". In addition, at least one of the baseband processor 2e-20 and the RF processor 2e-10 may include different communication modules for processing signals of different frequency bands. The different frequency bands may include super high frequency (SHF) (e.g., 2.5 GHz or 5 GHz) band and a millimeter wave (e.g., 60 GHz) band.

The memory 2e-30 stores data such as basic programs, application programs, and configuration information for the operation of the terminal.

The controller 2e-40 controls the overall operation of the terminal. For example, the controller 2e-40 transmits and receives signals through the baseband processor 2e-20 and the RF processor 2e-10. In addition, the controller 2e-40 records and reads data in and from the memory 2e-40. To this end, the controller 2e-40 may include at least one processor. For example, the controller 2e-40 may include a communication processor (CP) for controlling communication and an application processor (AP) for controlling upper layers such as application programs. According to an embodiment of the disclosure, the controller 2e-40 may include a multi-connection processor 2e-42 for performing a process for operation in a multi-connection mode. For example, the controller 2e-40 may perform control such that the terminal performs the operation of the terminal shown in FIG. 2E.

According to the second embodiment of the disclosure, the terminal may transmit, to the NR base station, information on the category and the total number of soft channel bits of the terminal in the initial connection to the base station, and may then receive soft channel bit information for each serving cell from the NR base station, thereby allocating soft channel bits for each HARQ buffer.

Third Embodiment

Figure 3A:
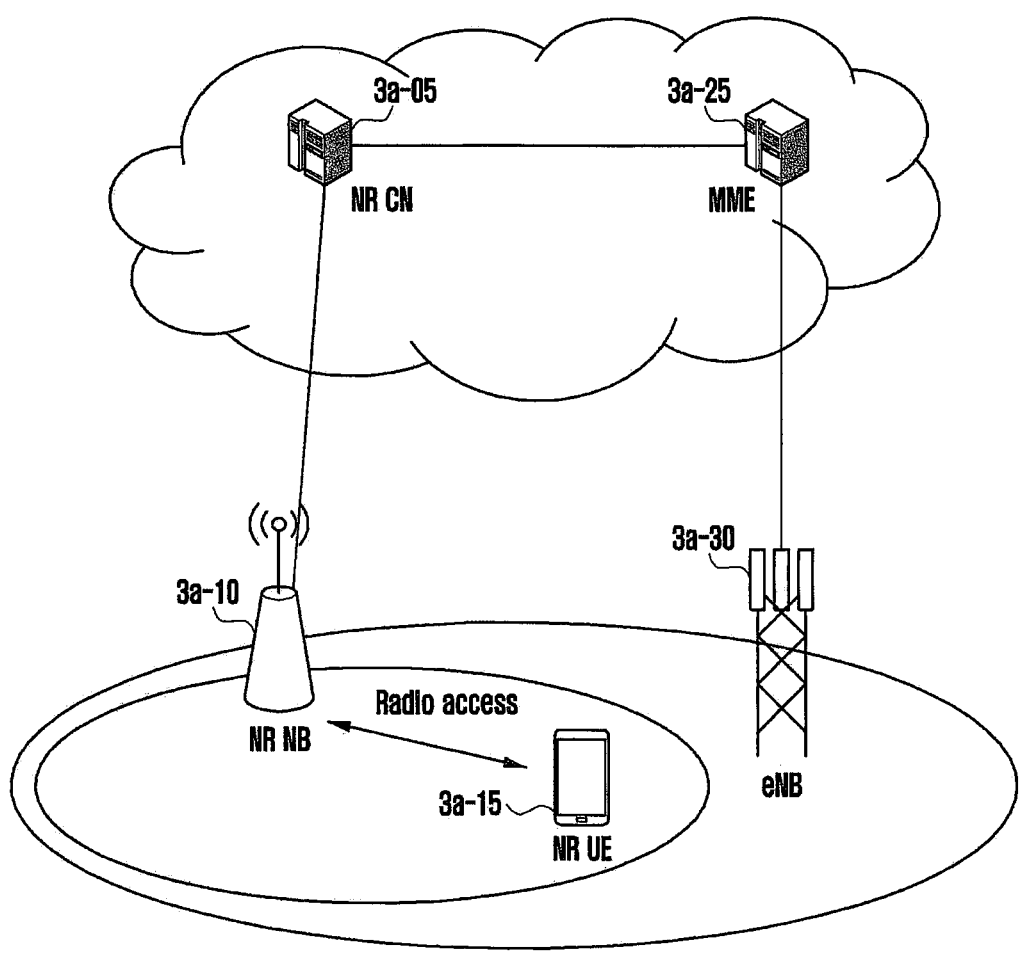
FIG. 3A is a diagram illustrating the structure of a next-generation mobile communication system to which the disclosure is applied.

FIG. 3A is a diagram illustrating the structure of a next-generation mobile communication system to which the disclosure is applied.

Referring to FIG. 3A, a wireless access network of a next-generation mobile communication system includes a new radio nodeB (hereinafter, referred to as an "NR NB") 3a-10 and a new radio core network (NR CN) 3a-05 as shown in the drawing. New radio user equipment (hereinafter, referred to as "NR UE" or a "terminal") 3a-15 accesses an external network through the NR NB 3a-10 and the NR CN 3a-05.

In FIG. 3A, the NR NB 3a-10 corresponds to an evolved nodeB (eNB) of an existing LTE system. The NR NB is connected to the NR UE 3a-15 through a wireless channel, and may provide services superior to those of the existing nodeB. In the next-generation mobile communication system, since all user traffic is served through a shared channel, a device for collecting status information, such as buffer status, available transmission power status, and channel status of UEs, and performing scheduling is required. The NR NB 3a-10 serves as such a device. One NR NB typically controls multiple cells. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. Further, an adaptive modulation and coding (hereinafter, referred to as "AMC") scheme is applied to determine a modulation scheme and a channel coding rate in accordance with the channel status of a terminal. The NR CN 3a-05 performs functions such as mobility support, bearer configuration, and QoS configuration. The NR CN 3a-05 is a device that performs various control functions, as well as a mobility management function for a terminal, and is connected to a plurality of base stations. In addition, the next-generation mobile communication system may interwork with the existing LTE system, and the NR CN 3a-05 is connected to an MME 3a-25 through a network interface. The MME 3a-25 is connected to the eNB 3a-30, which is an existing base station.

Figure 3B:
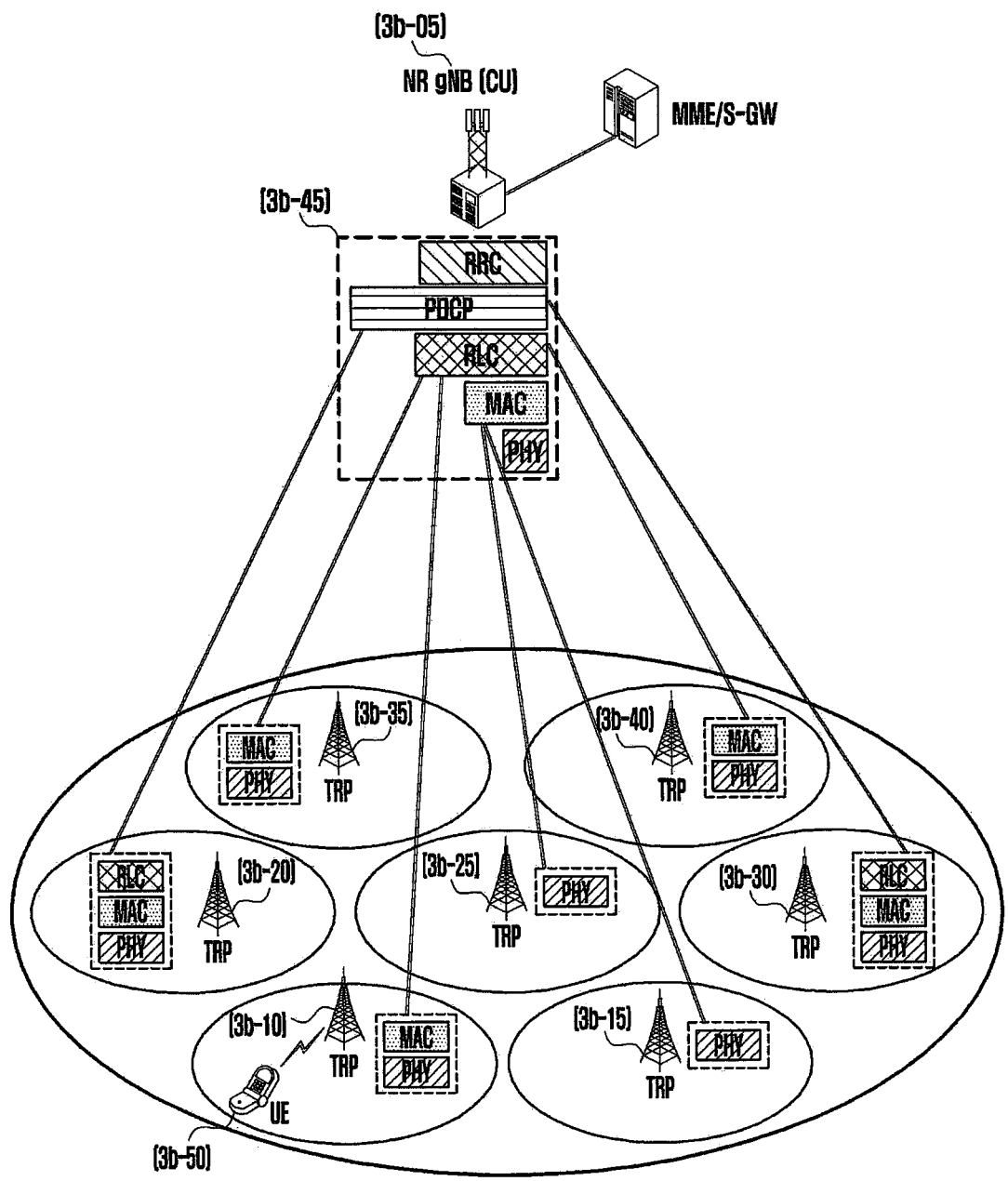
FIG. 3B is a diagram illustrating the structure of another next-generation mobile communication system to which the disclosure may be applied.

FIG. 3B is a diagram illustrating the structure of another next-generation mobile communication system to which the disclosure may be applied.

Referring to FIG. 3B, a cell served by a beam-based NR gNB 3b-05 may include a plurality of transmission reception points (TRPs) 3b-10, 3b-15, 3b-20, 3b-25, 3b-30, 3b-35, and 3b-40. The TRPs 3b-10 to 3b-40 are blocks in which some functions for transmitting and receiving physical signals are separated in the existing LTE base station (eNB), and include a plurality of antennas. The NR gNB 3b-05 may be expressed as a central unit (CU), and the TRP may be expressed as a distributed unit (DU). The functions of the NR gNB 3b-05 and the TRP may be configured by separating layers such as PDCP/RLC/MAC/PHY layers, as denoted by 3b-45. That is, the TRP may have only the PHY layer, thereby performing the function of the corresponding layer (3b-15 and 3b-25), the TRP may have only the PHY layer and the MAC layer, thereby performing the functions of the corresponding layers (3b-10, 3b-35, and 3b-40), and the TRP may have only the PHY layer, the MAC layer, and the RLC layer, thereby performing the functions of the corresponding layers (3b-20 and 3b-30). In particular, the TRPs 3b-10 to 3b-40 may use a beamforming technique of generating narrow beams in various directions using a plurality of transmission/reception antennas to transmit and receive data. The user equipment 3b-50 accesses the NR gNB 3b-05 and an external network through the TRPs 3b-10 to 3b-40. In order to provide services to users, the NR gNB 3b-05 collects status information, such as buffer status, available transmission power status, and channel status of the terminals, and performs scheduling, thereby supporting connections between the terminals and the core network (CN).

Figure 3C:
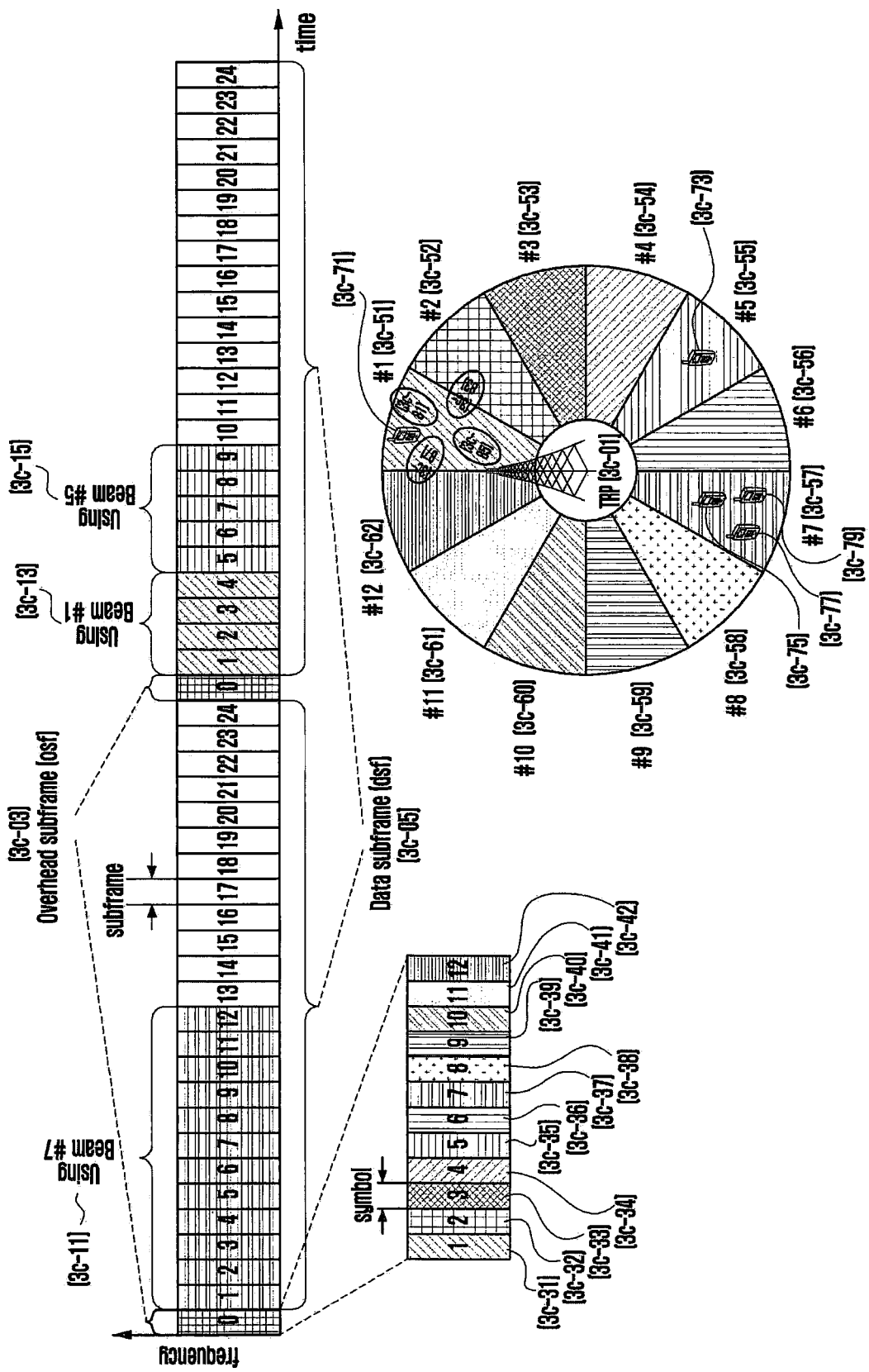
FIG. 3C is a diagram of an example of a frame structure used by an NR system to which the disclosure is applied.

FIG. 3C is a diagram illustrating an example of a frame structure used by the NR system to which the disclosure is applied.

The NR system aims at a higher transmission rate than LTE and under consideration therefor is a scenario of operating at high frequencies to ensure wide frequency bandwidths. In particular, the NR system may consider a scenario in which data is transmitted to the terminal at a high data rate by generating directional beams at a high frequency.

Accordingly, it is possible to consider a scenario in which a base station or a transmission reception point (TRP) 3c-01 communicates with terminals 3c-71, 3c-73, 3c-75, 3c-77, and 3c-79 in the cell using different beams from each other. That is, in the illustrated example, a scenario in which terminal 1 (3c-71) performs communication using beam #1 (3c-51), terminal 2 (3c-73) performs communication using beam #5 (3c-55), and terminals 3, 4, and 5 (3c-75, 3c-77, and 3c-79) performs communication through beam #7 (3c-57) is assumed.

In order to measure the beam the terminal uses to communicate with the TRP, an overhead subframe (hereinafter, referred to as "osf") 3c-03 in which a common overhead signal is transmitted exist in time. The osf includes a primary synchronization signal (PSS) for obtaining timing of an orthogonal frequency division multiplexing (OFDM) symbol, a secondary synchronization signal (SSS) for detecting a cell ID, an extended synchronization signal (ESS) for obtaining timing of a subframe, and a beam reference signal (BRS) for identifying a beam. In addition, a physical broadcast channel (PHCH) including system information, a master information block (MIB), or information essential for a terminal to access the system (e.g., a bandwidth of a downlink beam, a system frame number, and the like, which are stored) may be transmitted. In addition, in the osf, the base station transmits a reference signal using different beams between symbols (or over several symbols). A beam index value for distinguishing between respective beams may be derived from the reference signal. In the illustrated example, it is assumed that there are twelve beams from beam #1 (3c-51) to beam #12 (3c-62), which are transmitted by the base station, and different beams are swept and transmitted for the respective symbols in the osf. That is, different beams are transmitted for the respective symbols {for example, beam #1 (3c-51) is transmitted in a first symbol (3c-31)} in the osf, and the terminal measures the osf, thereby determining the beam having the strongest signal among the beams transmitted in the osf.

In the illustrated example, it is assumed that the corresponding osf is repeated every 25 subframes, and that the remaining 24 subframes are data subframes (hereinafter, referred to as "dsfs") 3c-05 in which general data is transmitted and received. Accordingly, a scenario in which terminals 3, 4, and 5 (3c-75, 3c-77, and 3c-79) perform communication using beam #7 in common (3c-11), terminal 1 (3c-71) performs communication using beam #1 (3c-13), and terminal 2 (3c-73) performs communication using beam #5 (3c-15) according to scheduling of the base station is assumed.

Although the exemplary drawing illustrates mostly transmission beams of the base station from beam #1 (3c-51) to beam #12 (3c-62), it is possible to further consider reception beams of the terminal {e.g., 3c-81, 3c-83, 3c-85, and 3c-87 of terminal 1 (3c-71)} for receiving the transmission beams of the base station. In the illustrated example, terminal 1 has four beams 3c-81, 3c-83, 3c-85, and 3c-87 and performs beam sweeping in order to determine the beam having the best reception performance. In this case, if a plurality of beams cannot be used at the same time, a number of osfs equal to the number of reception beams are received using a single reception beam for each osf, thereby finding the optimal transmission beam of the base station and the optimal reception beam of the terminal.

Figure 3D:
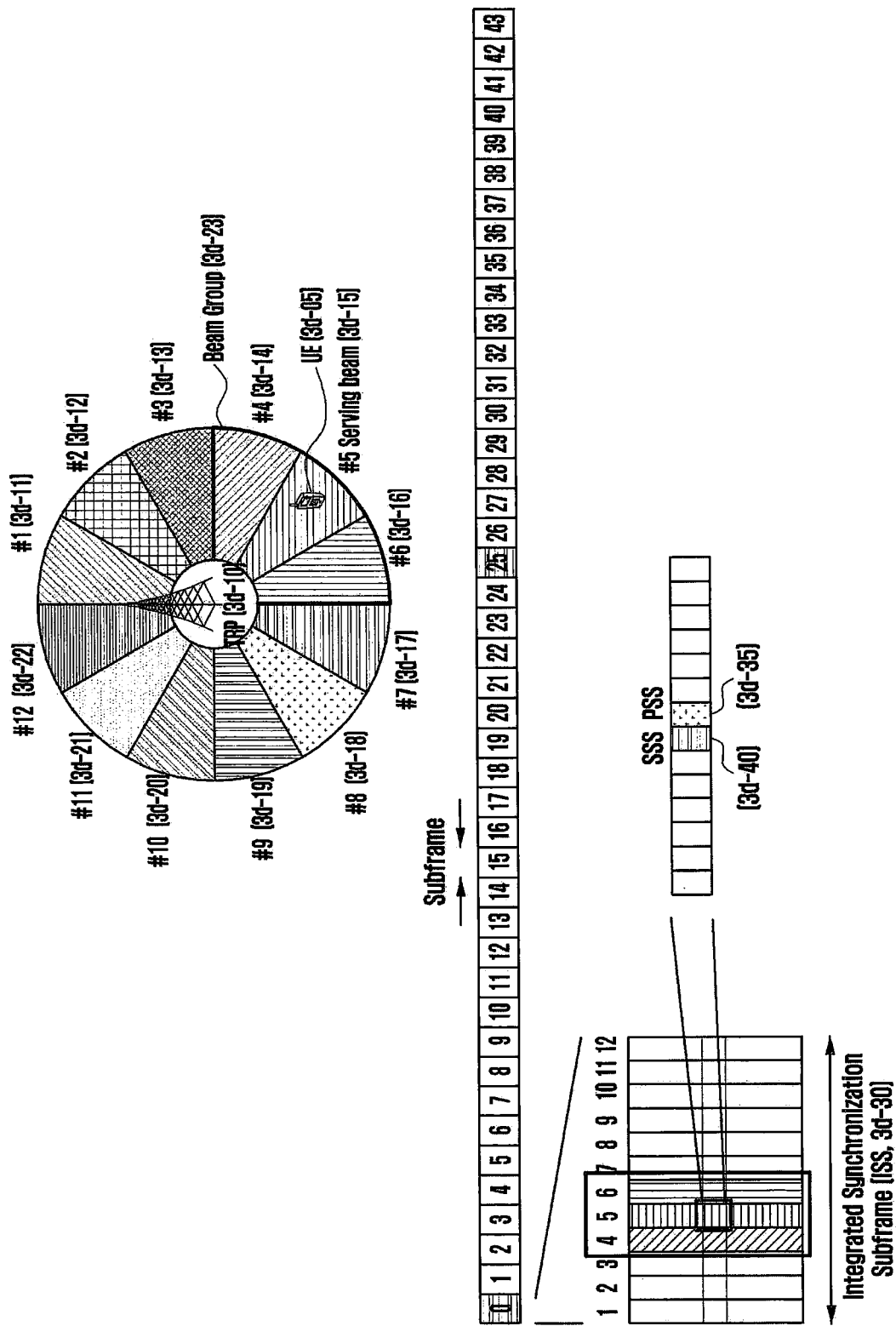
FIG. 3D is a diagram illustrating the structure of a subframe in which a synchronization signal is transmitted in a next-generation mobile communication system.

FIG. 3D is a diagram showing the structure of a subframe in which a synchronization signal is transmitted in a next-generation mobile communication system.

A TRP 3d-10 transmits directional downlink signals through 12 beams 3d-11 to 3d-22. In order to measure the beam that the terminal uses to communicate with the TRP, the terminal 3d-05 receives a PSS 3d-35 for obtaining timing of a symbol, an SSS 3d-40 for detecting a cell ID, an ESS for obtaining timing of a subframe, a BRS for identifying a beam, and the like. A beam index value for distinguishing between the respective beams may be derived from the reference signal. In the illustrated example, it is assumed that different beams are swept and transmitted for the respective symbols in the osf. The terminal 3d-05 receives a plurality of first downlink signals xSS in a first subframe 3d-30. The first subframe denotes a subframe in which a plurality of synchronization signals is transmitted, and is referred to as an "integrated synchronization subframe (ISS)". That is, the ISS, among the osfs, is defined as a subframe in which a synchronization signal is transmitted. The first downlink signal is based on a PSS/SSS, and an ESS may be added at a high frequency using a beam, wherein a signal may be transmitted in the time interval in which the corresponding beam is transmitted for each beam. That is, one first subframe 3d-30 includes n consecutive time intervals (symbols), and the first downlink signal is transmitted in each time interval. Alternatively, in case of sub-6 GHz, the first downlink signal is transmitted in the first time interval, and the other downlink signals are transmitted in the remaining time intervals. In particular, the terminal 3d-05 may receive only the first downlink signal of a serving cell/serving beam 3d-15, or may receive the first downlink signal transmitted in a beam group 3d-23 including the serving cell/serving beam and surrounding beams adjacent thereto.

The channel measurement using the synchronization signal as described above may be used particularly for the channel measurement of the terminal in the IDLE mode. In this case, it may be configured so as to broadcast system information with a long discontinuous transmission (DTX) interval for power efficiency in the network. For example, if a DTX interval of 100 ms is configured, an xSS signal, which is a synchronization signal for the terminal in IDLE mode, may also be a signal transmitted at a period of 100 ms. Therefore, if the synchronization signal (xSS) is transmitted at a period of about 100 ms, it is possible to broadcast the approximate time information for transmitting the xSS signal as system information. The disclosure proposes a detailed solution for the above-mentioned matters.

Figure 3E:
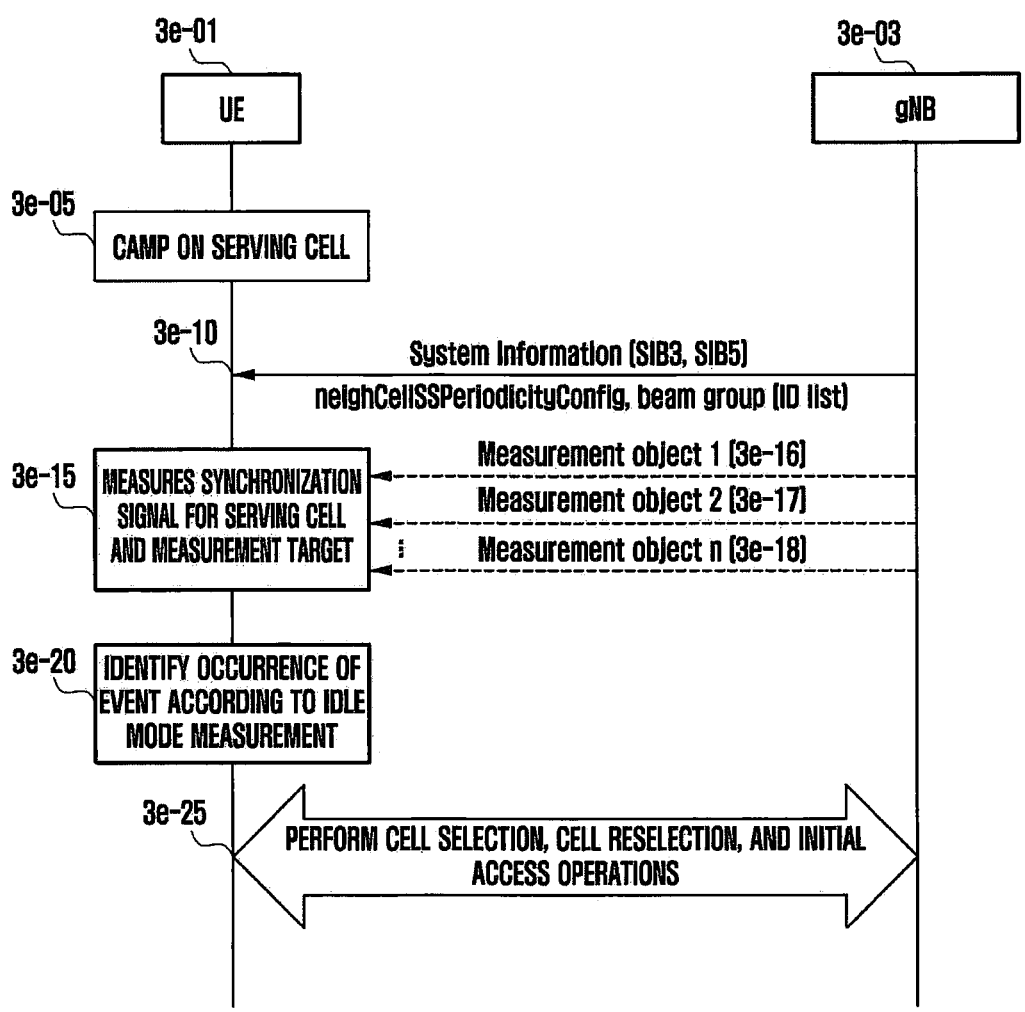
FIG. 3E is a diagram for explaining the overall operation of channel measurement using a synchronization signal according to a third embodiment of the disclosure.

FIG. 3E is a diagram for explaining the overall operation of channel measurement using a synchronization signal according to a third embodiment of the disclosure.

A terminal 3e-01 in the idle mode (RRC_IDLE) finds a suitable cell, camps on the corresponding base station 3e-03 (3e-05), and then receives system information from the base station (3e-10). Data cannot be transmitted in the idle mode because the terminal is disconnected from a network to save power or the like. Thus, switching to a connected mode (RRC_CONNECTED) is required for data transmission. In addition, "camping" means that the terminal is staying in the corresponding cell and is receiving a paging message to determine whether or not data is coming in the downlink. Further, the system information may be minimum system information (MSI) broadcasted periodically by the base station, or may be other system information (OSI) provided on demand in response to a request from the terminal. In the case of the MSI, the terminal may identify the MSI in the IDLE status without switching to the RRC connected state. In the case of the OSI, the terminal may request necessary information in an on-demand manner, and may then receive the same in a dedicated or broadcast form. If the information is transmitted in the form of MSI, SIB2 may contain the following information, and if the information is transmitted in the form of OSI, SIB3 and SIB5 may contain the following information:

1. Notification of beam id list for searching for neighbor cells through SIB3 and a measurement object (an RRC message)

2. Broadcasting approximate time information for transmitting the xSS signal, which is a synchronous signal, using system information (SIB3 and SIB5) or an RRC message A constant search for neighbor cells by the terminal in a big cell (a cell including a plurality of TRPs) consumes a large amount of battery power. Therefore, the first information above is used for the purpose of reducing the power loss of the terminal by the operation in which the serving cell informs of information on the beam that the terminal must measure, among the beams belonging to the TRPs of the neighbor cells, through exchange of information between networks.

In the case of the second information above, the terminal in the IDLE mode is aware of transmission time information of the synchronization signal (xSS) transmitted from the serving cell, but is not aware of time information of the synchronization signal (xSS) transmitted from the neighbor cell. Thus, it is necessary to monitor and measure the resources of the corresponding frequency band all the time in order to measure the synchronization signal (xSS) of the neighbor cell. In addition, as described above, the first information and the second information may be transmitted through the MSI (SIB2). In order to reduce the power consumption of the terminal due to the above operation, the base station may provide notification of the transmission time of the synchronization signal (xSS) of the neighbor cell, similarly to neighCellConfig of the LTE.

For reference, neighCellConfig in the LTE has the following structure.

NeighCellConfig

The IE NeighCellConfig is used to provide the information related to MBSFN and TDD UL/DL configuration of neighbor cells.

NeighCellConfig information element
ASN1 START
NeighCellConfig:=BIT STRING (SIZE (2))
ASN1STOP

| NeighCellConfig field descriptions |
| --- |
| neighCellConfig<br>Provides information related to MBSFN and TDD U/DL configuration of neighbor cells of this frequency<br>   00: Not all neighbor cells have the same MBSFN subframe allocation as the serving cell on this frequency, if configured, and as the PCell otherwise<br>   10: The MBSFN subframe allocations of all neighbor cells are identical to or subsets of that in the serving cell on this frequency, if configured, and of that in the PCell otherwise<br>   01: No MBSFN subframes are present in all neighbor cells<br>   11: Different UL/DL allocation in neighboring cells for TDD compared to the serving cell on this frequency, if configured, and compared to the PCell otherwise<br>    For TDD, 00, 10 and 01 are only used for same UL/DL allocation in neighboring cells compared to the serving cell on this frequency, if configured, and compared to the PCell otherwise. |

Similarly to the above neighCellConfig, neighCellSSPeriodicityConfig containing the information listed in Table 5 below may be broadcast in SIB3 and SIB5.

TABLE 5

| neighCellSSPeriodicityConfig |
| --- |
|    00: The xSS periods of all neighbor cells are the same as that of the current cell, and the signal is transmitted in a time interval (+/− x ms) similar to the current cell. That is, the neighbor cell xSS is searched for based on the xSS transmission time of the current cell.<br>   01: The xSS periods of some neighbor cells are the same as that of the current cell, and the signal is transmitted in a time interval similar to that of the current cell. The neighbor cell xSS is preferentially searched for by applying the xSS time interval of the current cell. If the search result is unsatisfactory, the xSS search interval is increased.<br>   10: The above condition is not established, and the xSS is searched for in all the time intervals to measure the neighbor cells.<br>   11: reserved |

That is, the neighCellSSPeriodicityConfig may include 2 bits of information for searching for xSS time information of the neighbor cells listed in Table 5, a time information value corresponding to x ms when bit "00" is selected, and xSS search interval information when bit "01" is selected. The following search window may be introduced for the xSS search interval information.

xSS searchWindowList=sequence of xSSSearchWindow
xSSsearchWindow=sequence of window length & offset The terminal measures the synchronization signal (xSS) transmitted from the beams of the serving cell and the configured neighbor cells according to the configuration received from the system information (3e-15). That is, the terminal performs measurement with respect to the serving cell and the neighbor cells corresponding to respective measurement object IDs (3e-16 to 3e-18). Thereafter, the terminal identifies the occurrence of an event through a measurement value measured using the synchronization signal of the serving cell and the neighbor cells (3e-20), and determines the subsequent operation according to the current status of the terminal (3e-25). The above event is performed if the following procedure is satisfied as in LTE.

1. Neighbor cell is of high priority and received signal power/quality level is better than thresholdHigh limit; or
2. Neighbor cell is of lower priority and serving received signal power/quality level is below the thresholdLow limit and the neighbor received signal power/quality is above the thresholdLow; and
3. More than 1 second has elapsed since the UE camped on the current serving cell.

The terminal performs cell selection, cell reselection, and initial access operations according to the current status of the terminal (3e-25). That is, if there is no serving cell, the terminal performs a cell selection operation; if the terminal switches the serving cell from the serving cell on which the terminal is camping to a neighbor cell according to a measured value, the terminal performs a cell reselection operation; and if it is necessary to change the cell according to a measurement value and to connect to the corresponding cell, the terminal performs an initial access operation.

Figure 3F:
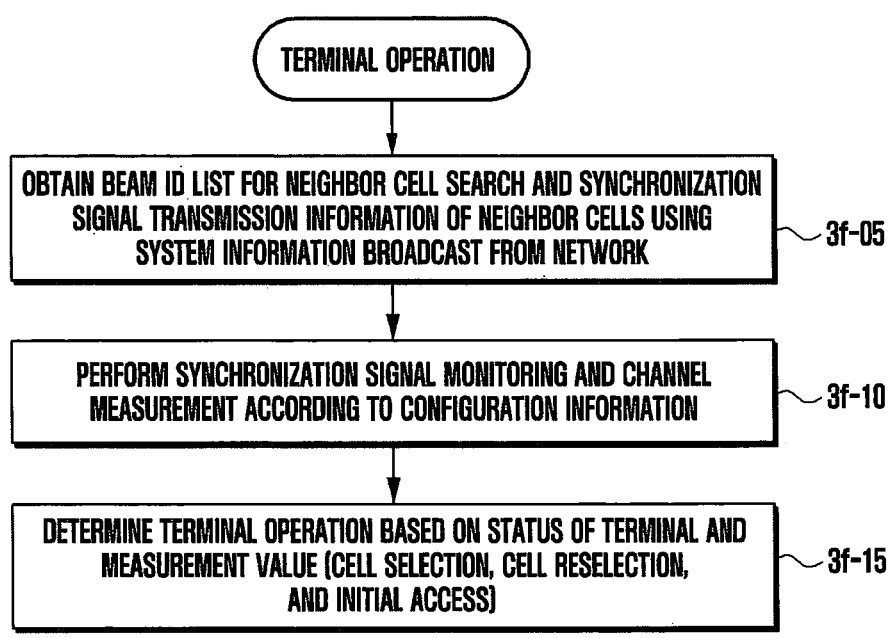
FIG. 3F is a diagram for explaining the channel measurement operation using a synchronization signal of a terminal in an IDLE state according to a third embodiment of the disclosure.

FIG. 3F is a diagram explaining a channel measurement operation using a synchronization signal of a terminal in the IDLE mode according to a third embodiment of the disclosure.

The terminal of the disclosure obtains a beam ID list for a neighbor-cell search and synchronization signal time information of neighbor cells using system information received from the NR base station (3f-05).

The terminal performs synchronization signal (xSS) monitoring and channel measurement according to the method configured in step 3f-05 (3f-10). If the xSS signal is transmitted from the beam IDs of all neighbor cells specified in the system information in the same time interval as the current serving cell (in the case of receiving the time interval information bit "00" in neighCellSSPeriodicityConfig), the terminal searches for the neighbor cell xSS in a similar time interval (+/−x ms) based on the xSS transmission time of the current cell. If the xSS signal is transmitted in the beam IDs of some neighbor cells specified in the system information in the same time interval as the current serving cell (in the case of receiving the time interval information bit "01" in neighCellSSPeriodicityConfig), the terminal searches for the neighbor cell xSS in a similar time interval (+/−x ms) based on the xSS transmission time of the current cell, and if the search result is unsatisfactory, the terminal increases the xSS search interval. The increased search interval refers to information configured in xSSSearchWindowList. If the xSS signal is not transmitted in the beam IDs of all neighbor cells specified in the system information in the same time interval as the current serving cell (in the case of receiving the time interval information bit "10" in neighCellSSPeriodicityConfig), the terminal searches for the xSS in all of the time intervals for neighbor cell measurement.

The terminal determines an operation suitable for the current status of the terminal based on the measurement value defined above (3f-20). That is, if there is no serving cell, the terminal performs a cell selection operation; if the terminal switches the serving cell from the serving cell on which the terminal is camping to a neighbor cell according to a measured value, the terminal performs a cell reselection operation; and if it is necessary to change the cell according to a measurement value and to connect to the corresponding cell, the terminal performs an initial access operation.

Figure 3G:
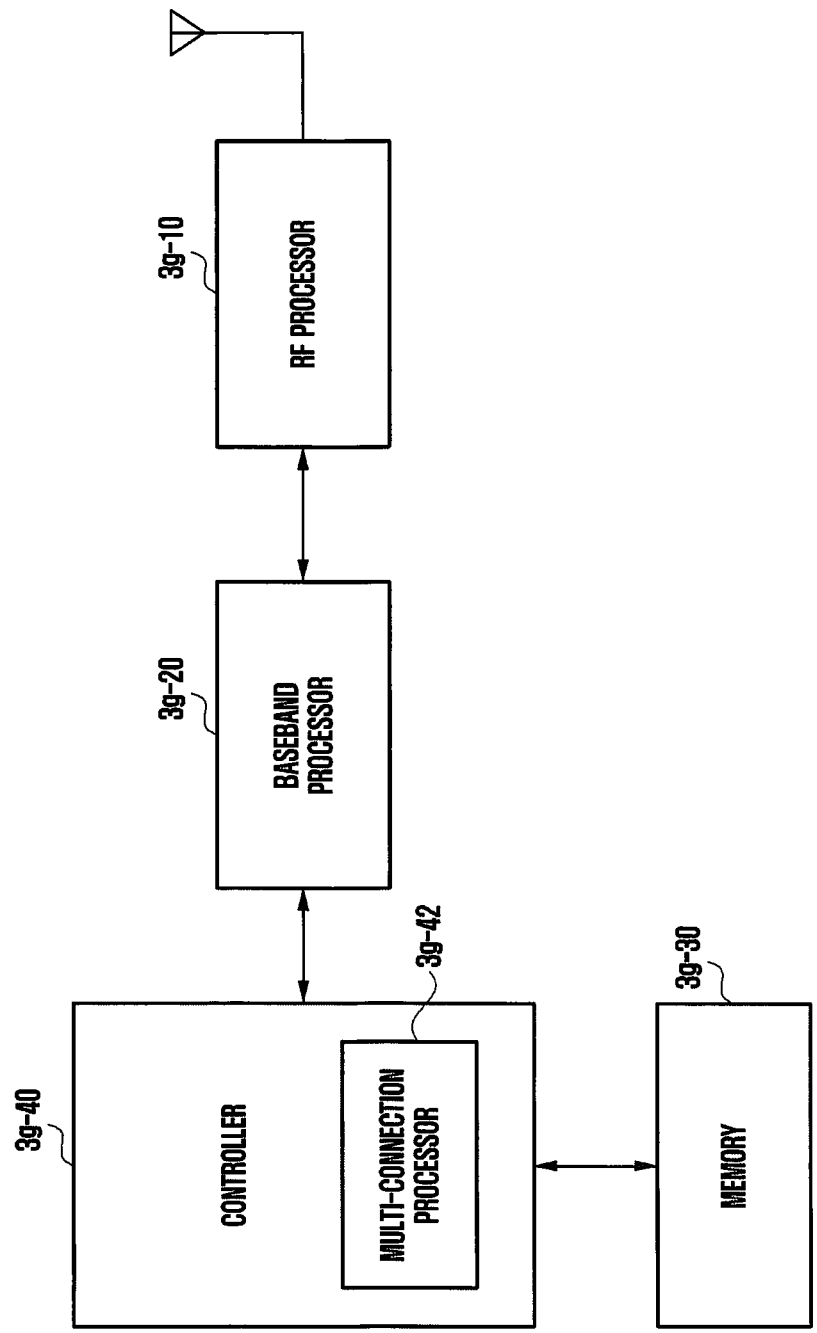
FIG. 3G is a block diagram illustrating the internal structure of a terminal according to a third embodiment of the disclosure.

FIG. 3G is a block diagram illustrating the internal structure of a terminal according to a third embodiment of the disclosure.

Referring to FIG. 3G, the terminal includes a radio frequency (RF) processor 3g-10, a baseband processor 3g-20, a memory 3g-30, and a controller 3g-40.

The RF processor 3g-10 performs a function of transmitting and receiving a signal through a wireless channel, such as band conversion and amplification of a signal. That is, the RF processor 3g-10 up-converts a baseband signal provided from the baseband processor 3g-20 to an RF band signal to thus transmit the same through an antenna and down-converts an RF band signal received through the antenna to a baseband signal. For example, the RF processor 3g-10 may include a transmission filter, a reception filter, an amplifier, a mixer, an oscillator, a digital-to-analog converter (DAC), an analog-to-digital converter (ADC), and the like. Although only one antenna is shown in the drawing, the terminal may have a plurality of antennas. In addition, the RF processor 3g-10 may include a plurality of RF chains. Further, the RF processor 3g-10 may perform beamforming. To perform beamforming, the RF processor 3g-10 may adjust the phases and magnitudes of signals transmitted and received through a plurality of antennas or antenna elements. In addition, the RF processor may perform MIMO, and may receive multiple layers when performing the MIMO operation.

The baseband processor 3g-20 performs a function of conversion between a baseband signal and a bit string according to a physical layer specification of the system. For example, in the case of data transmission, the baseband processor 3g-20 encodes and modulates transmission bit strings, thereby generating complex symbols. In addition, upon receiving data, the baseband processor 3g-20 demodulates and decodes a baseband signal provided from the RF processor 3g-10 to thus recover reception bit strings. For example, in the case where an orthogonal frequency division multiplexing (OFDM) scheme is applied, when transmitting data, the baseband processor 3g-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 3g-20 divides the baseband signal provided from the RF processor 3g-10 into OFDM symbol units, restores the signals mapped with the subcarriers through a fast Fourier transform (FFT) operation, and then restores reception bit strings through demodulation and decoding.

The baseband processor 3g-20 and the RF processor 3g-10 transmit and receive signals as described above. Accordingly, the baseband processor 3g-20 and the RF processor 3g-10 may be referred to as a "transmitter", a "receiver", a "transceiver", or a "communication unit". Further, at least one of the baseband processor 3g-20 and the RF processor 3g-10 may include a plurality of communication modules to support a plurality of different wireless access technologies. In addition, at least one of the baseband processor 3g-20 and the RF processor 3g-10 may include different communication modules for processing signals of different frequency bands. For example, the different wireless access technologies may include a wireless LAN (e.g., IEEE 802.11), a cellular network (e.g., LTE), and the like. In addition, the different frequency bands may include super high frequency (SHF) (e.g., 2.NRHz or NRhz) band and a millimeter wave (e.g., 60 GHz) band.

The memory 3g-30 stores data such as basic programs, application programs, and configuration information for the operation of the terminal. In particular, the memory 3g-30 may store information related to an access node (e.g., a base station) that performs wireless communication using a wireless access technology. In addition, the memory 3g-30 provides stored data in response to a request from the controller 3g-40.

The controller 3g-40 controls the overall operation of the terminal. For example, the controller 3g-40 transmits and receives signals through the baseband processor 3g-20 and the RF processor 3g-10. In addition, the controller 3g-40 records and reads data in and from the memory 3g-40. To this end, the controller 3g-40 may include at least one processor. For example, the controller 3g-40 may include a communication processor (CP) for controlling communication and an application processor (AP) for controlling upper layers such as application programs. The controller 3g-40 may include a multi-connection processor 3g-42 for performing a process for operation in a multi-connection mode.

Figure 3H:
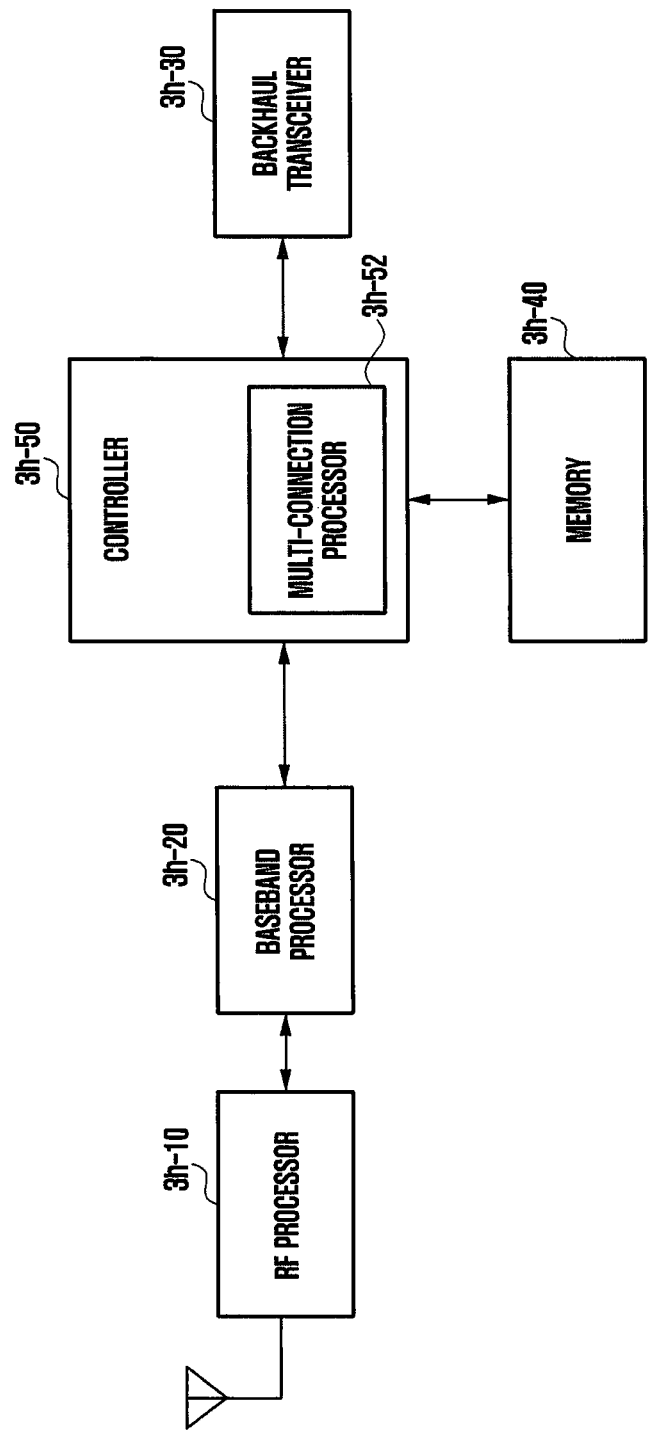
FIG. 3H is a block diagram illustrating the configuration of a base station according to a third embodiment of the disclosure.

FIG. 3H is a block diagram illustrating the configuration of a base station according to a third embodiment of the disclosure.

As shown in the drawing, the base station includes an RF processor 3h-10, a baseband processor 3h-20, a backhaul transceiver, 3h-30, a memory 3h-40, and a controller 3h-50.

The RF processor 3h-10 performs a function of transmitting and receiving signals through a wireless channel, such as band conversion and amplification of a signal. That is, the RF processor 3h-10 up-converts a baseband signal provided from the baseband processor 3h-20 to an RF band signal to thus transmit the same through an antenna, and down-converts an RF band signal received through the antenna to a baseband signal. For example, the RF processor 3h-10 may include a transmission filter, a reception filter, an amplifier, a mixer, an oscillator, a DAC, an ADC, and the like. Although only one antenna is shown in the drawing, the base station may have a plurality of antennas. In addition, the RF processor 3h-10 may include a plurality of RF chains. Further, the RF processor 3h-10 may perform beamforming. To perform beamforming, the RF processor 3h-10 may adjust the phases and magnitudes of signals transmitted and received through a plurality of antennas or antenna elements. The RF processor may perform a downlink MIMO operation by transmitting one or more layers.

The baseband processor 3h-20 performs a function of conversion between a baseband signal and a bit string according to a physical layer specification of the system. For example, in the case of data transmission, the baseband processor 3h-20 encodes and modulates transmission bit strings, thereby generating complex symbols. In addition, upon receiving data, the baseband processor 3h-20 demodulates and decodes a baseband signal provided from the RF processor 3h-10 to thus recover reception bit strings. For example, in the case where an OFDM scheme is applied, when transmitting data, the baseband processor 3h-20 generates complex symbols by encoding and modulating transmission bit strings, maps the complex symbols with subcarriers, and then configures OFDM symbols through the IFFT operation and CP insertion. In addition, when receiving data, the baseband processor 3h-20 divides the baseband signal provided from the RF processor 3h-10 into OFDM symbol units, restores the signals mapped with the subcarriers through the FFT operation, and then restores reception bit strings through demodulation and decoding. The baseband processor 3h-20 and the RF processor 3h-10 transmit and receive signals as described above. Accordingly, the baseband processor 3h-20 and the RF processor 3h-10 may be referred to as a "transmitter", a "receiver", a "transceiver", a "communication unit", or a "wireless communication interface unit".

The backhaul transceiver 3h-30 provides an interface for performing communication with other nodes in the network. That is, the backhaul transceiver 3h-30 converts a bit string transmitted from the base station to another node, such as a secondary base station, a core network, etc., into a physical signal, and converts physical signals received from other nodes into bit strings.

The memory 3h-40 stores data such as basic programs, application programs, and configuration information for the operation of the base station. In particular, the memory 3h-40 may store information about bearers allocated to a connected terminal, a measurement result reported from a connected terminal, and the like. In addition, the memory 3h-40 may store information that is a criterion for determining whether multiple connections are provided to the terminal or are released. In addition, the memory 3h-40 provides stored data in response to a request from the controller 3h-50.

The controller 3h-50 controls the overall operation of the base station. For example, the controller 3h-50 transmits and receives signals through the baseband processor 3h-20 and the RF processor 3h-10 or the backhaul transceiver 3h-30. In addition, the controller 3h-50 records and reads data in and from the memory 3h-40. To this end, the controller 3h-50 may include at least one processor. The controller 3h-50 may include a multi-connection processor 3h-52 for performing a process for operation in a multi-connection mode.

Fourth Embodiment

In the disclosure, eNB may be used interchangeably with gNB for the convenience of explanation. That is, the base station described as eNB may represent gNB.

Figure 4A:
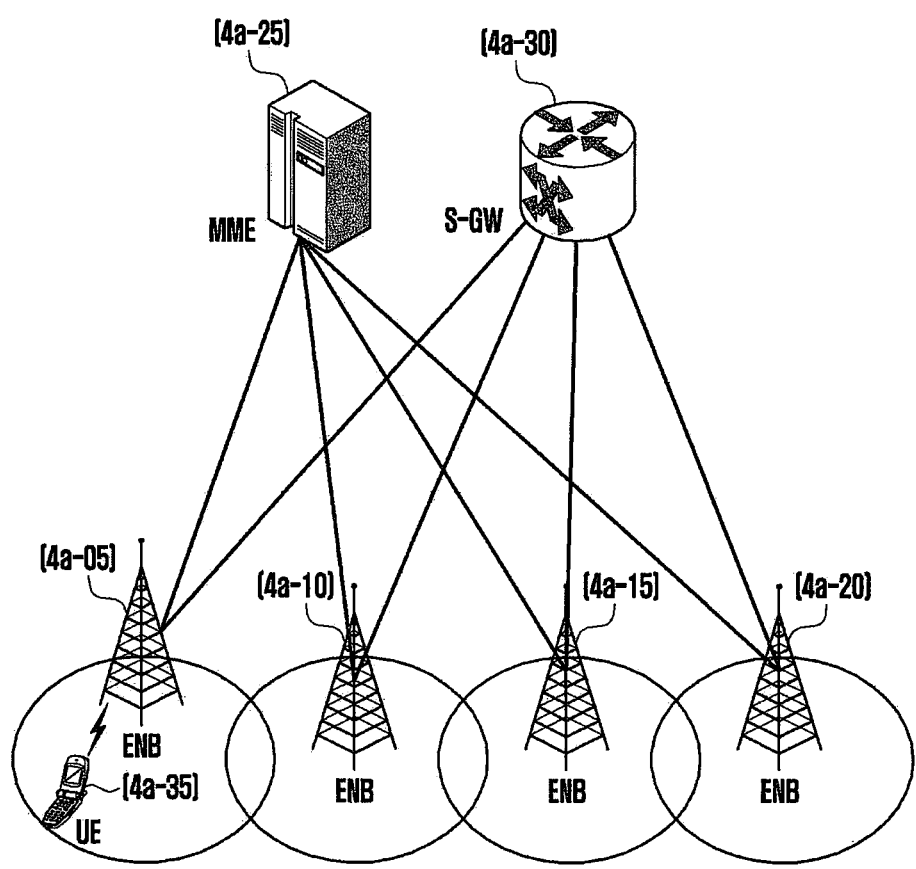
FIG. 4A is a diagram showing the structure of an LTE system to which the disclosure may be applied.

FIG. 4A is a diagram showing the structure of an LTE system to which the disclosure may be applied.

Referring to FIG. 4A, as shown in the drawing, the wireless access network of the LTE system includes evolved nodeBs (hereinafter, referred to as "ENBs", "nodeBs", or "base stations") 4a-05, 4a-10, 4a-15, and 4a-20, a mobility management entity (MME) 4a-25, and a serving gateway (S-GW) 4a-30. User equipment (hereinafter, referred to as "UE" or a "terminal") 4a-35 accesses an external network through the ENBs 4a-05 to 4a-20 and the S-GW 4a-30.

In FIG. 4A, the ENBs 4a-05 to 4a-20 correspond to existing nodeBs of a UMTS system. The ENB is connected to the UE 4a-35 via a wireless channel and plays a more complex role than an existing nodeB. In the LTE system, since all user traffic including real-time services, such as voice-over-IP (VoIP) through the Internet protocol, is served through a shared channel, a device for collecting status information, such as buffer status, available transmission power status, and channel status of UEs, and performing scheduling is required. The ENBs 4a-05 to 4a-20 serve as such a device. One ENB typically controls multiple cells. For example, in order to realize a data rate of 100 Mbps, the LTE system uses, as wireless access technology, orthogonal frequency division multiplexing (hereinafter, referred to as "OFDM") in a bandwidth of, for example, 20 MHz. Further, an adaptive modulation and coding (hereinafter, referred to as "AMC") scheme is applied to determine a modulation scheme and a channel coding rate in accordance with the channel status of a terminal. The S-GW 4a-30 is a device for providing data bearers and generates or removes data bearers under the control of the MME 4a-25. The MME is a device that performs various control functions, as well as a mobility management function for a terminal, and is connected to a plurality of base stations.

Figure 4B:
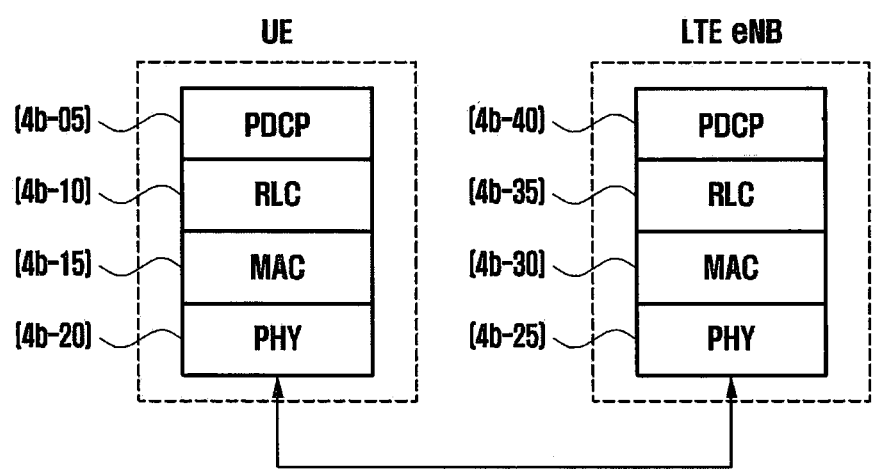
FIG. 4B is a diagram illustrating a wireless protocol structure in an LTE system to which the disclosure may be applied.

FIG. 4B is a diagram illustrating a wireless protocol structure in an LTE system to which the disclosure may be applied.

Referring to FIG. 4B, the wireless protocol of the LTE system includes a packet data convergence protocol (PDCP) 4b-05 or 4b-40, a radio link control (RLC) 4b-10 or 4b-35, and a medium access control (MAC) 4b-15 or 4b-30 in a terminal and an ENB, respectively.

The packet data convergence protocol (PDCP) 4b-05 or 4b-40 performs operations such as IP header compression/decompression and the like. The primary functions of the PDCP are summarized as follows.

Header compression and decompression (ROHC only)
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (hereinafter, referred to as "RLC") 4b-10 or 4b-35 reconfigures a PDCP PDU (packet data unit) to an appropriate size and performs ARQ operation and the like. The primary functions of the RLC are summarized as follows.

Data transfer function (transfer of upper layer PDUs)
ARQ function (error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 4b-15 or 4b-30 is connected to a plurality of RLC entities configured in a single terminal, multiplexes RLC PDUs into MAC PDUs, and demultiplexes RLC PDUs from MAC PDUs. The primary functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting HARQ function (error correction through HARQ)

Priority handling between logical channels of one UE

Priority handling between UEs by means of dynamic scheduling

MBMS service identification

Transport format selection

Padding

The physical layer 4b-20 or 4b-25 channel-codes and modulates upper layer data, and converts the same into OFDM symbols to then be transmitted through a wireless channel, or demodulates OFDM symbols received through a wireless channel and channel-decodes the same to then be transmitted to upper layers.

Figure 4C:
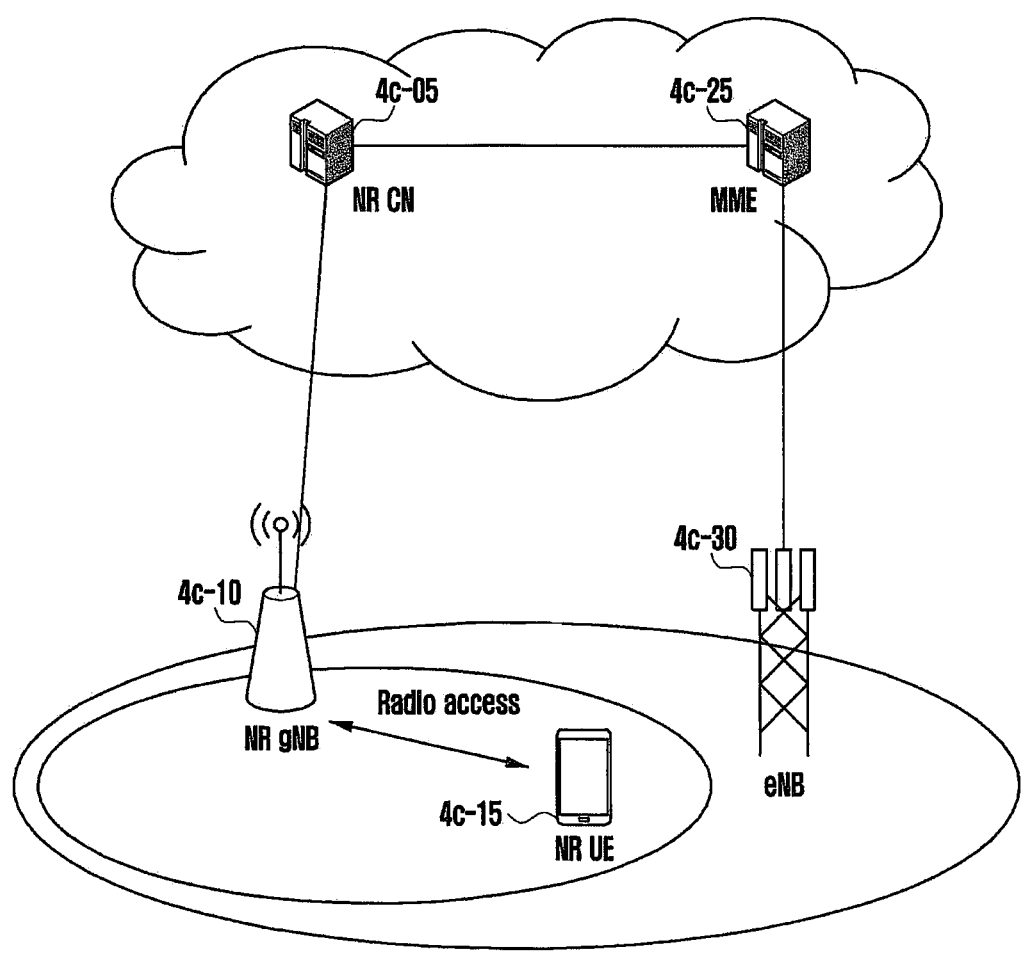
FIG. 4C is a diagram illustrating the structure of a next-generation mobile communication system to which the disclosure may be applied.

FIG. 4C is a diagram illustrating the structure of a next-generation mobile communication system to which the disclosure may be applied.

Referring to FIG. 4C, a wireless access network of a next-generation mobile communication system (hereinafter, referred to as "NR" or "5G") includes a new radio nodeB (hereinafter, referred to as "NR gNB" or an "NR base station") 4c-10 and a new radio core network (NR CN) 4c-05 as shown in the drawing. New radio user equipment (hereinafter, referred to as "NR UE" or a "terminal") 4c-15 accesses an external network through the NR gNB 4c-10 and the NR CN 4c-05.

In FIG. 4C, the NR gNB 4c-10 corresponds to an evolved nodeB (eNB) of an existing LTE system. The NR gNB is connected to the NR UE 4c-15 through a wireless channel, and may provide services superior to those of an existing nodeB. In the next-generation mobile communication system, since all user traffic is served through a shared channel, a device for collecting status information, such as buffer status, available transmission power status, and channel status of UEs, and performing scheduling is required. The NR NB 4c-10 serves as such a device. One NR gNB typically controls multiple cells. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal. The NR CN 4c-05 performs functions such as mobility support, bearer configuration, and QoS configuration. The NR CN is a device that performs various control functions, as well as a mobility management function for a terminal, and is connected to a plurality of base stations. In addition, the next-generation mobile communication system may interwork with the existing LTE system, and the NR CN is connected to an MME 4c-25 through a network interface. The MME is connected to the eNB 4c-30, which is an existing base station.

Figure 4D:
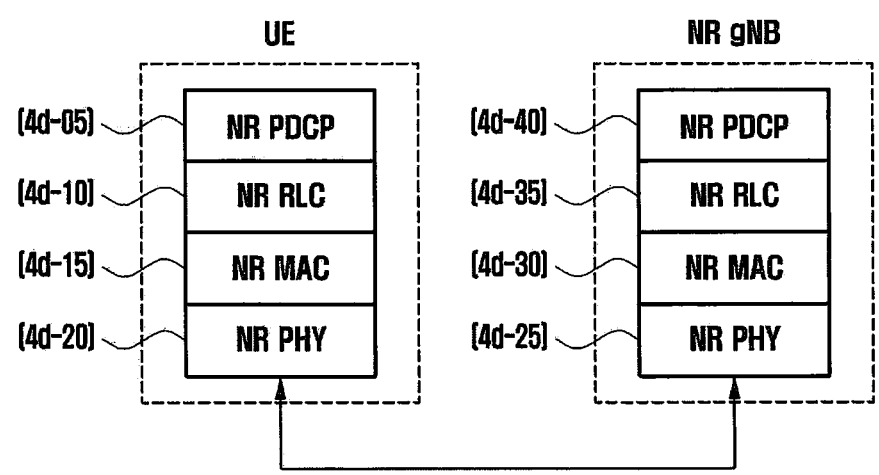
FIG. 4D is a diagram illustrating a wireless protocol structure of a next-generation mobile communication system to which the disclosure may be applied.

FIG. 4D is a diagram illustrating a wireless protocol structure of a next-generation mobile communication system to which the disclosure may be applied.

Referring to FIG. 4D, the wireless protocol of the next-generation mobile communication system includes NR PDCP 4d-05 or 4d-40, NR RLC 4d-10 or 4d-35, and NR MAC 4d-15 or 4d-30 in the terminal and the NR base station, respectively. The primary functions of the NR PDCP 4d-05 or 4d-40 may include some of the following functions.

Header compression and decompression (ROHC only)

Transfer of user data

In-sequence delivery of upper layer PDUs

Sequence reordering (PDCP PDU reordering for reception)

Duplicate detection of lower layer SDUs

Retransmission of PDCP SDUs

Ciphering and deciphering

Timer-based SDU discard in uplink

The above reordering function of the NR PDCP entity refers to a function of reordering PDCP PDUs received in a lower layer based on a PDCP sequence number (SN), may include a function of transmitting data to an upper layer in the reordered order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 4d-10 or 4d-35 may include some of the following functions.

Data transfer function (transfer of upper layer PDUs)

In-sequence delivery of upper layer PDUs

Out-of-sequence delivery of upper layer PDUs

ARQ function (error correction through ARQ)

Concatenation, segmentation, and reassembly of RLC SDUs

Re-segmentation of RLC data PDUs

Reordering of RLC data PDUs

Duplicate detection

Protocol error detection

RLC SDU discard

RLC re-establishment

The above in-sequence delivery function of the NR RLC entity refers to a function of transferring RLC SDUs received from a lower layer to an upper layer in sequence, may include a function of, if one original RLC SDU is divided into a plurality of RLC SDUs and received, reassembling and transmitting the same, may include a function of reordering the received RLC PDUs based on an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to an upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival regardless of a serial number or a sequence number thereof), and may be transmitted to the PDCP entity in an out-of-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity refers to a function of directly delivering RLC SDUs received from a lower layer to an upper layer regardless of sequence, may include a function of, if one original RLC SDU is divided into a plurality of RLC SDUs and is received, reassembling and delivering the same, and may include a function of storing and ordering RLC SNs or PDCP SNs of the received RLC PDUs, thereby recording the lost RLC PDUs.

The NR MAC 4d-15 or 4d-30 may be connected to a plurality of NR RLC entities configured in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 4d-20 and 4d-25 may perform operations of channel-coding and modulating the upper layer data into OFDM symbols and transmitting the same through a wireless channel, or operations of demodulating and channel-decoding the OFDM symbols received through the wireless channel and transmitting the same through the upper layer.

The next-generation mobile communication system may manage the mobility of the terminal based on the beam, and may support connections with a plurality of base stations, thereby providing a high data rate and a stable service. The disclosure proposes and describes a method and a device for transmitting control data to different base stations or different connections in packet duplication in order to enhance reliability in the case of transmitting control signaling in the uplink of a terminal.

Figure 4E:
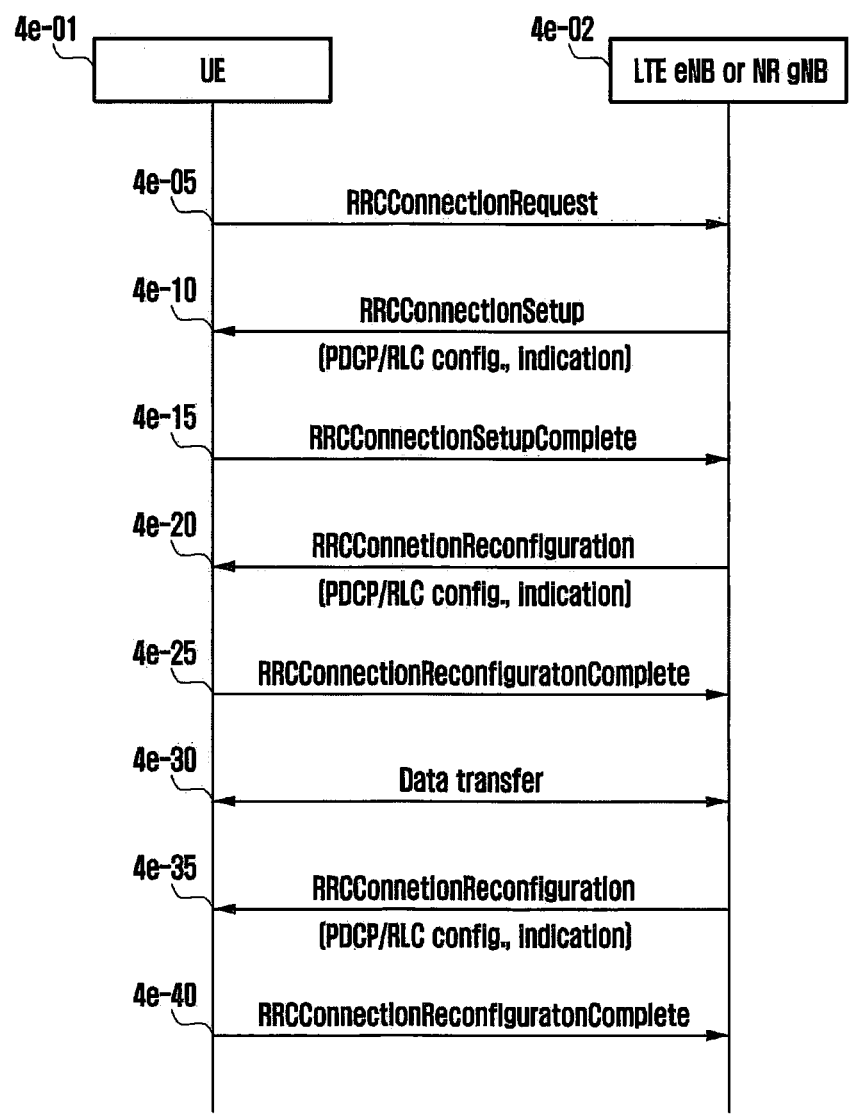
FIG. 4E is a diagram illustrating a procedure in which a terminal configures respective entities and bearers in a next-generation mobile communication system of the disclosure.

FIG. 4E is a diagram illustrating a procedure in which a terminal configures respective entities and bearers in the next-generation mobile communication system of the disclosure.

FIG. 4E is a diagram for explaining a procedure in which the terminal establishes a connection with a network and configures respective entities in order to transmit and receive data according to the disclosure.

If data to be transmitted occurs, a terminal 4e-01 that is currently in an idle mode (hereinafter, referred to as an "idle mode UE") performs an RRC connection establishment process with an LTE base station or an NR base station 4e-02. The terminal establishes reverse transmission synchronization with the base station through a random access procedure and transmits an RRCConnectionRequest message to the base station (4e-05). The RRCConnectionRequest message contains the identifier of the terminal, the reason for establishing a connection, and the like.

The base station transmits an RRCConnectionSetup message such that the terminal establishes an RRC connection (4e-10). The RRCConnectionSetup message may contain RRC connection configuration information, configuration information of each layer, and the like. In other words, the RRCConnectionSetup message may include configuration information for a PHY or NR PHY entity, a MAC or NR MAC entity, an RLC or NR RLC entity, or a PDCP or NR PDCP entity, and may include information indicating configuration for specific functions, among the functions supported by the entities (among the functions for each layer described in FIG. 4B or 4D). In addition, the RRCConnectionSetup message may include information for configuration of interworking between the LTE base station (or the NR base station) and the NR base station. The information for configuration of interworking between the LTE base station (or the NR base station) and the NR base station may include information indicating type 3C or type 1A, information about the respective entities according to the respective types, SRB/DRB bearer configuration information, and the like, and may include an indication of the base station of which the MAC entity is transmitted first when performing packet duplication transmission.

The RRC connection is also called a "signaling radio bearer (SRB)", and is used for transmitting/receiving RRC messages, which are control messages between the terminal and the base station. The terminal, having established the RRC connection, transmits an RRCConnetionSetupComplete message to the base station (4e-15). The base station transmits an RRCConnectionReconfiguration message to the terminal to establish a data radio bearer (DRB) (4e-20). The RRCConnectionReconfiguration message may contain RRC connection configuration information, configuration information of respective layers, and the like. In other words, the RRCConnectionReconfiguration message may include configuration information for a PHY or NR PHY entity, a MAC or NR MAC entity, an RLC or NR RLC entity, or a PDCP or NR PDCP entity, and may include information indicating configuration for specific functions, among the functions supported by the entities (among the functions for each layer described in FIG. 4B or 4D). In addition, the RRCConnectionReconfiguration message may include information for configuration of interworking between the LTE base station (or the NR base station) and the NR base station. The information for configuration of interworking between the LTE base station (or the NR base station) and the NR base station may include information indicating type 3C or type 1A, information about the respective entities according to the respective types, SRB/DRB bearer configuration information, and the like, and may include an indication of the base station of which the MAC entity is transmitted first when performing packet duplication transmission. In addition, the RRCConnectionReconfiguration message may include configuration information of a DRB through which user data is to be processed.

The terminal configures a DRB and functions of the respective layers by applying the information included in the RRCConnectionReconfiguration message, thereby transmitting an RRCConnectionReconfigurationComplete message to the base station (4e-25). If the above procedure is completed, the terminal transmits and receives data to and from the base station (4e-30).

If necessary, the base station retransmits the RRCConnectionReconfiguration message to the terminal during the transmission and reception (4e-35), thereby reconfiguring the configuration information of the respective layers of the terminal. The RRCConnectionReconfiguration message may contain RRC connection configuration information, configuration information of respective layers, and the like. In other words, the RRCConnectionReconfiguration message may include configuration information for a PHY or NR PHY entity, a MAC or NR MAC entity, an RLC or NR RLC entity, or a PDCP or NR PDCP entity, and may include information indicating configuration for specific functions, among the functions supported by the entities (among the functions for each layer described in FIG. 4B or 4D). In addition, the RRCConnectionReconfiguration message may include information for configuration of interworking between the LTE base station (or the NR base station) and the NR base station. The information for configuration of interworking between the LTE base station (or the NR base station) and the NR base station may include information indicating type 3C or type 1A, information about the respective entities according to the respective types, SRB/DRB bearer configuration information, and the like, and may include an indication of the base station of which the MAC entity is transmitted first when performing packet duplication transmission.

If the configuration of the respective entities is completed according to the information included in the RRCConnectionReconfiguration message, the terminal transmits an RRCConnectionReconfigurationComplete message to the base station (4e-40).

The above radio bearer is a logical path formed to provide an appropriate QoS, and includes one PDCP entity and one or two RLC entities. A radio bearer for processing data generated in an upper layer of the user plane, such as an IP layer, is called a DRB. A radio bearer that processes the data generated in the RRC and is connected to the RRC is called an "SRB". The SRBs that may be configured in one terminal are as follows.

SRB0: This is a radio bearer for processing common control channel (CCCH) control messages while no security is applied. Only a packet of a specific size is transmitted in the uplink. The RRC control message transmitted/received by SRB0 has no PDCP header and RLC header added thereto. In other words, the RRC control message is directly transmitted to the MAC without being separately processed in the PDCP and the RLC. In addition, the message authentication code (MAC-I) for integrity protection is not attached to the downlink RRC control message transmitted/received through SRB0.

SRB1: This is a radio bearer for processing a dedicated control channel (DCCH) control message. MAC-I is attached to the data transmitted/received through SRB1, and the MAC-I is added by the PDCP layer.

SRB2: This is a radio bearer for processing a dedicated control channel (DCCH) control message, and a control message having a lower priority than the control message transmitted/received through SRB1 is transmitted/received through SRB2.

SRB3: This is a bearer that may be configured for a secondary base station (SeNB) to transmit a control message directly to a terminal without going through a master base station (MeNB) in a dual-connectivity environment, and may use a DCCH.

SRB0 may be used without a separate configuration procedure, while SRB1 is configured in the RRC connection establishment process, and SRB2 or SRB3 is configured in the RRC connection reconfiguration process.

Figure 4F:
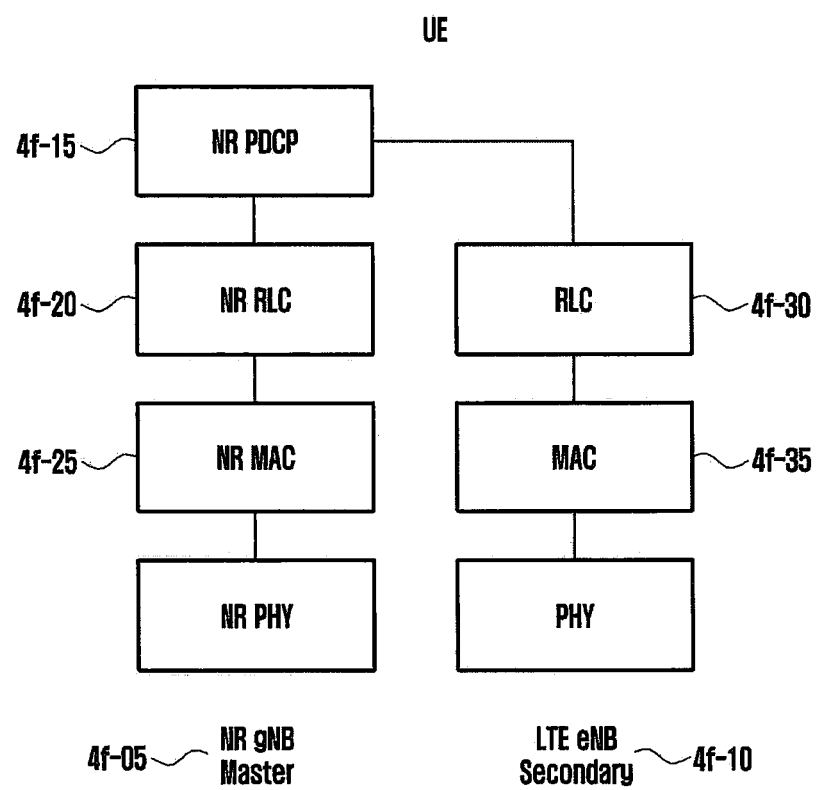
FIG. 4F is a diagram illustrating a dual-connectivity scenario in a next-generation mobile communication system, which is considered in a fourth embodiment of the disclosure.

FIG. 4F is a diagram illustrating a dual-connectivity scenario in the next-generation mobile communication system, which is considered in a fourth embodiment of the disclosure.

In FIG. 4F, a terminal of the next-generation mobile communication system establishes a dual connection with an LTE base station and a base station of the next-generation communication system, so that services are provided. A scenario in which the base station of the next-generation mobile communication system, as a master 4f-05, manages connections, and the LTE system, as a secondary entity 4f-10, supports the connections in the dual-connectivity technology is under consideration. The master base station generates user plane data or control plane data generated in the PDCP entity 4f-15 and transmits the same to the RLC entity 4f-20 of the master base station and the RLC entity 4f-30 of the secondary base station so that data is transmitted through the master base station and the secondary base station.

By configuration of two connections as described above, the terminal may transmit data to a network at a higher data rate. In a predetermined case, the terminal may perform packet duplication transmission of the user data or control data through the connection with the master base station and the secondary base station. That is, the PDCP entity 4f-15 of the terminal may transmit the same data to the RLC entity 4f-20 for the master base station and to the RLC entity 4f-30 for the secondary base station in duplicate. The predetermined case above may be the case where there is an indication for specific data, such as the case where an indicator is included in the PDCP header, the case where there is an indication in an upper layer (RRC layer), the case where the network configures such that the bearer performs packet duplication transmission, or the case where there is a determination by the terminal.

In the case where the terminal performs packet duplication transmission, the packet duplication transmission may be applied both to user data and to control data. That is, the packet duplication transmission may be applied to a data radio bearer (DRB) and a signaling radio bearer (SRB). However, since SRB0 uses a common control channel (CCCH) and is used for system information, paging, etc., it is not suitable for packet duplication transmission. Since SRB1 and SRB2 use a dedicated control channel (DCCH) and is used both for the next-generation mobile communication system and for the LTE system, they are bearers suitable for carrying out packet duplication transmission. SRB3 may not be suitable for performing packet duplication transmission because it may be defined as a bearer for the secondary base station to directly transmit a control signal to the terminal in the next-generation mobile communication system. Therefore, SRB1 and SRB2 are suitable for the application of the packet duplication transmission technique to the control signal.

In the case where the terminal determines to perform packet duplication transmission in the DRB or SRB1/SRB2 in a dual-connectivity environment, Embodiment 4-1 for applying the packet duplication transmission technique is as follows.

If a PDCP SDU for packet duplication transmission is generated in the PDCP entity, the terminal needs to inform a first MAC entity (a MAC entity for the master base station) 4f-25 or a second MAC entity (a MAC entity for the secondary base station) 4f-35 that there is data available for transmission. In the Embodiment 4-1 for performing the packet duplication transmission in the dual-connectivity technology environment of the disclosure, it is not allowed to simultaneously transmit duplicate packets through the connections with the master base station and the secondary base station. This is due to the fact that if the data is simultaneously transmitted to the master base station and the secondary base station in duplicate, since the terminal consumes power for the respective transmissions, the data must be transmitted with a low transmission power due to the limited transmission power of the terminal. That is, for example, if the maximum transmission power of the terminal is 23 dBm, the terminal must use the maximum transmission power by splitting the same in order to simultaneously transmit the duplicate packets to the master base station and the secondary base station. Therefore, in the embodiment of the disclosure, the terminal transmits the duplicate packets to the master base station or the secondary base station one at a time, instead of simultaneously transmitting the same, such that the terminal may use the maximum transmission power for transmission of the duplicate packets. (The packet duplication transmission is determined for data requiring high reliability. If the data is transmitted to two base stations at different times with the maximum transmission power, instead of simultaneously transmitting the data to two base stations with a low transmission power, it is possible to obtain a transmission power gain and a diversity gain due to the transmission through different channels.)

The terminal may notify one of the first MAC entity and the second MAC entity that there is data available for transmission according to a predetermined rule. The predetermined rule may be selection of a MAC entity allocated with a transmission resource for a scheduling request (SR), which can be requested earlier in time, among the first MAC entity and the second MAC entity. Alternatively, a request may be made first to a MAC entity that is configured by the network to perform transmission when performing packet duplication transmission in the RRC connection establishment process (4e-10, 4e-20, and 4e-35 in FIG. 4E). For example, the terminal may notify the MAC entity connected to the master base station that there is data available for transmission. If the two base stations do not allocate SR transmission resources, a predetermined base station, among the two base stations, may perform a random access procedure.

Then, upon receiving the notification that there is data available for transmission, the MAC entity triggers a regular BSR to make a request for an uplink transmission resource to the master base station or the secondary base station corresponding to the MAC entity. That is, the regular BSR requests scheduling using a scheduling request (SR) transmission resource, the terminal receives an uplink transmission resource from the base station to transmit the regular BSR, and the base station allocates an uplink transmission resource to the terminal after recognizing the amount of data to be transmitted by the terminal through the BSR. Upon receiving the uplink transmission resource, the terminal configures and transmits a MAC PDU using data different from the data to be transmitted in packet duplication.

If the transmission of the data in the packet duplication is completed in the MAC entity, the MAC entity or the PDCP entity 4f-15 notifies the MAC entity corresponding to another master base station or secondary base station, which has not yet performed packet duplication transmission, that there is data available for transmission. Then, upon receiving the notification that there is data available for transmission, the MAC entity triggers a regular BSR to make a request for uplink transmission resources to the master base station or the secondary base station corresponding to the MAC entity. That is, the regular BSR requests scheduling using a scheduling request (SR) transmission resource, the terminal receives an uplink transmission resource from the base station to transmit the regular BSR, and the base station allocates uplink transmission resources to the terminal after recognizing the amount of data to be transmitted by the terminal through the BSR. Upon receiving the uplink transmission resources, the terminal configures and transmits a MAC PDU using data different from the data to be transmitted in packet duplication.

If a response indicating that delivery was successful is received from the MAC entity or RLC entity of the base station, to which data has already been transmitted, through another connection before performing the packet duplication transmission, the terminal may not perform the packet duplication transmission on the data intended for packet duplication transmission (if the data is successfully delivered, another data transmission will waste transmission resources and will ultimately be discarded at the receiving end). The response indicating successful delivery may correspond to the case where the MAC entity receives HARQ ACK or the case where the RLC entity receives RLC ACK.

The terminal may define a new parameter for data (PDCP SDUs) for packet duplication transmission, and may record information about whether the data has been transmitted to the master base station or to the secondary base station. For example, the terminal may allocate 2 bits to the data for packet duplication transmission such that a value of 0/1 of each bit indicates whether data has been transmitted to the master base station or the secondary base station, respectively.

In the connection with the LTE base station, the terminal may transmit the data of the PDCP entity in packet duplication to a lower entity after the MAC entity receives the uplink transmission resource. However, in the connection with the base station of the next-generation mobile communication system, the PDCP entity may deliver the data in packet duplication to a lower entity even before the MAC entity receives the uplink transmission resource, thereby performing pre-processing on the MAC SDUs.

In the disclosure, Embodiment 4-2 for applying the packet duplication transmission technique in the scenario of FIG. 4F is as follows. In the case where the terminal determines to perform packet duplication transmission in the DRB or SRB1/SRB2 in the dual-connectivity environment, Embodiment 4-2 for applying the packet duplication transmission technique is as follows.

If a PDCP SDU for packet duplication transmission is generated in the PDCP entity, the terminal needs to inform a first MAC entity (a MAC entity for the master base station) 4f-25 or a second MAC entity (a MAC entity for the secondary base station) 4f-35 that there is data available for transmission. In Embodiment 4-2 for performing packet duplication transmission in the dual-connectivity technology environment of the disclosure, it is allowed to simultaneously transmit duplicate packets through the connections with the master base station and the secondary base station. That is, if data for packet duplication transmission (PDCP SDU) is configured in the PDCP entity, the PDCP entity informs both the first MAC entity and the second MAC entity that there is data available for transmission. The objective of Embodiment 4-2 is to transmit data in duplicate as soon as possible. In the case where the first MAC entity and the second MAC entity make a request to the master base station and the secondary base station for uplink transmission resources, respectively, the transmission resources are less likely to be allocated at the same time. Thus, Embodiment 4-2 aims at transmitting a scheduling request to two base stations as soon as possible. In addition, unlike Embodiment 4-1, Embodiment 4-2 is characterized in that simultaneous transmission is performed despite the differently divided transmission power even if the uplink transmission resources are allocated at the same time.

The terminal may notify both the first MAC entity and the second MAC entity that there is data available for transmission. Then, upon receiving the notification that there is data available for transmission, the MAC entity triggers a regular BSR to make a request for an uplink transmission resource to the master base station or the secondary base station corresponding to the MAC entity. That is, the regular BSR requests scheduling using a scheduling request (SR) transmission resource, the terminal receives an uplink transmission resource from the base station to transmit the regular BSR, and the base station allocates an uplink transmission resource to the terminal after recognizing the amount of data to be transmitted by the terminal through the BSR. Upon receiving the uplink transmission resource, the terminal configures and transmits a MAC PDU using data different from the data to be transmitted in packet duplication. If the base station does not allocate the SR transmission resources, a random access procedure may be performed.

If a response indicating that delivery was successful is received from the MAC entity or RLC entity of the base station, to which data has already been transmitted, through another connection before performing the packet duplication transmission, the terminal may not perform the packet duplication transmission on the data intended for packet duplication transmission (If the data is successfully delivered, another data transmission will waste transmission resources and will ultimately be discarded at the receiving end). The response indicating successful delivery may correspond to the case where the MAC entity receives HARQ ACK or the case where the RLC entity receives RLC ACK.

The terminal may define a new parameter for data (PDCP SDUs) for packet duplication transmission, and may record information about whether the data has been transmitted to the master base station or to the secondary base station. For example, the terminal may allocate 2 bits to the data for packet duplication transmission such that a value of 0/1 of each bit indicates whether data has been transmitted to the master base station or the secondary base station, respectively.

In the connection with the LTE base station, the terminal may transmit the data of the PDCP entity in packet duplication to a lower entity after the MAC entity receives the uplink transmission resource. However, in the connection with the base station of the next-generation mobile communication system, the PDCP entity may deliver the data for packet duplication transmission to a lower entity even before the MAC entity receives the uplink transmission resource, thereby performing pre-processing of the MAC SDUs.

If data is generated in the PDCP entity for SRB3 in the dual-connectivity scenario of the next-generation mobile communication system, the terminal may trigger the regular BSR and may perform the SR only for the MAC entity connected to the base station of the next-generation mobile communication system. This is due to the fact that SRB3 is a bearer that is defined only in the next-generation mobile communication system and is not defined in the LTE system.

In addition, SRB1 and SRB2 transmit and receive data by applying security keys, which are different from that of SRB3. This is due to the fact that SRB1 and SRB2 may be commonly used in the LTE system and next-generation mobile communication system, whereas SRB3 is a bearer mostly for the next-generation mobile communication system, and it aims at directly delivering a control signal to the terminal without passing through a master base station when the base station of the next-generation mobile communication system is a secondary base station, so that a different security key is required. That is, since the control signal does not pass through the master base station, the security key of the secondary base station may be applied, instead of applying the security key of the master base station. Therefore, SRB1 and SRB2 may use different security keys from that of SRB3.

Figure 4G:
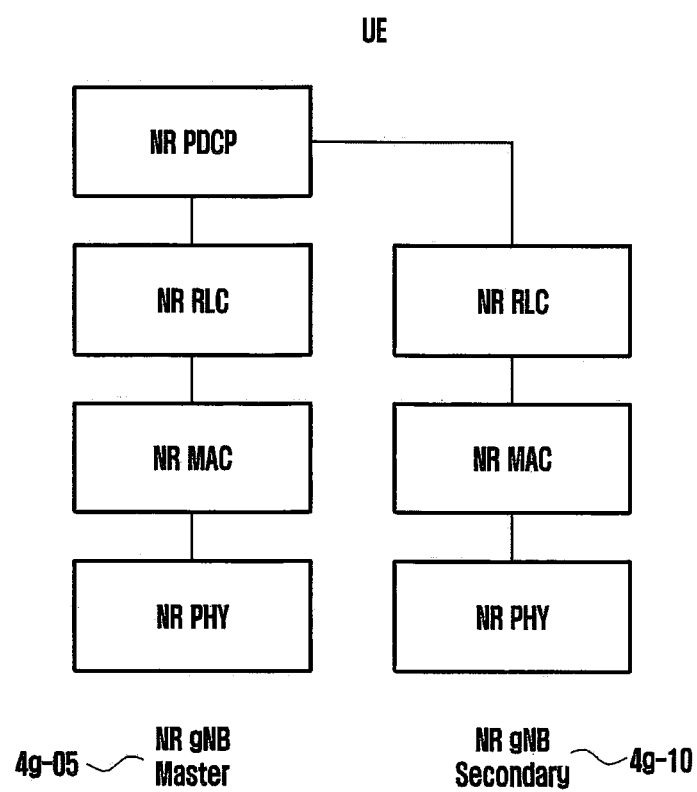
FIG. 4G is a diagram illustrating another dual-connectivity scenario in a next-generation mobile communication system, which is considered in a fourth embodiment of the disclosure.

FIG. 4G is a diagram illustrating another dual-connectivity scenario in the next-generation mobile communication system, which is considered by a fourth embodiment of the disclosure.

In FIG. 4G, a terminal of the next-generation mobile communication system establishes a dual connection with a base station of the next-generation communication system and a base station of another next-generation mobile communication system, so that services are provided. A scenario in which the base station of the next-generation mobile communication system, as a master 4g-05, manages connections, and another next-generation mobile communication system, as a secondary entity 4g-10, supports the connections in the dual-connectivity technology is under consideration. Both Embodiment 4-1 and Embodiment 4-2 described in FIG. 4F can be applied to the scenario of FIG. 4G in the same manner.

Figure 4H:
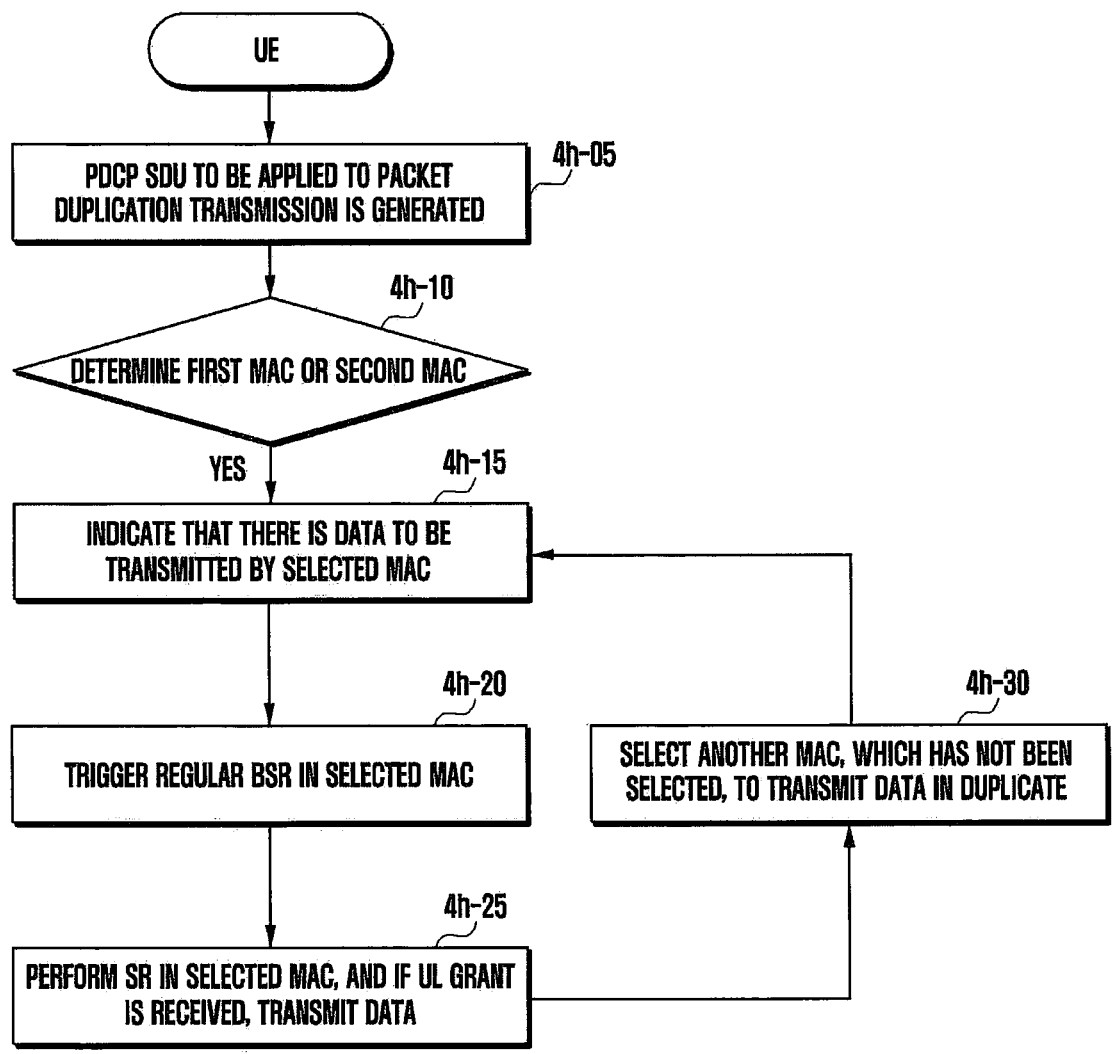
FIG. 4H is a diagram illustrating the operation of a terminal to which Embodiment 4-1 of the disclosure is applied.

FIG. 4H is a diagram illustrating the operation of a terminal to which Embodiment 4-1 of the disclosure is applied.

In FIG. 4H, if a PDCP SDU for packet duplication transmission is generated in the PDCP entity (4h-05), the terminal needs to inform a first MAC entity (a MAC entity for the master base station) or a second MAC entity (a MAC entity for the secondary base station) that there is data available for transmission. In Embodiment 4-1 for performing the packet duplication transmission in the dual-connectivity technology environment of the disclosure, it is not allowed to simultaneously transmit duplicate packets through the connection with the master base station and the connection with the secondary base station.

The terminal may notify one of the first MAC entity and the second MAC entity that there is data available for transmission according to a predetermined rule (4h-10 and 4h-15). The predetermined rule may be selection of a MAC entity allocated with a transmission resource for a scheduling request (SR), which can be requested earlier in time, among the first MAC entity and the second MAC entity. Alternatively, a request may be made first to a MAC entity that is configured by the network to perform transmission when performing packet duplication transmission in the RRC connection establishment process (4e-10, 4e-20, and 4e-35 in FIG. 4E). For example, the terminal may notify the MAC entity connected to the master base station that there is data available for transmission. If the two base stations do not allocate the SR transmission resources, a predetermined base station, among the two base stations, may perform a random access procedure.

Then, upon receiving the notification that there is data available for transmission, the MAC entity triggers a regular BSR to make a request for an uplink transmission resource to the master base station or the secondary base station corresponding to the MAC entity (4h-20). That is, the regular BSR requests scheduling using a scheduling request (SR) transmission resource, the terminal receives an uplink transmission resource from the base station to transmit the regular BSR, and the base station allocates an uplink transmission resource to the terminal after recognizing the amount of data to be transmitted by the terminal through the BSR. Upon receiving the uplink transmission resource, the terminal configures and transmits a MAC PDU using data different from the data to be transmitted in packet duplication (4h-25).

If the transmission of the data for the packet duplication transmission is completed in the MAC entity, the MAC entity or the PDCP entity 4f-15 notifies the MAC entity corresponding to another master base station or secondary base station, which has not yet performed transmission for packet duplication transmission, that there is data available for transmission (4h-30). Then, upon receiving the notification that there is data available for transmission, the MAC entity triggers a regular BSR to make a request for an uplink transmission resource to the master base station or the secondary base station corresponding to the MAC entity. That is, the regular BSR requests scheduling using a scheduling request (SR) transmission resource, the terminal receives an uplink transmission resource from the base station to transmit the regular BSR, and the base station allocates an uplink transmission resource to the terminal after recognizing the amount of data to be transmitted by the terminal through the BSR. Upon receiving the uplink transmission resource, the terminal configures and transmits a MAC PDU using data different from the data to be transmitted in packet duplication.

If a response indicating that delivery was successful is received from the MAC entity or RLC entity of the base station, to which data has already been transmitted, through another connection before performing the packet duplication transmission, the terminal may not perform the packet duplication transmission on the data intended for packet duplication transmission (if the data is successfully delivered, another data transmission will waste transmission resources and will ultimately be discarded at the receiving end). The response indicating successful delivery may correspond to the case where the MAC entity receives HARQ ACK or the case where the RLC entity receives RLC ACK.

Figure 4I:
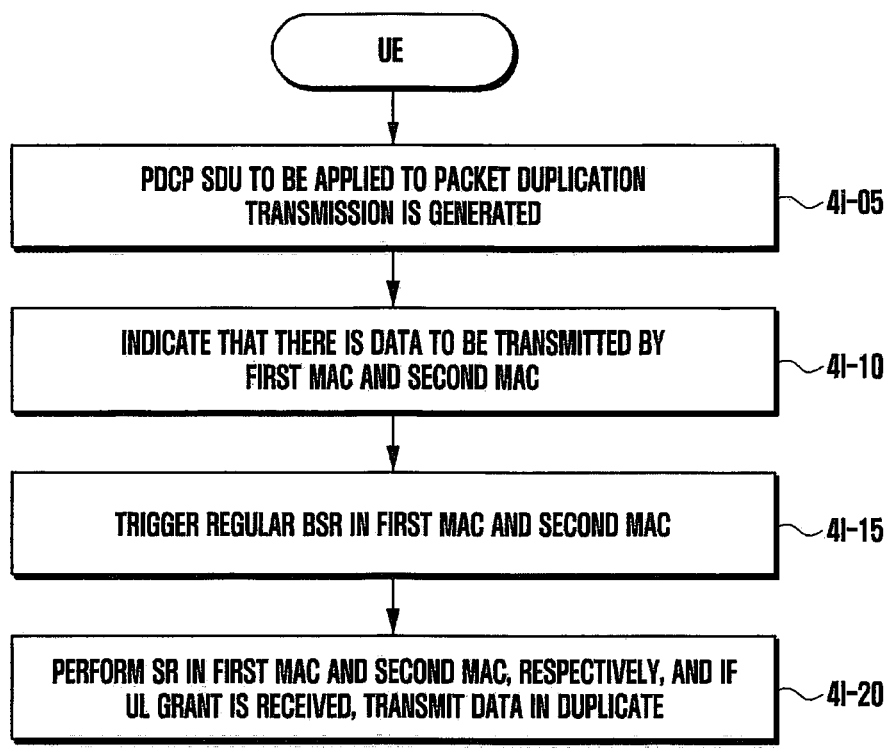
FIG. 4I is a diagram illustrating the operation of a terminal to which Embodiment 4-2 of the disclosure is applied.

FIG. 4I is a diagram illustrating the operation of a terminal to which Embodiment 4-2 of the disclosure is applied.

If a PDCP SDU for packet duplication transmission is generated in the PDCP entity (4i-05), the terminal needs to inform a first MAC entity (a MAC entity for the master base station) or a second MAC entity (a MAC entity for the secondary base station) that there is data available for transmission (4i-10). In Embodiment 4-2 for performing the packet duplication transmission in the dual-connectivity technology environment of the disclosure, it is allowed to simultaneously transmit duplicate packets through the connection with the master base station and the connection with the secondary base station. That is, if data for packet duplication transmission (PDCP SDU) is configured in the PDCP entity, the PDCP entity informs both the first MAC entity and the second MAC entity that there is data available for transmission. The objective of Embodiment 4-2 is to transmit data in duplicate as soon as possible. In the case where the first MAC entity and the second MAC entity make a request to the master base station and the secondary base station, respectively, for uplink transmission resources as described above, the transmission resources are less likely to be allocated at the same time. Thus, Embodiment 4-2 aims at transmitting a scheduling request to two base stations as soon as possible. In addition, unlike the first embodiment, Embodiment 4-2 is characterized in that simultaneous transmission is performed despite the differently divided transmission power even if the uplink transmission resources are allocated at the same time.

The terminal may notify both the first MAC entity and the second MAC entity that there is data available for transmission (4i-10). Then, upon receiving the notification that there is data available for transmission, the MAC entity triggers a regular BSR to make a request for an uplink transmission resource to the master base station or the secondary base station corresponding to the MAC entity (4i-15). That is, the regular BSR requests scheduling using a scheduling request (SR) transmission resource, the terminal receives an uplink transmission resource from the base station to transmit the regular BSR, and the base station allocates an uplink transmission resource to the terminal after recognizing the amount of data to be transmitted by the terminal through the BSR. Upon receiving the uplink transmission resource, the terminal configures and transmits a MAC PDU using data different from the data to be transmitted in packet duplication (4i-20). If the base station does not allocate the SR transmission resources, a random access procedure may be performed.

If a response indicating that delivery was successful is received from the MAC entity or RLC entity of the base station, to which data has already been transmitted, through another connection before performing the packet duplication transmission, the terminal may not perform the packet duplication transmission on the data intended for packet duplication transmission (if the data is successfully delivered, another data transmission will waste transmission resources and will ultimately be discarded at the receiving end). The response indicating successful delivery may correspond to the case where the MAC entity receives HARQ ACK or the case where the RLC entity receives RLC ACK.

Figure 4J:
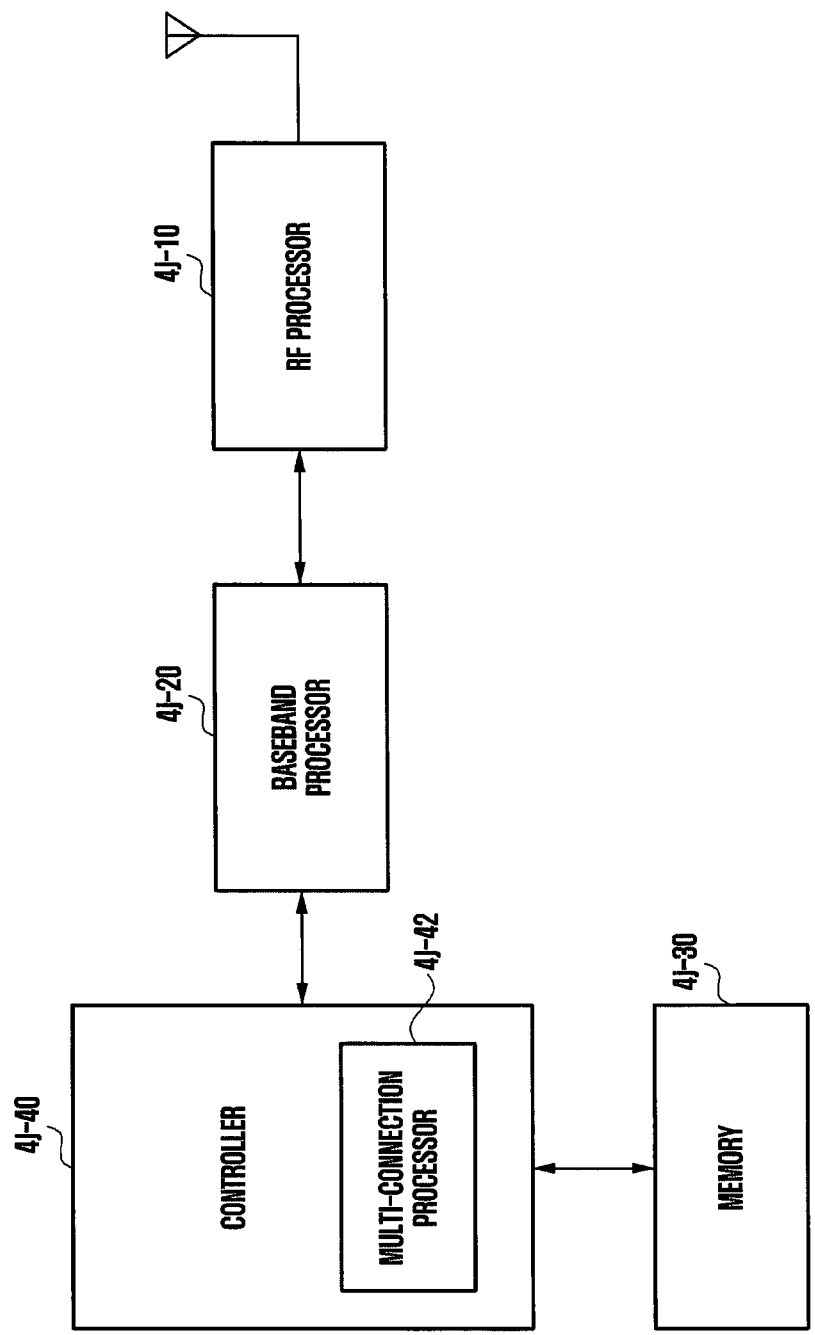
FIG. 4J illustrates the structure of a terminal according to a fourth embodiment of the disclosure.

FIG. 4J illustrates the structure of a terminal to which a fourth embodiment of the disclosure may be applied.

Referring to FIG. 4J, the terminal includes a radio frequency (RF) processor 4j-10, a baseband processor 4j-20, a memory 4j-30, and a controller 4j-40.

The RF processor 4j-10 performs a function of transmitting and receiving a signal through a wireless channel, such as band conversion and amplification of a signal. That is, the RF processor 4j-10 up-converts a baseband signal provided from the baseband processor 4j-20 to an RF band signal to thus transmit the same through an antenna and down-converts an RF band signal received through the antenna to a baseband signal. For example, the RF processor 4j-10 may include a transmission filter, a reception filter, an amplifier, a mixer, an oscillator, a digital-to-analog converter (DAC), an analog-to-digital converter (ADC), and the like. Although only one antenna is shown in the drawing, the terminal may have a plurality of antennas. In addition, the RF processor 4j-10 may include a plurality of RF chains. Further, the RF processor 4j-10 may perform beamforming. To perform beamforming, the RF processor 4j-10 may adjust the phases and magnitudes of signals transmitted and received through a plurality of antennas or antenna elements. In addition, the RF processor may perform MIMO, and may receive multiple layers when performing the MIMO operation. The RF processor 4j-10 may perform reception beam sweeping by appropriately configuring a plurality of antennas or antenna elements under the control of the controller, or may adjust the direction of the reception beam and a beam width thereof such that the reception beam is coordinated with the transmission beam.

The baseband processor 4j-20 performs a function of conversion between a baseband signal and a bit string according to a physical layer specification of the system. For example, in the case of data transmission, the baseband processor 4j-20 encodes and modulates transmission bit strings, thereby generating complex symbols. In addition, upon receiving data, the baseband processor 4j-20 demodulates and decodes a baseband signal provided from the RF processor 4j-10 to thus recover reception bit strings. For example, in the case where an orthogonal frequency division multiplexing (OFDM) scheme is applied, when transmitting data, the baseband processor 4j-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 4*j*-20 divides the baseband signal provided from the RF processor 4*j*-10 into OFDM symbol units, restores the signals mapped with the subcarriers through a fast Fourier transform (FFT) operation, and then restores reception bit strings through demodulation and decoding.

The baseband processor 4*j*-20 and the RF processor 4*j*-10 transmit and receive signals as described above. Accordingly, the baseband processor 4*j*-20 and the RF processor 4*j*-10 may be referred to as a "transmitter", a "receiver", a "transceiver", or a "communication unit". Further, at least one of the baseband processor 4*j*-20 and the RF processor 4*j*-10 may include a plurality of communication modules to support a plurality of different wireless access technologies. In addition, at least one of the baseband processor 4*j*-20 and the RF processor 4*j*-10 may include different communication modules for processing signals of different frequency bands. For example, the different wireless access technologies may include an LTE network, an NR network, and the like. In addition, the different frequency bands may include super high frequency (SHF) (e.g., 2.5 GHz or 5 GHz) band and a millimeter wave (e.g., 60 GHz) band.

The memory 4*j*-30 stores data such as basic programs, application programs, and configuration information for the operation of the terminal. The memory 4*j*-30 provides stored data in response to a request from the controller 4*j*-40.

The controller 4*j*-40 controls the overall operation of the terminal. For example, the controller 4*j*-40 transmits and receives signals through the baseband processor 4*j*-20 and the RF processor 4*j*-10. In addition, the controller 4*j*-40 records and reads data in and from the memory 4*j*-40. To this end, the controller 4*j*-40 may include at least one processor. For example, the controller 4*j*-40 may include a communication processor (CP) for controlling communication and an application processor (AP) for controlling upper layers such as application programs. The controller 4*j*-40 may include a multi-connection processor 4*j*-42 for performing a process for operation in a multi-connection mode.

Figure 4K:
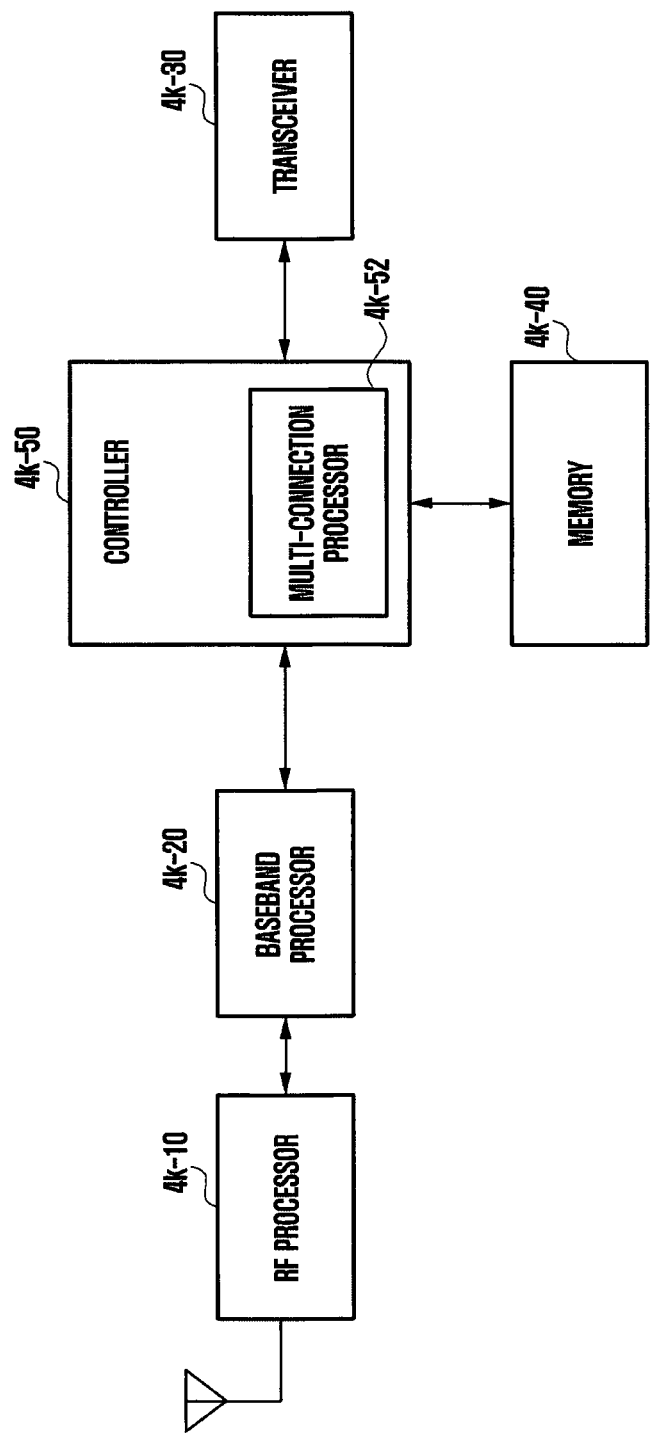
FIG. 4K is a block diagram illustrating the configuration of a base station in a wireless communication system according to a fourth embodiment of the disclosure.

FIG. 4K is a block diagram illustrating the configuration of a base station in a wireless communication system to which a fourth embodiment of the disclosure may be applied.

As shown in the drawing, the base station includes an RF processor 4*k*-10, a baseband processor 4*k*-20, a backhaul transceiver 4*k*-30, a memory 4*k*-40, and a controller 4*k*-50.

The RF processor 4*k*-10 performs a function of transmitting and receiving signals through a wireless channel, such as band conversion and amplification of a signal. That is, the RF processor 4*k*-10 up-converts a baseband signal provided from the baseband processor 4*k*-20 to an RF band signal to thus transmit the same through an antenna, and down-converts an RF band signal received through the antenna to a baseband signal. For example, the RF processor 4*k*-10 may include a transmission filter, a reception filter, an amplifier, a mixer, an oscillator, a DAC, an ADC, and the like. Although only one antenna is shown in the drawing, the base station may have a plurality of antennas. In addition, the RF processor 4*k*-10 may include a plurality of RF chains. Further, the RF processor 4*k*-10 may perform beamforming. To perform beamforming, the RF processor 4*k*-10 may adjust the phases and magnitudes of signals transmitted and received through a plurality of antennas or antenna elements. The RF processor may perform a downlink MIMO operation by transmitting one or more layers.

The baseband processor 4*k*-20 performs a function of conversion between a baseband signal and a bit string according to a physical layer specification of the radio access system. For example, in the case of data transmission, the baseband processor 4*k*-20 encodes and modulates transmission bit strings, thereby generating complex symbols. In addition, upon receiving data, the baseband processor 4*k*-20 demodulates and decodes a baseband signal provided from the RF processor 4*k*-10 to thus recover reception bit strings. For example, in the case where an OFDM scheme is applied, when transmitting data, the baseband processor 4*k*-20 generates complex symbols by encoding and modulating transmission bit strings, maps the complex symbols with subcarriers, and then configures OFDM symbols through the IFFT operation and CP insertion. In addition, when receiving data, the baseband processor 4*k*-20 divides the baseband signal provided from the RF processor 4*k*-10 into OFDM symbol units, restores the signals mapped with the subcarriers through the FFT operation, and then restores reception bit strings through demodulation and decoding. The baseband processor 4*k*-20 and the RF processor 4*k*-10 transmit and receive signals as described above. Accordingly, the baseband processor 4*k*-20 and the RF processor 4*k*-10 may be referred to as a "transmitter", a "receiver", a "transceiver", a "communication unit", or a "wireless communication unit".

The transceiver 4*k*-30 provides an interface for performing communication with other nodes in the network.

The memory 4*k*-40 stores data such as basic programs, application programs, and configuration information for the operation of the base station. In particular, the memory 4*k*-40 may store information about bearers allocated to a connected terminal, a measurement result reported from a connected terminal, and the like. In addition, the memory 4*k*-40 may store information that is a criterion for determining whether multiple connections are provided to the terminal or are released. In addition, the memory 4*k*-40 provides stored data in response to a request from the controller 4*k*-50.

The controller 4*k*-50 controls the overall operation of the base station. For example, the controller 4*k*-50 transmits and receives signals through the baseband processor 4*k*-20 and the RF processor 4*k*-10 or the backhaul transceiver 4*k*-30. In addition, the controller 4*k*-50 records and reads data in and from the memory 4*k*-40. To this end, the controller 4*k*-50 may include at least one processor. The controller 4*k*-50 may include a multi-connection processor 4*k*-52 for performing a process for operation in a multi-connection mode.

Fifth Embodiment

Figure 5A:
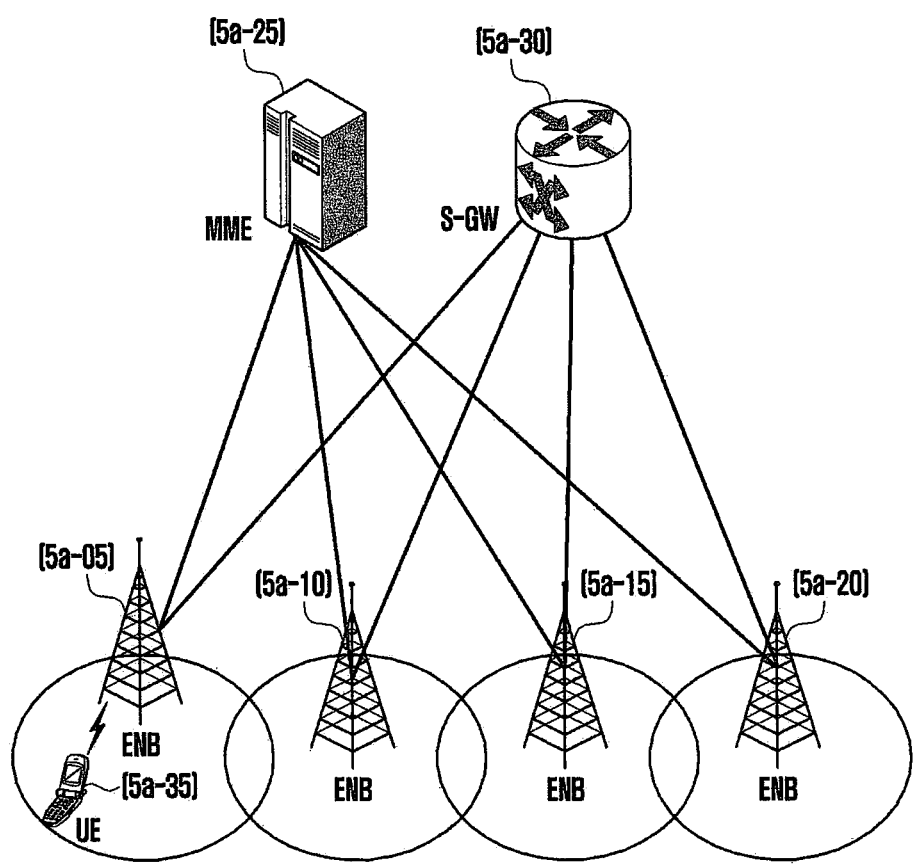
FIG. 5A is a diagram illustrating the structure of an LTE system to which the disclosure may be applied.

FIG. 5A is a diagram illustrating the structure of an LTE system to which the disclosure may be applied.

Referring to FIG. 5A, as shown in the drawing, the wireless access network of the LTE system includes evolved nodeBs (hereinafter, referred to as "ENBs", "nodeBs", or "base stations") 5*a*-05, 5*a*-10, 5*a*-15, and 5*a*-20, a mobility management entity (MME) 5*a*-25, and a serving gateway (S-GW) 5*a*-30. User equipment (hereinafter, referred to as "UE" or a "terminal") 5*a*-35 accesses an external network through the ENBs 5*a*-05 to 5*a*-20 and the S-GW 5*a*-30.

In FIG. 5A, the ENBs 5*a*-05 to 5*a*-20 correspond to existing nodeBs of a UMTS system. The ENB is connected to the UE 5*a*-35 via a wireless channel and plays a more complex role than the existing nodeB. In the LTE system, since all user traffic including real-time services, such as voice-over-IP (VoIP) through the Internet protocol, is served through a shared channel, a device for collecting status information, such as buffer status, available transmission power status, and channel status of UEs, and performing scheduling is required. The ENBs 5a-05 to 5a-20 serve as such a device. One ENB typically controls multiple cells. For example, in order to realize a data rate of 100 Mbps, the LTE system uses, as wireless access technology, orthogonal frequency division multiplexing (hereinafter, referred to as "OFDM") in a bandwidth of, for example, 20 MHz. Further, an adaptive modulation and coding (hereinafter, referred to as "AMC") scheme is applied to determine a modulation scheme and a channel coding rate in accordance with the channel status of a terminal. The S-GW 5a-30 is a device for providing data bearers and generates or removes data bearers under the control of the MME 5a-25. The MME is a device that performs various control functions, as well as a mobility management function for a terminal, and is connected to a plurality of base stations.

Figure 5B:
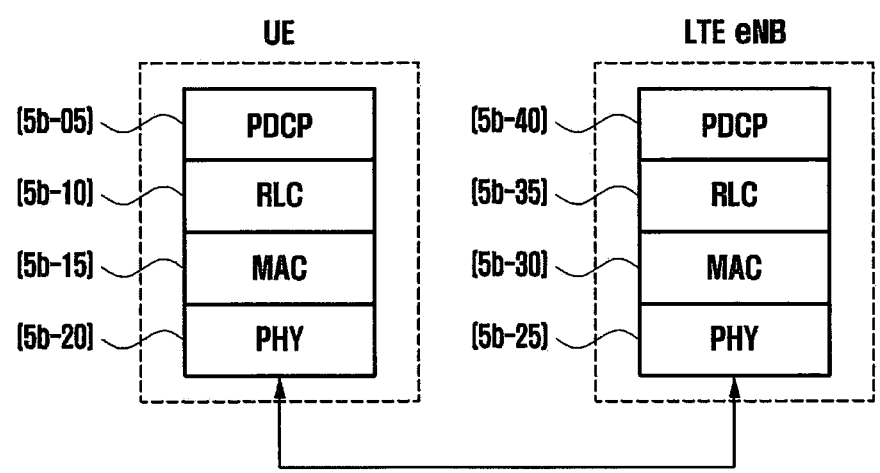
FIG. 5B is a diagram illustrating a wireless protocol structure in an LTE system to which the disclosure may be applied.

FIG. 5B is a diagram illustrating a wireless protocol structure in an LTE system to which the disclosure may be applied.

Referring to FIG. 5B, the wireless protocol of the LTE system includes a packet data convergence protocol (PDCP) 5b-05 or 5b-40, a radio link control (RLC) 5b-10 or 5b-35, and a medium access control (MAC) 5b-15 or 5b-30 in a terminal and an ENB, respectively.

The packet data convergence protocol (PDCP) 5b-05 or 5b-40 performs operations, such as IP header compression/decompression and the like. The primary functions of the PDCP are summarized as follows.

Header compression and decompression (ROHC only)
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (hereinafter, referred to as "RLC") 5b-10 or 5b-35 reconfigures a PDCP PDU (packet data unit) to an appropriate size and performs ARQ operation and the like. The primary functions of the RLC are summarized as follows.

Data transfer function (transfer of upper layer PDUs)
ARQ function (error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 5b-15 or 5b-30 is connected to a plurality of RLC entities configured in a single terminal, multiplexes RLC PDUs into MAC PDUs, and demultiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
Padding The physical layers 5b-20 and 5b-25 channel-code and modulate upper layer data, and convert the same into OFDM symbols to then be transmitted through a wireless channel, or demodulate OFDM symbols received through a wireless channel and channel-decode the same to then be transmitted to upper layers.

Figure 5C:
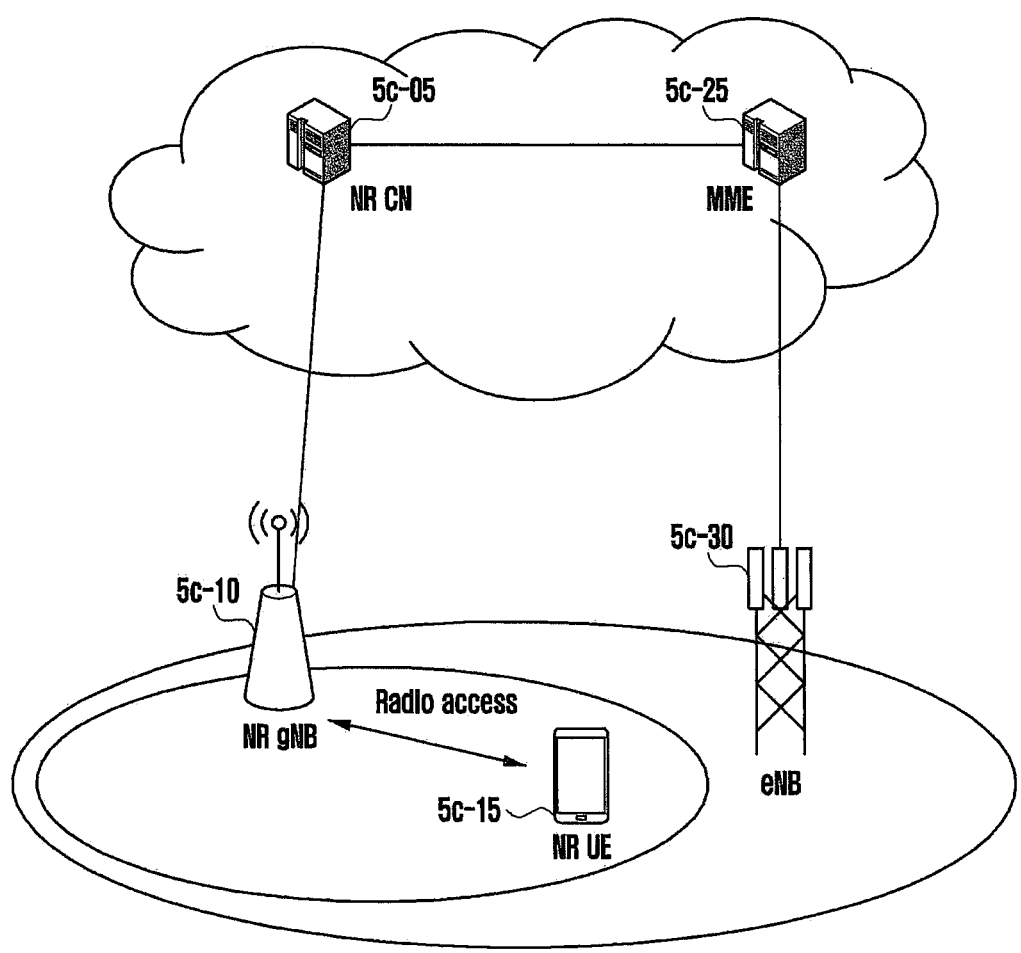
FIG. 5C is a diagram illustrating the structure of a next-generation mobile communication system to which the disclosure may be applied.

FIG. 5C is a diagram illustrating the structure of a next-generation mobile communication system to which the disclosure may be applied.

Referring to FIG. 5C, a wireless access network of a next-generation mobile communication system (hereinafter, referred to as an "NR" or "5G") includes a new radio nodeB (hereinafter, referred to as "NR gNB" or an "NR base station") 5c-10 and a new radio core network (NR CN) 5c-05 as shown in the drawing. New radio user equipment (hereinafter, referred to as "NR UE" or a "terminal") 5c-15 accesses an external network through the NR gNB 5c-10 and the NR CN 5c-05.

In FIG. 5C, the NR gNB 5c-10 corresponds to an evolved nodeB (eNB) of an existing LTE system. The NR gNB is connected to the NR UE 5c-15 through a wireless channel, and may provide services superior to those of the existing nodeB. In the next-generation mobile communication system, since all user traffic is served through a shared channel, a device for collecting status information, such as buffer status, available transmission power status, and channel status of UEs, and performing scheduling is required. The NR NB 5c-10 serves as such a device. One NR gNB typically controls multiple cells. In order to realize super-high data rates compared to the existing LTE system, the next-generation mobile communication system may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal. The NR CN 5c-05 performs functions such as mobility support, bearer configuration, and QoS configuration. The NR CN is a device that performs various control functions, as well as a mobility management function for a terminal, and is connected to a plurality of base stations. In addition, the next-generation mobile communication system may interwork with the existing LTE system, and the NR CN is connected to an MME 5c-25 through a network interface. The MME is connected to the eNB 5c-30, which is an existing base station.

Figure 5D:
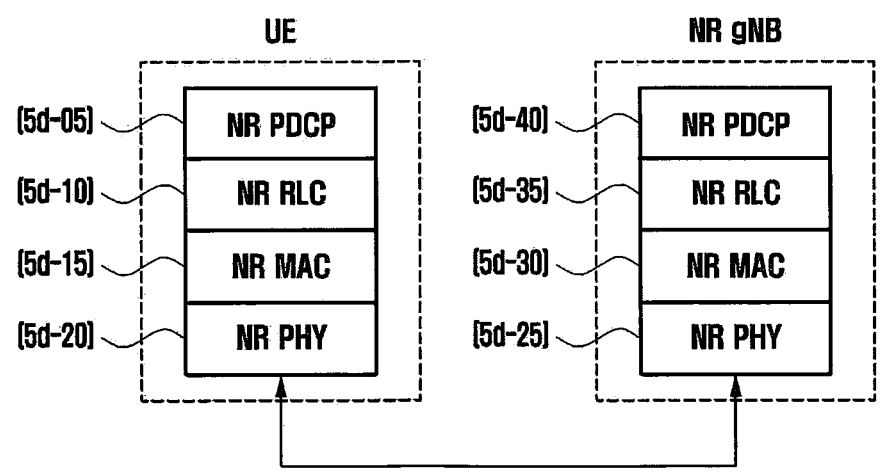
FIG. 5D is a diagram illustrating a wireless protocol structure of a next-generation mobile communication system to which the disclosure may be applied.

FIG. 5D is a diagram illustrating the wireless protocol structure of a next-generation mobile communication system to which the disclosure may be applied.

Referring to FIG. 5D, the wireless protocol of the next-generation mobile communication system includes NR PDCP 5*d*-05 or 5*d*-40, NR RLC 5*d*-10 or 5*d*-35, and NR MAC 5*d*-15 or 5*d*-30 in the terminal and the NR base station, respectively. The primary functions of the NR PDCP 5*d*-05 or 5*d*-40 may include some of the following functions.

- Header compression and decompression: ROHC only
- Transfer of user data
- In-sequence delivery of upper layer PDUs
- Sequence reordering (PDCP PDU reordering for reception)
- Duplicate detection of lower layer SDUs
- Retransmission of PDCP SDUs
- Ciphering and deciphering
- Timer-based SDU discard in uplink The above reordering function of the NR PDCP entity refers to a function of reordering PDCP PDUs received in a lower layer based on a PDCP sequence number (SN), may include a function of transmitting data to an upper layer in the reordered order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 5*d*-10 or 5*d*-35 may include some of the following functions.

- Data transfer function (transfer of upper layer PDUs)
- In-sequence delivery of upper layer PDUs
- Out-of-sequence delivery of upper layer PDUs
- ARQ function (error correction through ARQ)
- Concatenation, segmentation, and reassembly of RLC SDUs
- Re-segmentation of RLC data PDUs
- Reordering of RLC data PDUs
- Duplicate detection
- Protocol error detection
- RLC SDU discard
- RLC re-establishment The above in-sequence delivery function of an NR RLC entity refers to a function of transferring RLC SDUs received from a lower layer to an upper layer in sequence, may include a function of, if one original RLC SDU is divided into a plurality of RLC SDUs and received, reassembling and transmitting the same, may include a function of reordering the received RLC PDUs based on an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to the upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival regardless of a serial number or a sequence number), and may be transmitted to the PDCP entity in an out-pf-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity refers to a function of directly delivering RLC SDUs received from a lower layer to an upper layer regardless of sequence, may include a function of, if one original RLC SDU is divided into a plurality of RLC SDUs and is received, reassembling and delivering the same, and may include a function of storing and ordering RLC SNs or PDCP SNs of the received RLC PDUs, thereby recording the lost RLC PDUs.

The NR MAC 5*d*-15 or 5*d*-30 may be connected to a plurality of NR RLC entities configured in a single terminal, and the primary functions of the NR MAC may include some of the following functions.

- Mapping between logical channels and transport channels
- Multiplexing/demultiplexing of MAC SDUs
- Scheduling information reporting
- HARQ function (error correction through HARQ)
- Priority handling between logical channels of one UE
- Priority handling between UEs by means of dynamic scheduling
- MBMS service identification
- Transport format selection
- Padding The NR PHY layers 5*d*-20 and 5*d*-25 may perform operations of channel-coding and modulating the upper layer data into OFDM symbols, transmitting the same through a wireless channel, or operations of demodulating and channel-decoding the OFDM symbols received through the wireless channel and transmitting the same through the upper layer.

Figure 5E:
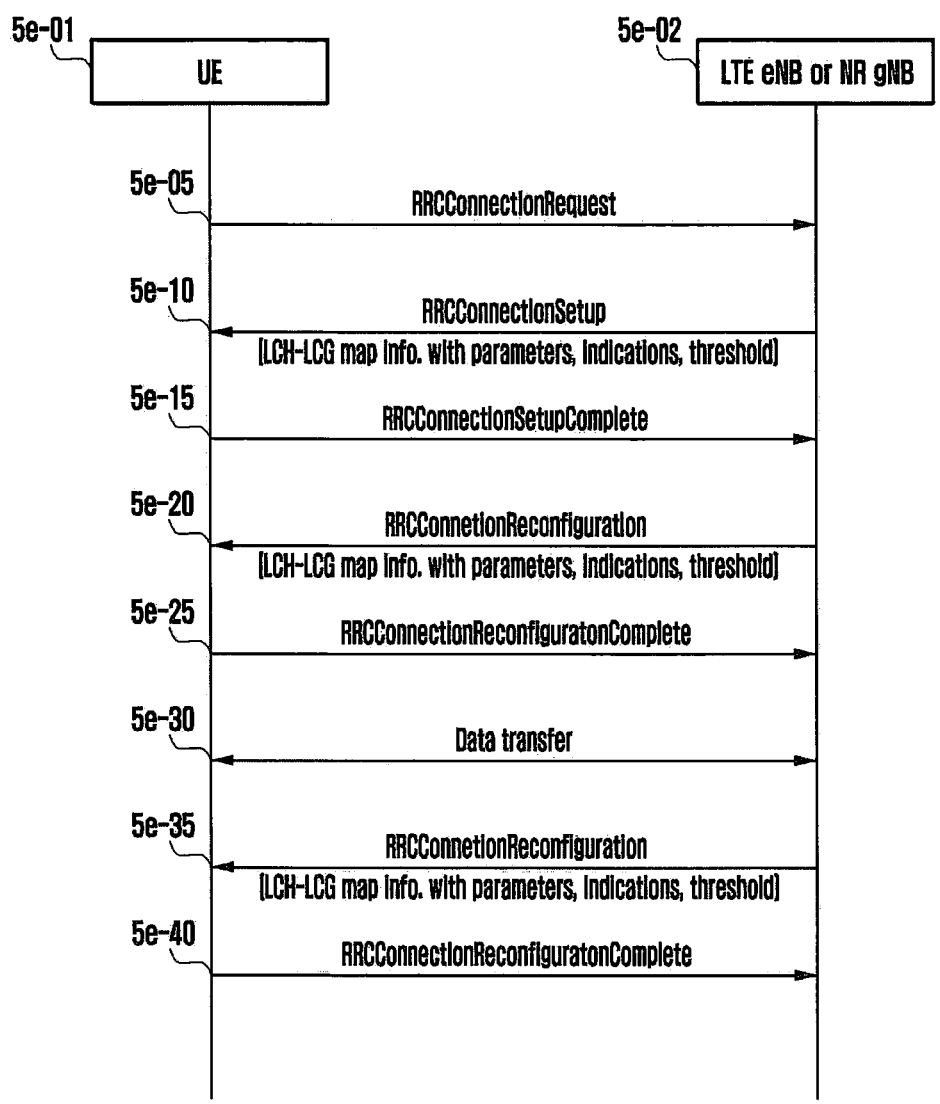
FIG. 5E is a diagram illustrating a procedure in which a terminal configures respective entities and bearers in a next-generation mobile communication system of the disclosure.

FIG. 5E is a diagram illustrating a procedure in which a terminal configures respective entities and bearers in the next-generation mobile communication system of the disclosure.

FIG. 5E is a diagram for explaining a procedure in which the terminal establishes a connection with a network and configures respective entities in order to transmit and receive data according to the disclosure.

If data to be transmitted is generated, a terminal 5*e*-01 that is currently in an idle mode (hereinafter, referred to as an "idle mode UE") performs an RRC connection establishment process with an LTE base station or an NR base station 5*e*-02. The terminal establishes reverse transmission synchronization with the base station through a random access procedure and transmits an RRCConnectionRequest message to the base station (5*e*-05). The RRCConnectionRequest message contains an identifier of the terminal, the reason for establishing the connection, and the like.

The base station transmits an RRCConnectionSetup message such that the terminal establishes an RRC connection (5*e*-10). The RRCConnectionSetup message may contain RRC connection configuration information, configuration information of each layer, and the like. In other words, the RRCConnectionSetup message may include configuration information for a PHY or NR PHY entity, a MAC or NR MAC entity, an RLC or NR RLC entity, or a PDCP or NR PDCP entity, and may include information indicating configuration for specific functions, among the functions supported by the entities (among the functions for each layer described in FIG. 5B or 5D). In addition, the RRCConnectionSetup message may include mapping information between logical channels (LCHs) and logical channel groups (LCGs), information about logical channels or logical channel groups to which a value BSR_TRIGGER_COUNT is applied, information about a threshold value for comparing the value BSR_TRIGGER_COUNT to trigger the BSR, mapping information between logical channels or logical channel groups and TTI, an indication indicating whether or not the service for logical channels or logical channel groups is a URLLC service, and the like.

The RRC connection is also called a "signaling radio bearer (SRB)", and is used for transmitting/receiving RRC messages, which are control messages between the terminal and the base station. The terminal having established the RRC connection transmits the RRCConnetionSetupComplete message to the base station (5e-15). The base station transmits an RRCConnectionReconfiguration message to the terminal to establish a data radio bearer (DRB) (5e-20). The RRCConnectionReconfiguration message may contain RRC connection configuration information, configuration information of respective layers, and the like. In other words, the RRCConnectionReconfiguration message may include configuration information for a PHY or NR PHY entity, a MAC or NR MAC entity, an RLC or NR RLC entity, or a PDCP or NR PDCP entity, and may include information indicating configuration for specific functions, among the functions supported by the entities (among the functions for each layer described in FIG. 5B or 5D). In addition, the RRCConnectionReconfiguration message may include mapping information between logical channels (LCHs) and logical channel groups (LCGs), information about logical channels or logical channel groups to which a value BSR_TRIGGER_COUNT is applied, information about a threshold value for comparing the value BSR_TRIGGER_COUNT to trigger the BSR, mapping information between logical channels or logical channel groups and TTI, an indication indicating whether or not the service for logical channels or logical channel groups is a URLLC service, and the like. Further, the RRCConnection-Reconfiguration message may include configuration information of a DRB for processing user data.

The terminal configures a DRB and functions of the respective layers by applying the information included in the RRCConnectionReconfiguration message, thereby transmitting an RRCConnectionReconfigurationComplete message to the base station (5e-25). If all of the above processes are completed, the terminal transmits and receives data to and from the base station (5e-30). In addition, if necessary, the base station retransmits the RRCConnectionReconfiguration message to the terminal during the transmission and reception (5e-35), thereby reconfiguring the configuration information of the respective layers of the terminal. The RRC-ConnectionReconfiguration message may contain RRC connection configuration information, configuration information of respective layers, and the like. In other words, the RRCConnectionReconfiguration message may include configuration information for a PHY or NR PHY entity, a MAC or NR MAC entity, an RLC or NR RLC entity, or a PDCP or NR PDCP entity, and may include information indicating configuration for specific functions, among the functions supported by the entities (among the functions for each layer described in FIG. 5B or 5D). In addition, the RRCConnectionReconfiguration message may include mapping information between logical channels (LCHs) and logical channel groups (LCGs), information about logical channels or logical channel groups to which a value BSR_TRIGGER_COUNT is applied, information about a threshold value for comparing the BSR_TRIGGER_COUNT value to trigger the BSR, mapping information between logical channels or logical channel groups and TTI, an indication indicating whether or not the service for logical channels or logical channel groups is a URLLC service, and the like.

If the configuration of the respective entities is completed according to the information included in the RRCConnectionReconfiguration message, the terminal transmits an RRCConnectionReconfigurationComplete message to the base station (5e-40).

Figure 5F:
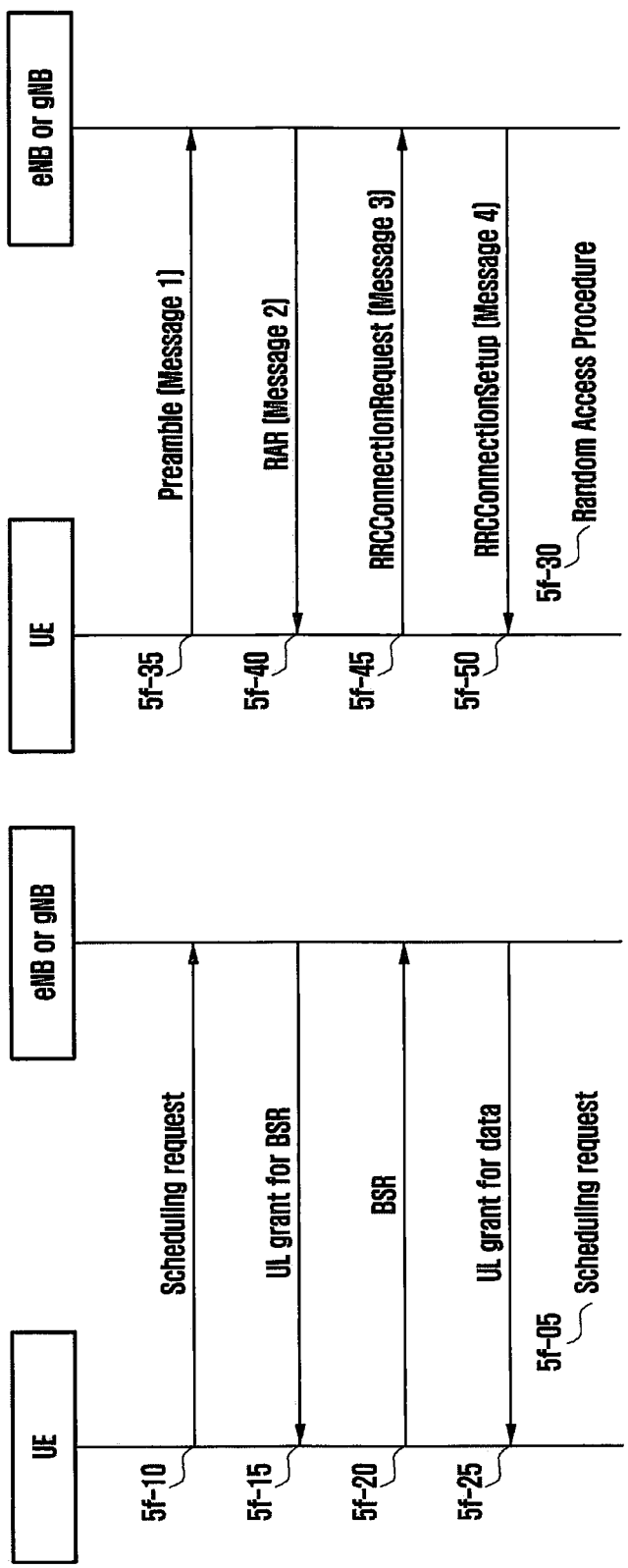
FIG. 5F is a diagram illustrating a procedure in which a terminal makes a request to a base station for transmission resources in order to transmit uplink data according to a fifth embodiment of the disclosure.

FIG. 5F is a diagram illustrating a procedure in which a terminal makes a request to a base station for transmission resources in order to transmit uplink data according to a fifth embodiment of the disclosure.

In FIG. 5F, if data to be transmitted in the uplink is generated, the terminal identifies whether or not a transmission resource for a scheduling request (SR) is allocated to the terminal. If transmission resources for the SR are allocated, the terminal performs a scheduling request procedure (5f-05).

The terminal sends a scheduling request to the base station using the transmission resource allocated for the SR (5f-10). Upon receiving the scheduling request through the SR transmission resource, the base station may recognize the terminal that requested the scheduling because the base station has already allocated the SR transmission resource to the terminal. The base station allocates an uplink transmission resource to the terminal such that the terminal is able to transmit buffer status information in response to the scheduling request (5f-15). That is, the base station may indicate the transmission resource in the time/frequency domain through which the terminal transmits the buffer status information using a control signal. The terminal having been allocated with an uplink transmission resource transmits a buffer status report (BSR) for the logical channels or logical channel groups currently possessed by the terminal to the base station using the transmission resource (5f-20). If the uplink transmission resources are sufficient, the terminal may transmit uplink transmission data as well. Upon receiving the BSR, the base station allocates transmission resources for uplink data transmission to the terminal through scheduling (5f-25). That is, the base station may indicate the transmission resources in the time/frequency domain through which the terminal transmits the uplink data using a control signal.

In spite of occurrence of uplink transmission resources in the terminal, if the terminal has no SR transmission resource allocated in advance, the terminal may perform a random access procedure (5f-30).

That is, the terminal may transmit a preamble to the base station (5f-35), may receive a random access response (RAR) (5f-40), and may transmit Message 3 to the base station, thereby requesting connection (5f-45). If the base station permits the access of the terminal, the base station may transmit Message 4 to notify the terminal that the random access procedure has been successfully performed (5f-50). The terminal may transmit Message 5 to complete the connection establishment after Message 4, and if there are sufficient transmission resources, the terminal may transmit the BSR together with Message 5, and may complete the RRC connection establishment, thereby transmitting/receiving data.

Figure 5G:
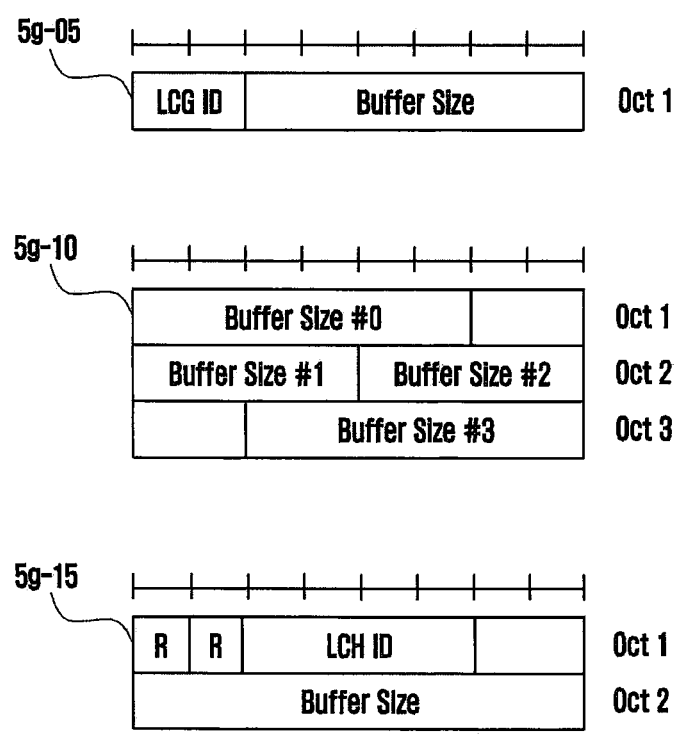
FIG. 5G is a diagram illustrating formats used by a terminal when transmitting a buffer status report (BSR) to a base station according to a fifth embodiment of the disclosure.

FIG. 5G is a diagram illustrating formats that a terminal may use when transmitting a buffer status report (BSR) to a base station according to a fifth embodiment of the disclosure.

In FIG. 5G, a first BSR format may include a reserved field of 2 bits, a logical channel group identifier (LCG ID) of 2 bits, and a buffer size field of 6 bits (5g-05). If only one logical channel group, among the logical channel groups, has data, the first BSR format may be used to report the same.

In FIG. 5G, a second BSR format may include four buffer size fields of 6 bits (5g-10). Each buffer size field of 6 bits is information indicating each predetermined logical channel group. In addition, if two or more logical channel groups have data, the second BSR format may be used to report the same.

In FIG. 5G, a third BSR format may include a reserved field of 2 bits, a logical channel identifier (LCH ID) of 4 bits, and a buffer size field of 10 bits (5g-15). The third BSR format may be used to report the buffer status for a specific logical channel indicated by the base station, and may report more detailed buffer status of a specific logical channel.

Different BSR formats may have different MAC CE fields in the header. Alternatively, the BSR formats may have additional fields for distinguishing the BSR formats even if they have the same MAC CE field.

The buffer size fields of the first BSR format and the second BSR format may indicate values sampled on a log scale between a minimum value and a maximum value of a buffer table, and the buffer size field of the third BSR format may indicate a value sampled on a linear scale between a minimum value and a maximum value of a buffer table.

The fifth embodiment of the disclosure proposes a rule and a procedure for triggering the BSR as follows.

Embodiment 5-1 of triggering the BSR in the disclosure is as follows.

In Embodiment 5-1, the terminal may have a first BSR, a second BSR, and a third BSR. The first BSR, the second BSR, and the third BSR may use the first BSR format or the second BSR format described in FIG. 5G. That is, if only one of the logical channel groups has data, the first BSR format may be used to report the same. In addition, if two or more logical channel groups have data, the second BSR format may be used to report the same.

The first BSR, which is a regular BSR, is triggered if a first condition is satisfied, and the first BSR triggers a scheduling request (SR). That is, the first BSR makes a request for scheduling to the base station using a preconfigured SR transmission resource. If there is no preconfigured SR transmission resource, a random access procedure may be performed. Alternatively, if a UL grant is not received after the SR transmission is performed n times, a random access procedure may be performed.

Satisfaction of the first condition above may correspond to the case where data of the terminal is newly generated in a logical channel or a logical channel group having a higher priority than other data previously generated and stored in the buffer, the case where data is newly generated for the first time with no existing data in the buffer, or the case where a BSR retransmission timer has expired. The BSR retransmission timer (retxBSR-Timer) is updated every time one of three BSRs is transmitted, and the timer value may be set by the base station. For example, the timer value may be set in step 5e-10, 5e-20, or 5e-35 in FIG. 5E.

The second BSR, which is a padding BSR, may be transmitted to the base station along with the data if a second condition is satisfied.

Satisfaction of the second condition may correspond to the case where there are remaining transmission resources even after the terminal assigns all uplink transmission data to be transmitted by the terminal to the transmission resources allocated from the base station or the case where the size of added padding is greater than the sum of the size of the BSR and the size of a header for the BSR.

The third BSR, which is a periodic BSR, may be transmitted to the base station if a third condition is satisfied and if the terminal has an uplink transmission resource.

Satisfaction of the third condition refers to the case where a timer for the periodic BSR (periodicBSR-Timer) has expired. The timer for the periodic BSR (periodicBSR-Timer) is updated every time one of three BSRs is transmitted, and the timer value may be set by the base station. For example, the timer value may be set in step 5e-10, 5e-20, or 5e-35 in FIG. 5E.

In Embodiment 5-1 above, only the first BSR may trigger the SR, and the second BSR and the third BSR may be able to transmit data only if uplink transmission resources are allocated.

Although the implementation of Embodiment 5-1 is simple, the SR is triggered only if data is generated in logical channels or logical channel groups having a higher priority. Therefore, if data continues to be generated in logical channels or logical channel groups having the same or lower priority, the SR is not triggered, which may cause a delay in the case where a high data rate is required. Therefore, Embodiment 5-2 of the disclosure proposes additional variables and conditions to overcome the above case.

Embodiment 5-2 for triggering the SR in the disclosure is as follows.

In Embodiment 5-2, the terminal may have a first BSR, a second BSR, and a third BSR. The first BSR, the second BSR, and the third BSR may use the first BSR format or the second BSR format described in FIG. 5G. That is, if only one of the logical channel groups has data, the first BSR format may be used to report the same. In addition, if two or more logical channel groups have data, the second BSR format may be used to report the same.

The first BSR, which is a regular BSR, is triggered if a first condition is satisfied, and the first BSR triggers a scheduling request (SR). That is, the first BSR makes a request for scheduling to the base station using a predetermined SR transmission resource. If there is no preconfigured SR transmission resource, a random access procedure may be performed. Alternatively, if a UL grant is not received after the SR transmission is performed n times, a random access procedure may be performed.

Satisfaction of the first condition may correspond to the case where data of the terminal is newly generated in a logical channel or a logical channel group having a higher priority than other data previously generated and stored in the buffer, the case where data is newly generated for the first time with no existing data in the buffer, or the case where a BSR retransmission timer has expired. The terminal may define a new variable BSR_TRIGGER_COUNT, and may receive information about logical channels or logical channel groups to which the variable BSR_TRIGGER_COUNT is to be applied and information about a threshold value to be compared with the variable in step 5e-10, 5e-20, or 5e-35 in FIG. 5E.

If data is generated in logical channels or logical channel groups configured with logical channels or logical channel groups to be applied to the variable BSR_TRIGGER_COUNT, the terminal accumulates and adds the size of the newly generated data to BSR_TRIGGER_COUNT and maintains the value BSR_TRIGGER_COUNT. The value BSR_TRIGGER_COUNT is initialized to 0 if the terminal transmits one of three BSRs. If data is newly generated in the configured logical channels or logical channel groups, the size thereof is accumulated and added to the value, and the value is maintained. The first condition may further include the case where the value of BSR_TRIGGER_COUNT exceeds a threshold value configured above. That is, if the value of BSR_TRIGGER_COUNT exceeds the configured threshold value, the first BSR is triggered, and the first BSR triggers the SR. However, if the value of BSR_TRIGGER_COUNT exceeds the configured threshold value above, the first BSR is triggered after transmitting the current MAC PDU, instead of immediately triggering the first BSR (this is due to the fact that if the first BSR is triggered before the current MAC PDU is transmitted, the terminal may perform a logical channel prioritization (LCP) procedure again). Therefore, despite the fact that logical channels or logical channel groups configured by the base station have relatively low priorities, the value BSR_TRIGGER_COUNT is accumulated and maintained, and if the value BSR_TRIGGER_COUNT exceeds a predetermined threshold value, the first BSR is triggered so that the first BSR triggers the SR.

A value BSR_TRIGGER_COUNT for the data included in the BSR previously reported by the terminal is not accumulated (because the value BSR_TRIGGER_COUNT is reset to 0 every time the BSR is transmitted). The first condition related to the added variable BSR_TRIGGER_COUNT does not cause delay in the case where a high data rate is required, and allows the terminal to continuously trigger the first BSR so that the first BSR requests the SR.

The BSR retransmission timer (retxBSR-Timer) is updated every time one of three BSRs is transmitted, and the timer value may be set by the base station. For example, the timer value may be set in step 5e-10, 5e-20, or 5e-35 in FIG. 5E.

The second BSR, which is a padding BSR, may be transmitted to the base station along with the data if a second condition is satisfied.

Satisfaction of the second condition may correspond to the case where there are remaining transmission resources even after the terminal assigns all uplink transmission data to be transmitted by the terminal to the transmission resources allocated from the base station or the case where the size of added padding is greater than the sum of the size of the BSR and the size of a header for the BSR.

The third BSR, which is a periodic BSR, may be transmitted to the base station if a third condition is satisfied and if the terminal has an uplink transmission resource.

Satisfaction of the third condition refers to the case where a timer for the periodic BSR (periodicBSR-Timer) has expired. The timer for the periodic BSR (periodicBSR-Timer) is updated every time one of three BSRs is transmitted, and the timer value may be set by the base station. For example, the timer value may be set in step 5e-10, 5e-20, or 5e-35 in FIG. 5E.

In Embodiment 5-2 above, only the first BSR may trigger the SR, and the second BSR and the third BSR are able to transmit data only if uplink transmission resources are allocated.

Embodiment 5-3 for triggering the SR in the disclosure is as follows.

In Embodiment 5-3, the terminal may have a first BSR, a second BSR, and a third BSR. The first BSR, the second BSR, and the third BSR may use the first BSR format or the second BSR format described in FIG. 5G. That is, if only one of the logical channel groups has data, the first BSR format may be used to report the same. In addition, if two or more logical channel groups have data, the second BSR format may be used to report the same.

The first BSR, which is a regular BSR, is triggered if a first condition is satisfied, and the first BSR triggers a scheduling request (SR). That is, the first BSR makes a request for scheduling to the base station using a preconfigured SR transmission resource. If there is no preconfigured SR transmission resource, a random access procedure may be performed. Alternatively, if a UL grant is not received after the SR transmission is performed n times, a random access procedure may be performed.

Satisfaction of the first condition may correspond to the case where data of the terminal is newly generated in a logical channel or a logical channel group having a higher priority than other data previously generated and stored in the buffer, the case where data is newly generated for the first time with no existing data in the buffer, or the case where a BSR retransmission timer has expired. The terminal may define a new variable BSR_TRIGGER_COUNT, and may receive information about logical channels or logical channel groups to which the variable BSR_TRIGGER_COUNT is to be applied and information about a threshold value to be compared with the variable in step 5e-10, 5e-20, or 5e-35 in FIG. 5E.

If data is transmitted in logical channels or logical channel groups configured with logical channels or logical channel groups to be applied to the variable BSR_TRIGGER_COUNT, the terminal accumulates and adds the size of the transmitted data to BSR_TRIGGER_COUNT and maintains the value BSR_TRIGGER_COUNT. The value BSR_TRIGGER_COUNT is initialized to 0 if the terminal transmits one of three BSRs, and if data is newly transmitted in the configured logical channels or logical channel groups, the size thereof is accumulated and added to the value, and the value is maintained. The first condition may further include the case where the value of BSR_TRIGGER_COUNT exceeds a predetermined threshold value above. That is, if the value of BSR_TRIGGER_COUNT exceeds the configured threshold value, the first BSR is triggered, and the first BSR triggers the SR. However, if the value of BSR_TRIGGER_COUNT exceeds the configured threshold value above, the first BSR is triggered after transmitting the current MAC PDU, instead of immediately triggering the first BSR (this is due to the fact that if the first BSR is triggered before the current MAC PDU is transmitted, the base station may perform a logical channel prioritization (LCP) procedure again). Therefore, despite the fact that logical channels or logical channel groups configured by the base station have relatively low priorities, the value BSR_TRIGGER_COUNT may be accumulated and maintained, and if the value BSR_TRIGGER_COUNT exceeds a predetermined threshold value, the first BSR is triggered so that the first BSR triggers the SR. A value BSR_TRIGGER_COUNT for the data included in the BSR previously reported by the terminal is not accumulated (because the value BSR_TRIGGER_COUNT is reset to 0 every time the BSR is transmitted). The first condition related to the added variable BSR_TRIGGER_COUNT does not cause delay in the case where a high data rate is required, and allows the terminal to continuously trigger the first BSR so that the first BSR requests the SR.

The BSR retransmission timer (retxBSR-Timer) is updated every time one of three BSRs is transmitted, and the timer value may be set by the base station. For example, the timer value may be set in step 5e-10, 5e-20, or 5e-35 in FIG. 5E.

The second BSR, which is a padding BSR, may be transmitted to the base station along with the data if a second condition is satisfied.

Satisfaction of the second condition may correspond to the case where there are remaining transmission resources even after the terminal assigns all uplink transmission data to be transmitted by the terminal to the transmission resources allocated from the base station or the case where the size of added padding is greater than the sum of the size of the BSR and the size of a header for the BSR.

The third BSR, which is a periodic BSR, may be transmitted to the base station if a third condition is satisfied and if the terminal has an uplink transmission resource.

Satisfaction of the third condition refers to the case where a timer for the periodic BSR (periodicBSR-Timer) has expired. The timer for the periodic BSR (periodicBSR-Timer) is updated every time one of three BSRs is transmitted, and the timer value may be set by the base station. For example, the timer value may be set in step 5e-10, 5e-20, or 5e-35 in FIG. 5E.

In Embodiment 5-3 above, only the first BSR may trigger the SR, and the second BSR and the third BSR are able to transmit data only if uplink transmission resources are allocated.

In the disclosure, Embodiment 5-4 proposes a rule and a procedure for supporting an ultra-reliable low-latency communication (URLLC) service.

Embodiment 5-4 of the disclosure may be further applied in addition to the Embodiment 5-1, 5-2, or 5-3 described above. That is, the base station may preconfigure information about logical channels or logical channel groups corresponding to the URLLC service in step 5e-10, 5e-20, or 5e-35 in FIG. 5E.

In Embodiment 5-4, if data is generated in the terminal, the terminal identifies whether or not the data was generated in the logical channels or logical groups specified for the URLLC service. If the data was generated in the logical channels or logical groups specified for the URLLC service, the terminal may trigger the SR, and may transmit the first BSR for logical channels or logical channel groups corresponding to the URLLC. That is, the first condition of Embodiment 5-1, Embodiment 5-2, or Embodiment 5-3 may further include the case where data is generated in the logical channels or logical groups specified for the URLLC service.

In the disclosure, Embodiment 5-5 proposes a rule and a procedure for further transmitting the third BSR format in order to support an ultra-reliable low-latency communication (URLLC) service.

Embodiment 5-5 of the disclosure may be further applied in addition to Embodiment 5-1, Embodiment 5-2, or Embodiment 5-3 described above. That is, the base station may preconfigure information about logical channels or logical channel groups corresponding to the URLLC service in step 5e-10, 5e-20, or 5e-35 in FIG. 5E.

In Embodiment 5-5, if data is generated in the terminal, the terminal identifies whether or not the data was generated in the logical channels or logical groups specified for the URLLC service. If the data was generated in the logical channels or logical groups specified for the URLLC service, the terminal may transmit an additional buffer status report using the third BSR format. That is, a condition in which the data of the terminal is generated in the logical channels or logical groups specified for the URLLC service may be included in the first condition of Embodiment 5-1, Embodiment 5-2, or Embodiment 5-3 described above. If the additional condition is satisfied, the terminal may include the first BSR (the first BSR format or the second BSR format) and an additional BSR (the third BSR format) in the MAC PDU, and may transmit the same to the base station. That is, the terminal may transmit BSR information about logical channel groups and BSR information about a logical channel for an additional URLLC service.

If data is generated in a plurality of logical channels configured as the URLLC service, the terminal may transmit a buffer status report on the logical channel group configured as the URLLC service using the first BSR format (the third BSR format may report buffer status for one logical channel). That is, if the additional condition is satisfied and if data is generated in a plurality of logical channels configured as the URLLC service, the terminal may include the first BSR (the first BSR format or the second BSR format) and an additional BSR (the first BSR format) in the MAC PDU, and may transmit the same to the base station. That is, the terminal may transmit BSR information about logical channel groups and BSR information about a logical channel for an additional URLLC service.

Since the base station is able to identify that the data for the URLLC service has been generated through the additional BSR information and is able to identify detailed buffer status information thereon, the base station may quickly allocate the uplink transmission resources to the terminal through scheduling. In addition, the base station may allocate transmission resources corresponding to the TTI mapped with the logical channel or logical channel group mapped with the URLLC service.

Figure 5H:
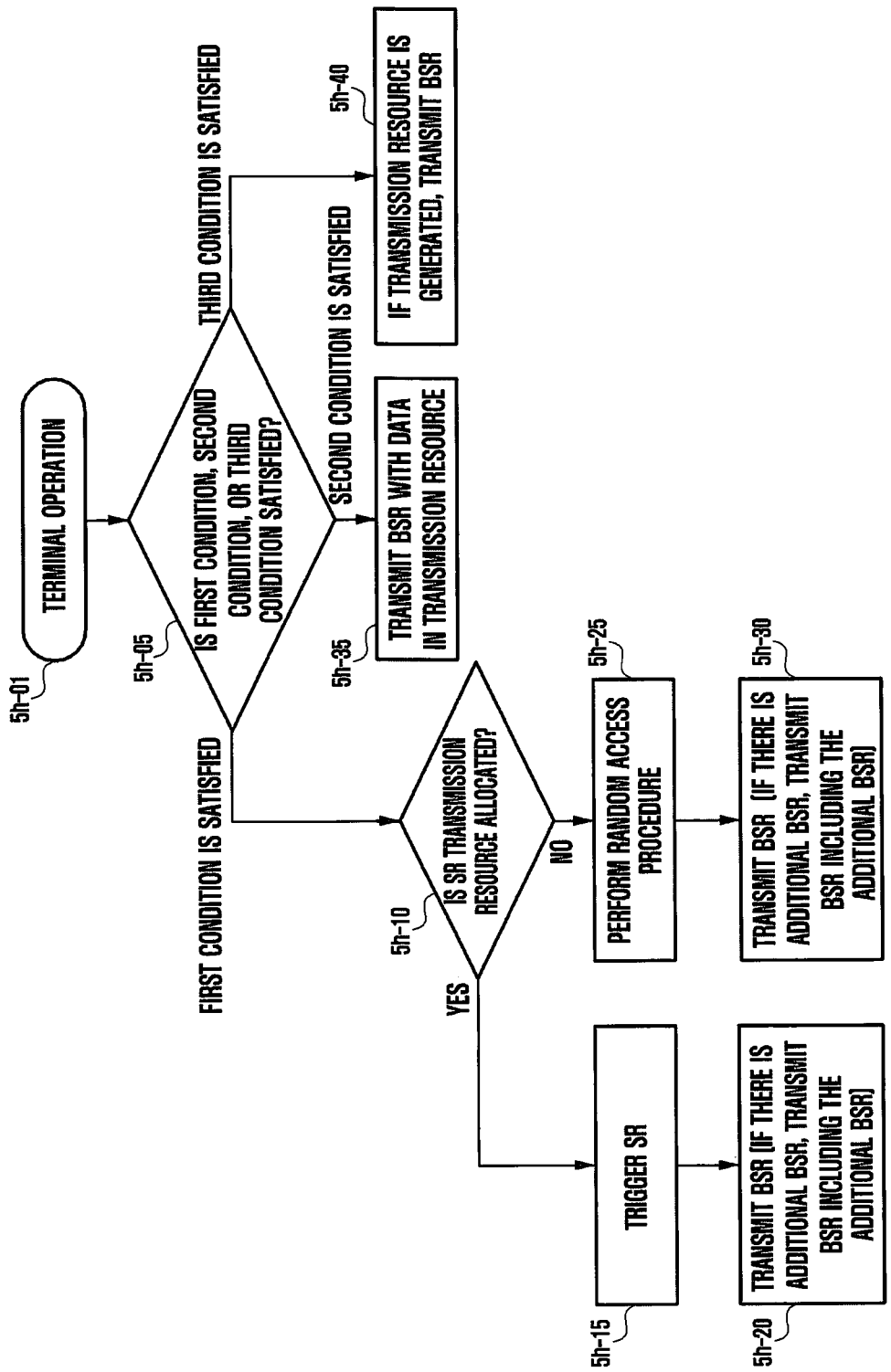
FIG. 5H is a diagram showing the operation of a terminal according to Embodiment 5-1, Embodiment 5-2, Embodiment 5-3, Embodiment 5-4, and Embodiment 5-5 of the disclosure.

FIG. 5H is a diagram illustrating the operation of the terminal according to Embodiment 5-1, Embodiment 5-2, Embodiment 5-3, Embodiment 5-4, or Embodiment 5-5 in the disclosure.

In FIG. 5H, if data is generated, the terminal 5h-01 identifies a first condition, a second condition, and a third condition (5h-05). If the first condition is satisfied, the terminal identifies whether or not a transmission resource for the SR is allocated in advance (5h-10). If a transmission resource for the SR is allocated, the terminal may trigger the SR (5h-15), and may transmit the first BSR, and if the additional BSR is configured, the terminal may transmit the BSR including the additional BSR (5h-20). If the SR transmission resource is not allocated in step 5h-10, the terminal may perform a random access procedure (5h-25), and may transmit the first BSR, and if the additional BSR is configured, the terminal may transmit the BSR including the additional BSR (5h-30). If the second condition is satisfied in step 5h-05, the terminal waits until a transmission resource is given, and if a transmission resource is given, the terminal transmits the second BSR (5h-35). If the third condition is satisfied in step 5h-05, the terminal waits until a transmission resource is given, and if a transmission resource is given, the terminal transmits the third BSR (5h-40).

Figure 5I:
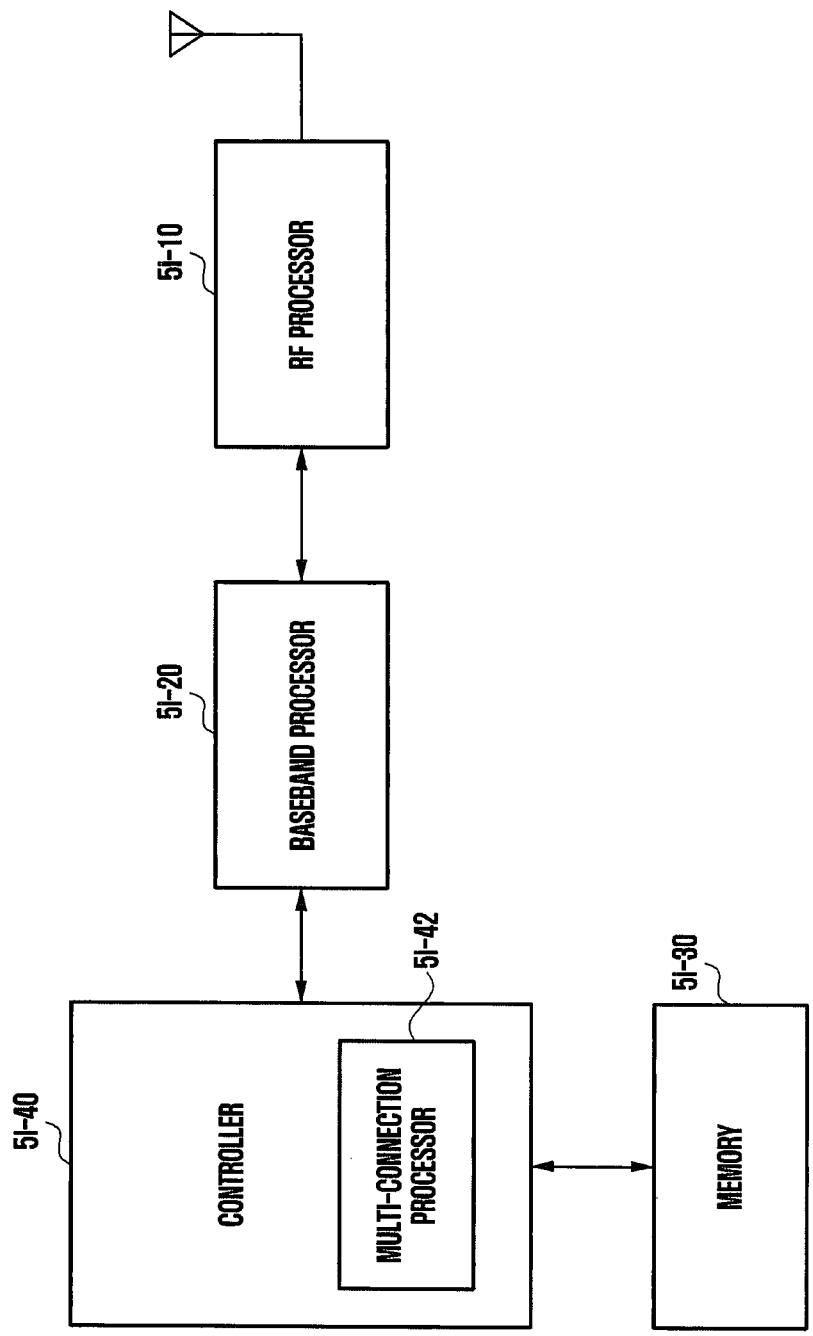
FIG. 5I illustrates the structure of a terminal according to a fifth embodiment of the disclosure.

FIG. 5I illustrates the structure of a terminal to which a fifth embodiment of the disclosure may be applied.

Referring to the drawing, the terminal includes a radio frequency (RF) processor 5i-10, a baseband processor 5i-20, a memory 5i-30, and a controller 5i-40.

The RF processor 5i-10 performs a function of transmitting and receiving a signal through a wireless channel, such as band conversion and amplification of a signal. That is, the RF processor 5i-10 up-converts a baseband signal provided from the baseband processor 5i-20 to an RF band signal to thus transmit the same through an antenna and down-converts an RF band signal received through the antenna to a baseband signal. For example, the RF processor 5i-10 may include a transmission filter, a reception filter, an amplifier, a mixer, an oscillator, a digital-to-analog converter (DAC), an analog-to-digital converter (ADC), and the like. Although only one antenna is shown in the drawing, the terminal may have a plurality of antennas. In addition, the RF processor 5i-10 may include a plurality of RF chains. Further, the RF processor 5i-10 may perform beamforming. To perform beamforming, the RF processor 5i-10 may adjust the phases and magnitudes of signals transmitted and received through a plurality of antennas or antenna elements. In addition, the RF processor may perform MIMO, and may receive multiple layers when performing the MIMO operation. The RF processor 5*i*-10 may perform reception beam sweeping by appropriately configuring a plurality of antennas or antenna elements under the control of the controller, or may adjust the direction of the reception beam and a beam width thereof such that the reception beam is coordinated with the transmission beam.

The baseband processor 5*i*-20 performs a function of conversion between a baseband signal and a bit string according to a physical layer specification of the system. For example, in the case of data transmission, the baseband processor 5*i*-20 encodes and modulates transmission bit strings, thereby generating complex symbols. In addition, upon receiving data, the baseband processor 5*i*-20 demodulates and decodes a baseband signal provided from the RF processor 5*i*-10 to thus recover reception bit strings. For example, in the case where an orthogonal frequency division multiplexing (OFDM) scheme is applied, when transmitting data, the baseband processor 5*i*-20 generates complex symbols by encoding and modulating transmission bit strings, maps the complex symbols with subcarriers, and then configures OFDM symbols through an inverse fast Fourier transform (IFFT) operation and cyclic prefix (CP) insertion. In addition, when receiving data, the baseband processor 5*i*-20 divides the baseband signal provided from the RF processor 5*i*-10 into OFDM symbol units, restores the signals mapped with the subcarriers through a fast Fourier transform (FFT) operation, and then restores reception bit strings through demodulation and decoding.

The baseband processor 5*i*-20 and the RF processor 5*i*-10 transmit and receive signals as described above. Accordingly, the baseband processor 5*i*-20 and the RF processor 5*i*-10 may be referred to as a "transmitter", a "receiver", a "transceiver", or a "communication unit". Further, at least one of the baseband processor 5*i*-20 and the RF processor 5*i*-10 may include a plurality of communication modules to support a plurality of different wireless access technologies. In addition, at least one of the baseband processor 5*i*-20 and the RF processor 5*i*-10 may include different communication modules for processing signals of different frequency bands. For example, the different wireless access technologies may include an LTE network, an NR network, and the like. In addition, the different frequency bands may include super high frequency (SHF) (e.g., 2.5 GHz or 5 GHz) band and a millimeter wave (e.g., 60 GHz) band.

The memory 5*i*-30 stores data such as basic programs, application programs, and configuration information for the operation of the terminal. The memory 5*i*-30 provides stored data in response to a request from the controller 5*i*-40.

The controller 5*i*-40 controls the overall operation of the terminal. For example, the controller 5*i*-40 transmits and receives signals through the baseband processor 5*i*-20 and the RF processor 5*i*-10. In addition, the controller 5*i*-40 records and reads data in and from the memory 5*i*-40. To this end, the controller 5*i*-40 may include at least one processor. For example, the controller 5*i*-40 may include a communication processor (CP) for controlling communication and an application processor (AP) for controlling upper layers such as application programs. The controller 5*i*-40 may include a multi-connection processor 5*i*-42 for performing a process for operation in a multi-connection mode.

Figure 5J:
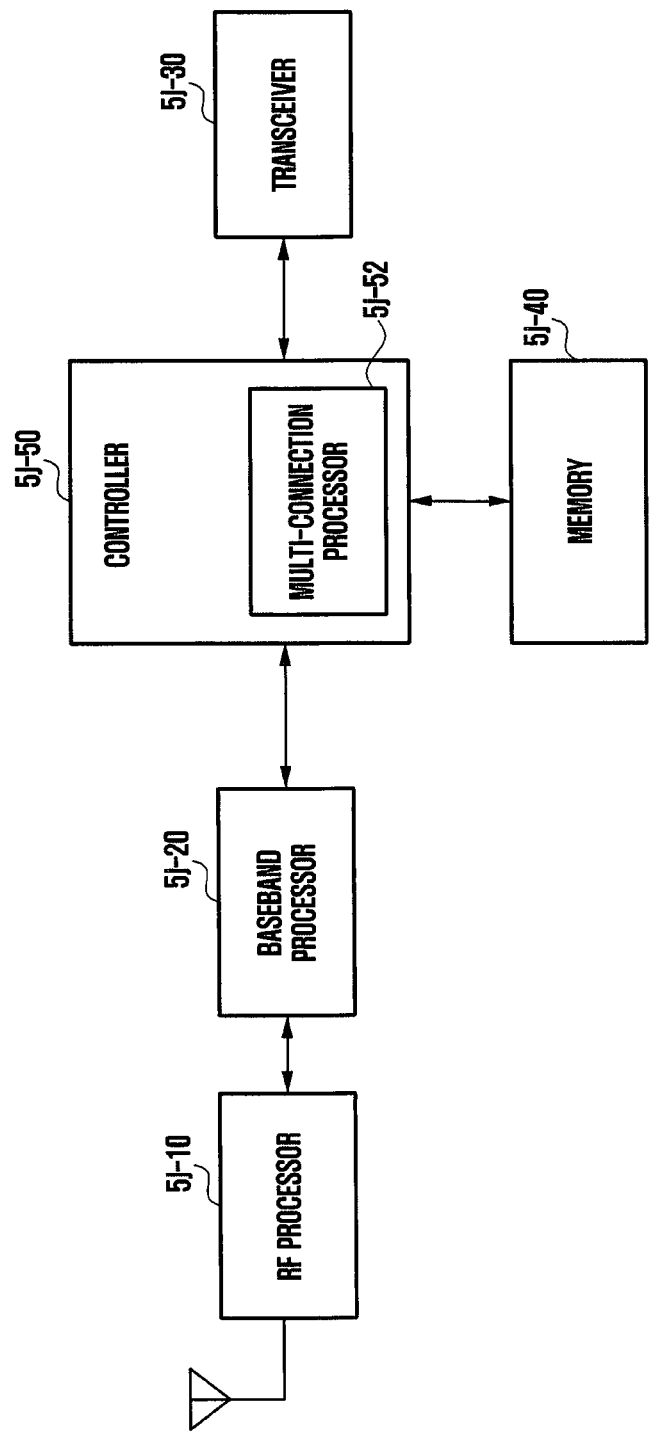
FIG. 5J is a block diagram illustrating the configuration of a base station in a wireless communication system according to a fifth embodiment of the disclosure.

FIG. 5J is a block diagram showing the configuration of a base station in a wireless communication system to which a fifth embodiment of the disclosure may be applied.

As shown in the drawing, the base station includes an RF processor 5*j*-10, a baseband processor 5*j*-20, a backhaul transceiver 5*j*-30, a memory 5*j*-40, and a controller 5*j*-50.

The RF processor 5*j*-10 performs a function of transmitting and receiving signals through a wireless channel, such as band conversion and amplification of a signal. That is, the RF processor 5*j*-10 up-converts a baseband signal provided from the baseband processor 5*j*-20 to an RF band signal to thus transmit the same through an antenna, and down-converts an RF band signal received through the antenna to a baseband signal. For example, the RF processor 5*j*-10 may include a transmission filter, a reception filter, an amplifier, a mixer, an oscillator, a DAC, an ADC, and the like. Although only one antenna is shown in the drawing, the base station may have a plurality of antennas. In addition, the RF processor 5*j*-10 may include a plurality of RF chains. Further, the RF processor 5*j*-10 may perform beamforming. To perform beamforming, the RF processor 5*j*-10 may adjust the phases and magnitudes of signals transmitted and received through a plurality of antennas or antenna elements. The RF processor may perform a downlink MIMO operation by transmitting one or more layers.

The baseband processor 5*j*-20 performs a function of conversion between a baseband signal and a bit string according to a physical layer specification of the system. For example, in the case of data transmission, the baseband processor 5*j*-20 encodes and modulates transmission bit strings, thereby generating complex symbols. In addition, upon receiving data, the baseband processor 5*j*-20 demodulates and decodes a baseband signal provided from the RF processor 5*j*-10 to thus recover reception bit strings. For example, in the case where an OFDM scheme is applied, when transmitting data, the baseband processor 5*j*-20 generates complex symbols by encoding and modulating transmission bit strings, maps the complex symbols with subcarriers, and then configures OFDM symbols through the IFFT operation and CP insertion. In addition, when receiving data, the baseband processor 5*j*-20 divides the baseband signal provided from the RF processor 5*j*-10 into OFDM symbol units, restores the signals mapped with the subcarriers through the FFT operation, and then restores reception bit strings through demodulation and decoding. The baseband processor 5*j*-20 and the RF processor 5*j*-10 transmit and receive signals as described above. Accordingly, the baseband processor 5*j*-20 and the RF processor 5*j*-10 may be referred to as a "transmitter", a "receiver", a "transceiver", a "communication unit", or a "wireless communication unit".

The transceiver 5*j*-30 provides an interface for performing communication with other nodes in the network.

The memory 5*j*-40 stores data such as basic programs, application programs, and configuration information for the operation of the base station. In particular, the memory 5*j*-40 may store information about bearers allocated to a connected terminal, a measurement result reported from a connected terminal, and the like. In addition, the memory 5*j*-40 may store information that is a criterion for determining whether multiple connections are provided to the terminal or are released. In addition, the memory 5*j*-40 provides stored data in response to a request from the controller 5*j*-50.

The controller 5*j*-50 controls the overall operation of the base station. For example, the controller 5*j*-50 transmits and receives signals through the baseband processor 5*j*-20 and the RF processor 5*j*-10 or the backhaul transceiver 5*j*-30. In addition, the controller 5*j*-50 records and reads data in and from the memory 5*j*-40. To this end, the controller 5*j*-50 may include at least one processor. The controller 5*j*-50 may include a multi-connection processor 5j-52 for performing a process for operation in a multi-connection mode.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The invention claimed is:

1. A method performed by a base station in a wireless communication system, the method comprising:
   transmitting, to a terminal, system information including information related to beams;
   identifying a paging occasion for transmitting a paging to the terminal, wherein the paging occasion is a set of time slots; and
   transmitting, to the terminal, a same paging repeatedly through all transmission beams based on the paging occasion,
   wherein the paging occasion is identified by the terminal,
   wherein the set of time slots is related with a number of beams,
   wherein the number of beams is determined according to the information related to beams included in the system information, and
   wherein each of the time slots in the paging occasion corresponds to each of the beams.

2. The method of claim 1,
   wherein a paging frame is identified based on an identifier of the terminal,
   wherein the paging occasion is identified based on an identifier of the terminal, and
   wherein the paging frame comprises one or paging occasions.

3. The method of claim 1,
   wherein a synchronization signal is actually transmitted on the beams during a specific unit.

4. A method performed by a terminal in a wireless communication system, the method comprising:
   receiving, from a base station, system information including information related to beams;
   identifying a paging occasion, wherein the paging occasion is a set of time slots; and
   monitoring a paging based on the paging occasion,
   wherein the set of time slots is related with a number of beams,
   wherein the number of beams is determined according to the information related to beams included in the system information,
   wherein each of the time slots in the paging occasion corresponds to each of the beams, and
   wherein a same paging is received repeatedly based on the number of beams.

5. The method of claim 4, further comprising:
   identifying a paging frame based on an identifier of the terminal,
   wherein the paging occasion is identified based on the identifier of the terminal, and
   wherein the paging frame comprises one or paging occasions.

6. The method of claim 4, wherein a synchronization signal is actually transmitted on the beams during a specific unit.

7. A base station in a wireless communication system, the base station comprising:
   a transceiver; and
   a controller configured to:
      control the transceiver to transmit, to a terminal, system information including information related to beams,
      identify a paging occasion for transmitting a paging to the terminal, wherein the paging occasion is a set of time slots, and
      control the transceiver to transmit, to the terminal, a same paging repeatedly through all transmission beams based on the paging occasion,
   wherein the paging occasion is identified by the terminal,
   wherein the set of time slots is related with a number of beams,
   wherein the number of beams is determined according to the information related to beams included in the system information, and
   wherein each of the time slots in the paging occasion corresponds to each of the beams.

8. The base station of claim 7, wherein a paging frame is identified based on an identifier of the terminal,
   wherein the paging occasion is identified based on the identifier of the terminal, and wherein the paging frame comprises one or paging occasions.

9. The base station of claim 7, wherein a synchronization signal is actually transmitted on the beams during a specific unit.

10. A terminal in a wireless communication system, the terminal comprising:
a transceiver; and
a controller configured to:
control the transceiver to receive, from a base station, system information including information related to beams,
identify a paging occasion, wherein the paging occasion is a set of time slots, and
monitor a paging based on the paging occasion,
wherein the set of time slots is related with a number of beams,
wherein the number of beams is determined according to the information related to beams included in the system information,
wherein each of the time slots in the paging occasion corresponds to each of the beams, and
wherein a same paging is received repeatedly based on the number of beams.

11. The terminal of claim 10, wherein the controller is further configured to:
identify a paging frame based on an identifier of the terminal,
wherein the paging occasion is identified based on the identifier of the terminal, and
wherein the paging frame comprises one or paging occasions.

12. The method of claim 4, further comprising:
selecting beams corresponding to at least one of the beams, and
receiving the paging in beams corresponding to the selected beams.

13. The terminal of claim 10, wherein a synchronization signal is actually transmitted on the beams during a specific unit.

14. The terminal of claim 10, wherein the controller is further configured to select beams corresponding to at least one of the beams and control the transceiver to receive the paging in the selected beams.

* * * * *